United States Patent
Lee et al.

(10) Patent No.: US 11,467,370 B2
(45) Date of Patent: Oct. 11, 2022

(54) AUGMENTED REALITY DEVICE FOR ADJUSTING FOCUS REGION ACCORDING TO DIRECTION OF USER'S VIEW AND OPERATING METHOD OF THE SAME

(71) Applicant: SAMSUNG ELECTRONICS CO., LTD., Suwon-si (KR)

(72) Inventors: Kyookeun Lee, Suwon-si (KR); Kyusub Kwak, Suwon-si (KR); Bonkon Koo, Suwon-si (KR); Jeonggeun Yun, Suwon-si (KR); Wonjun Lee, Suwon-si (KR); Myongjo Choi, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/864,755

(22) Filed: May 1, 2020

(65) Prior Publication Data
US 2020/0379214 A1    Dec. 3, 2020

Related U.S. Application Data

(60) Provisional application No. 62/853,082, filed on May 27, 2019.

(30) Foreign Application Priority Data

Sep. 19, 2019  (KR) .................. 10-2019-0115473

(51) Int. Cl.
*G02B 7/28*       (2021.01)
*G02B 27/01*      (2006.01)
*G02F 1/29*       (2006.01)

(52) U.S. Cl.
CPC .......... *G02B 7/287* (2013.01); *G02B 27/0172* (2013.01); *G02B 27/0179* (2013.01); *G02F 1/29* (2013.01); *G02B 2027/0187* (2013.01)

(58) Field of Classification Search
CPC ...... G02F 1/29; G02F 1/294; G02F 1/133371; G02F 1/134309; G02F 1/291;
(Continued)

(56) References Cited

U.S. PATENT DOCUMENTS 9,927,614 B2    3/2018  Vallius
10,055,889 B2   8/2018  Bar-Zeev et al.
(Continued)

FOREIGN PATENT DOCUMENTS

AU       2016233268 A1 * 10/2017  ............. A61B 5/361
KR    10-2015-0066546 A    6/2015
(Continued)

OTHER PUBLICATIONS

International Search Report (PCT/ISA/210) and Written Opinion (PCT/ISA/237) dated Aug. 19, 2020 issued by the International Searching Authority in International Application No. PCT/KR2020/006108.
(Continued)

*Primary Examiner* — Collin X Beatty
*Assistant Examiner* — Grant A Gagnon
(74) *Attorney, Agent, or Firm* — Sughrue Mion, PLLC

(57) ABSTRACT

An augmented reality (AR) device including a variable focus lens of which a focal length may be changed by adjusting refractive power and adjusting the position of a focus adjustment region of the variable focus lens according to a direction of the user's view. The AR device may obtain an eye vector indicating a direction of the user's view using an eye tracker, adjust a refractive power of a first focus adjustment region of a first variable focus lens to change a
(Continued)

focal length for displaying a virtual image, and complementarily adjust a refractive power of a second focus adjustment lens with respect to the adjusted refractive power of the first focus adjustment region.

20 Claims, 26 Drawing Sheets

(58) Field of Classification Search
CPC .. G02F 1/0121; G02F 1/133553; G02F 1/292; G02F 1/0128; G02F 1/0147; G02F 1/11; G02F 1/133504; G02F 2201/08; G02F 2202/30; G02F 2202/36; G02F 2203/10; G02F 2203/12; G02F 2203/28; G02F 2203/62; G02F 1/0102; G02F 1/015; G02F 1/0155; G02F 1/0316; G02F 1/061; G02F 1/133305; G02F 1/1334; G02F 1/133526; G02F 1/133565; G02F 1/133626; G02F 1/13415; G02F 1/13471; G02F 1/293; G02F 2201/12; G02F 2201/122; G02F 2201/128; G02F 2201/307; G02F 2201/34; G02F 2202/027; G02F 2202/20; G02F 2203/18; G02F 2203/22; G02B 3/14; G02B 27/0172; G02B 3/08; G02B 2027/0178; G02B 26/005; G02B 26/0875; G02B 3/12; G02B 7/08; G02B 13/0075; G02B 26/06; G02B 26/0825; G02B 27/017; G02B 27/286; G02B 30/27; G02B 5/1895; G02B 19/0014; G02B 19/0061; G02B 1/002; G02B 1/10; G02B 2027/0187; G02B 25/001; G02B 26/00; G02B 26/001; G02B 26/02; G02B 27/005; G02B 3/0037; G02B 5/001; G02B 5/008; G02B 5/1828; G02B 5/1876; G02B 5/188; G02B 7/04; G02B 7/09; G02B 13/001; G02B 13/0045; G02B 13/009; G02B 13/14; G02B 15/00; G02B 15/10; G02B 17/0694; G02B 1/005; G02B 1/007; G02B 1/12; G02B 2027/011; G02B 2027/0127; G02B 2027/013; G02B 2027/0132; G02B 2027/0134; G02B 2027/014; G02B 2027/0147; G02B 2027/0174; G02B 21/002; G02B 21/0032; G02B 21/0072; G02B 21/0076; G02B 21/008; G02B 21/241; G02B 21/244; G02B 21/245; G02B 21/32; G02B 21/365; G02B 21/367; G02B 2207/101; G02B 23/243; G02B 23/2438; G02B 23/2446; G02B 23/2476; G02B 26/002; G02B 26/004; G02B 27/0006; G02B 27/0025; G02B 27/0075; G02B 27/0093; G02B 27/0101; G02B 27/0176; G02B 27/0179; G02B 27/0955; G02B 27/0977; G02B 27/281; G02B 27/4216; G02B 27/56; G02B 27/58; G02B 27/646; G02B 30/25; G02B 30/26; G02B 30/34; G02B 30/52; G02B 30/56; G02B 3/00; G02B 3/0006; G02B 3/0056; G02B 3/0087; G02B 3/10; G02B 5/0215; G02B 5/0252; G02B 5/08; G02B 5/09; G02B 5/1833; G02B 5/208; G02B 5/223; G02B 5/23; G02B 5/3016; G02B 5/3025; G02B 5/3083; G02B 5/32; G02B 6/0033; G02B 6/0036; G02B 6/0041; G02B 6/0055; G02B 6/0056; G02B 6/0061; G02B 6/1228; G02B 6/34; G02B 7/004; G02B 7/02; G02B 7/021; G02B 7/14; G02B 7/34; G02B 9/04
USPC ............................................................ 359/319
See application file for complete search history.

(56) References Cited

U.S. PATENT DOCUMENTS

| | | |
|---|---|---|
| 10,248,001 B1 | 4/2019 | Lu et al. |
| 10,288,904 B2 | 5/2019 | Yadin et al. |
| 2015/0003819 A1 | 1/2015 | Ackerman et al. |
| 2016/0231568 A1 | 8/2016 | Saarikko et al. |
| 2017/0160518 A1 | 6/2017 | Lanman et al. |
| 2017/0276948 A1 | 9/2017 | Welch et al. |
| 2017/0285337 A1 | 10/2017 | Wilson et al. |
| 2017/0293145 A1 | 10/2017 | Miller et al. |
| 2018/0210547 A1 | 7/2018 | Sarkar |
| 2018/0275394 A1 | 9/2018 | Yeoh et al. |
| 2019/0086674 A1 | 3/2019 | Sinay et al. |

FOREIGN PATENT DOCUMENTS

| | | |
|---|---|---|
| WO | 2016/149416 A1 | 9/2016 |
| WO | 2019/012385 A1 | 1/2019 |

OTHER PUBLICATIONS

Extended European Search Report dated Jul. 7, 2021, in counterpart European Patent Application No. 20812613.6.

\* cited by examiner

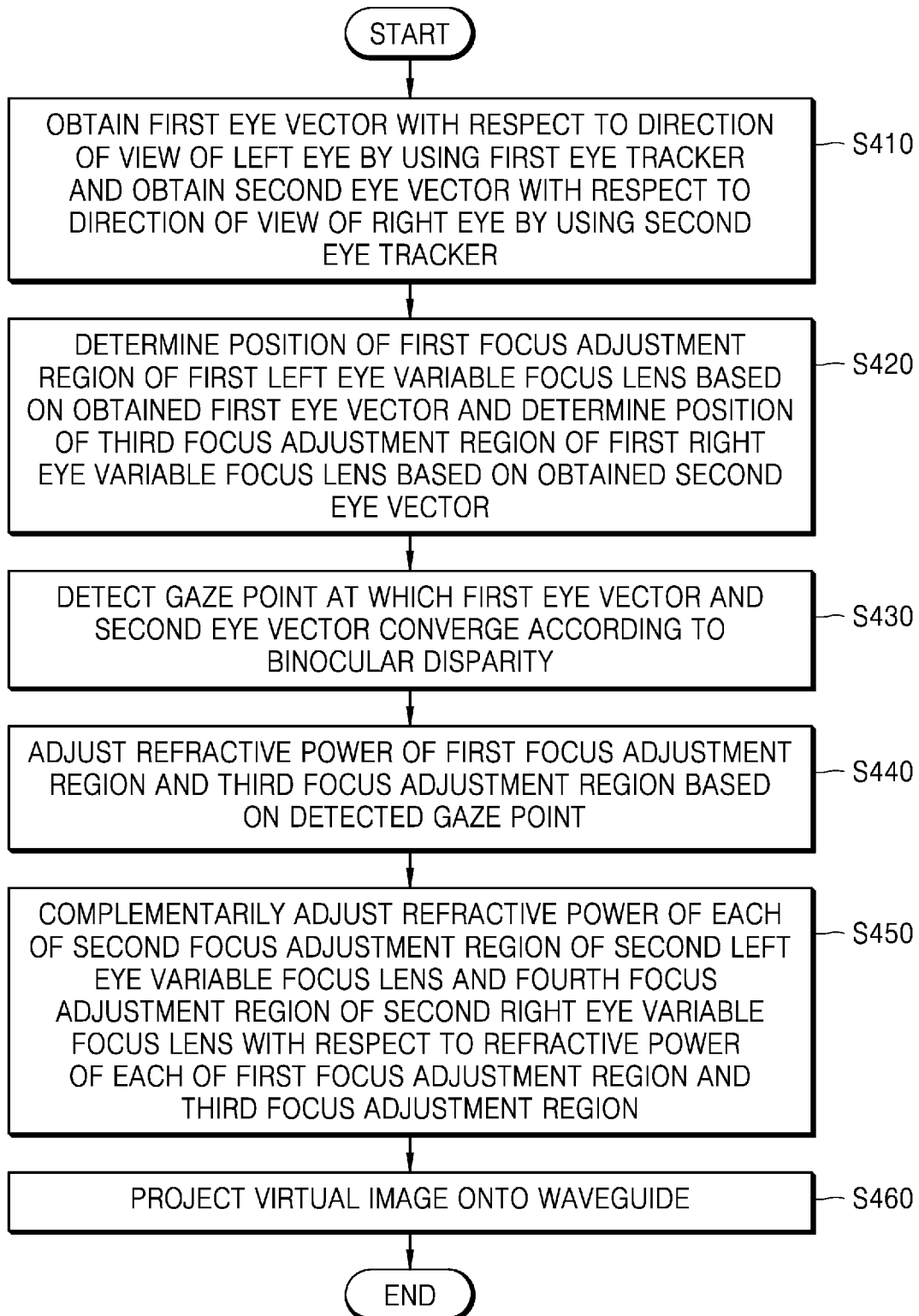

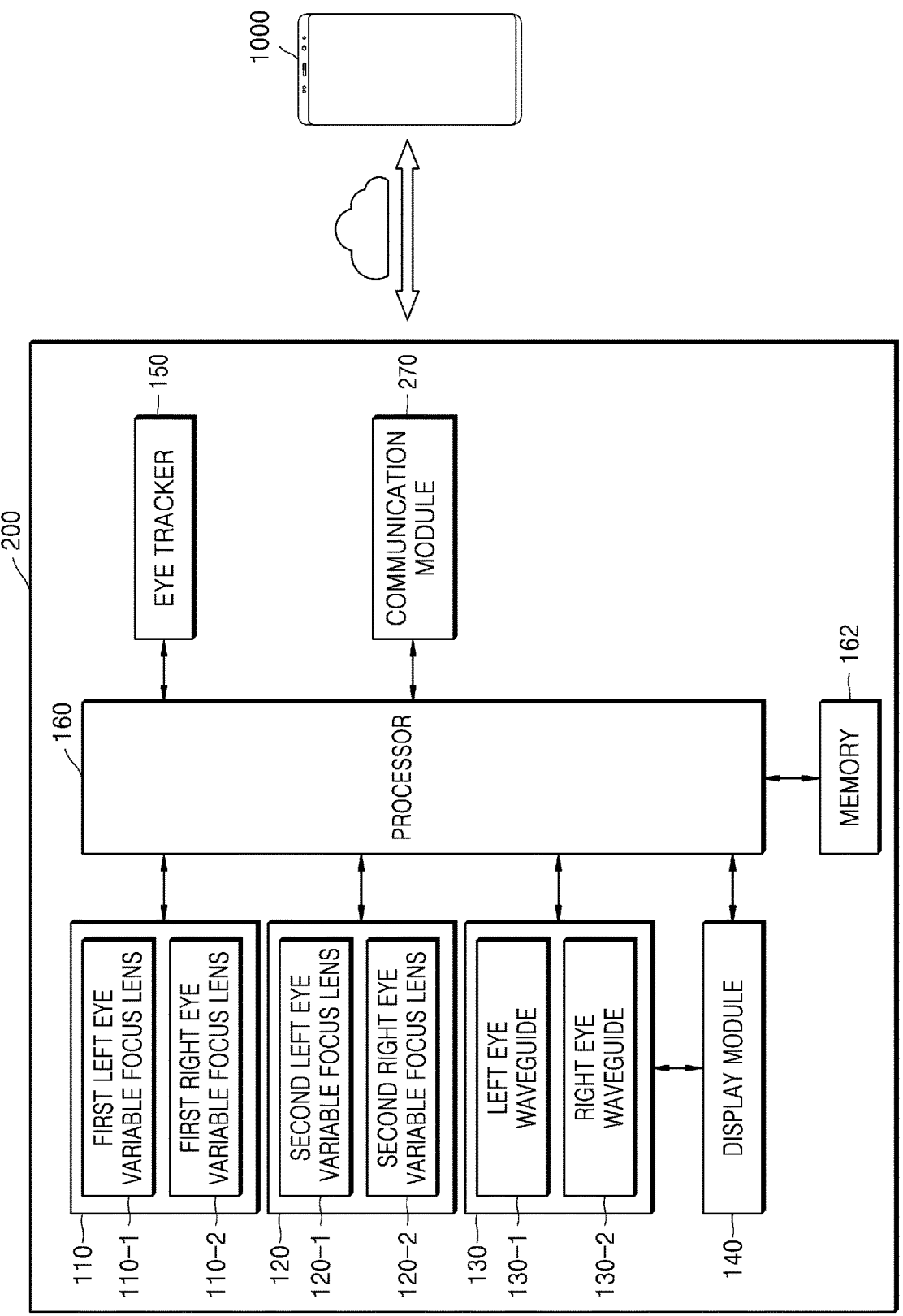

AUGMENTED REALITY DEVICE FOR ADJUSTING FOCUS REGION ACCORDING TO DIRECTION OF USER'S VIEW AND OPERATING METHOD OF THE SAME

CROSS-REFERENCE TO RELATED APPLICATIONS

This application is based on and claims the benefit of U.S. Provisional Patent Application No. 62/853,082, filed on May 27, 2019, in the United States Patent and Trademark Office, and claims priority under 35 U.S.C. § 119 to Korean Patent Application No. 10-2019-0115473, filed on Sep. 19, 2019, in the Korean Intellectual Property Office, the disclosures of which are herein incorporated by reference in their entireties.

BACKGROUND

1. Field

The disclosure relates to augmented reality (AR) devices that provide a virtual image to be perceived as being displayed on a real world object, and more particularly, to AR devices that automatically adjust the position and size of a focus region according to a direction of a user's view and operating methods of the same.

2. Description of Related Art

Augmented Reality (AR) is a technology that overlays a virtual image on a physical environment space of the real world or a real world object, and is implemented by an AR device utilizing the AR technology (e.g., smart glasses). The AR device may be utilized various circumstances for information retrieval, directions, camera photography, etc. even though smart glasses are also worn as fashion items and may be mainly used for outdoor activities.

A user of the AR device generally sees a scene through a see-through display disposed close to user's eyes while the AR device is being worn by the user. Here, the scene includes one or more real world objects in the physical environment or space that the user sees directly through the eyes. The AR device may project a virtual image onto the see-through display or the user's eyes through the see-through display, and the user may simultaneously view the real world object and the projected virtual image through the see-through display.

When viewing the virtual image through the see-through display while wearing the AR device, although a focal length controlled by the lens of the user's eye is adjusted to the see-through display where the virtual image is displayed, a vergence distance of the user's eye that views left and right eye images of the virtual image to which the cubic effect is provided according to a binocular disparity is formed farther or closer to the see-through display, which causes an inconsistency between the focal length and the vergence distance. Thus, a user who watches the virtual image of the AR device for a long time or is sensitive may incur dizziness or motion sickness. This problem is called vergence-accommodation conflict (VAC). A focus position on which the virtual image is formed may be adjusted by placing an optical lens capable of adjusting the refractive power in front of or behind the see-through display and adjusting the vergence of the optical lens, and thus the above problem may be solved.

SUMMARY

Aspects of the embodiments relate to augmented reality (AR) devices that include a variable focus lens capable of changing a focal length by adjusting refractive power and that adjust the position of a focus adjustment region of the variable focus lens according to a direction of the user's view and operating methods of the same.

Additional aspects will be set forth in part in the description which follows and, in part, will be apparent from the description, or may be learned by practice of the presented embodiments of the disclosure.

In accordance with an aspect of the disclosure, an augmented reality (AR) device includes a plurality of first variable focus lenses and a plurality of second variable focus lenses, wherein each of the first variable focus lenses and each of the second variable focus lenses is an electrically tunable liquid crystal lens; a plurality of waveguides, wherein each of the waveguides is disposed between the plurality of first variable focus lenses and the plurality of second variable focus lenses; a plurality of eye trackers configured to obtain a left eye vector by tracking a direction of the left eye of an user of the augmented reality device and a right eye vector by tracking a direction of the right eye of the user of the augmented reality device; a display module configured to project light of a virtual image toward the waveguide; and one or more processors configured to determine a first focus adjustment region of a first left eye variable focus lens among the plurality of first variable focus lenses based on the left eye vector, determine a third focus adjustment region of a first right eye variable focus lens among the plurality of first variable focus lenses based on the right eye vector, obtain a gaze point based on the left eye vector and the right eye vector, adjust a refractive power of the first focus adjustment region and a refractive power of the third focus adjustment region based on the gaze point, and based on the adjusted refractive power of the first focus adjustment region and the adjusted refractive power of the third focus adjustment region, adjust a refractive power of a second focus adjustment region of a second left eye variable focus lens among the plurality of second variable focus lenses and a refractive power of a fourth focus adjustment region of a second right eye variable focus lens among the plurality of second variable focus lenses.

For example, the AR device may further comprises a memory storing a program comprising one or more instructions, the one or more processors are further configured to perform operations by executing the one or more instructions of the program stored in the memory.

For example, when a user wears the AR device, the first left eye variable focus lens is disposed at a position spaced apart from the user's left eye by a first distance, and the second left eye variable focus lens is disposed at a position spaced apart from the user's left eye by a second distance, the second distance is greater than the first distance.

For example, the one or more processors may be further configured to control to apply a control voltage that generates a phase modulation profile relating to a position corresponding to the first focus adjustment region to the first left eye variable focus lens, and, based on the applied control voltage, adjust the refractive power of the first focus adjustment region by changing an angle at which liquid crystal molecules arranged at a position of the first focus adjustment region are arranged among liquid crystal molecules of the first left eye variable focus lens.

For example, the AR device may further include a depth sensor configured to measure a depth value of a real world object disposed at the gaze point, wherein the processor may be further configured to obtain the measured depth value of the real world object from the depth sensor and adjust the refractive power of the first focus adjustment region based on the obtained depth value so as to adjust a focal length of the virtual object which is a partial region of the virtual image.

For example, the one or more processors may be further configured to adjust the refractive power of the second focus adjustment region to be the same as the refractive power of the first focus adjustment region in a direction opposite to a direction of the refractive power of the first focus adjustment region.

For example, the one or more processors may be further configured to determine a position of the second focus adjustment region based on the left eye vector such that the first focus adjustment region and the second focus adjustment region are aligned in a direction of the left eye vector.

For example, a size of the first focus adjustment region may be determined based on a size of a virtual object that is a partial region of the virtual image output through a left eye waveguide.

For example, a size of the second focus adjustment region may be determined based on a size of a virtual object that is a partial region of the virtual image output through a left eye waveguide and a spaced distance between the first left eye variable focus lens and the second left eye variable focus lens.

For example, a plurality of a first focus adjustment regions may be provided on the first left eye variable focus lens, and wherein the processor may be further configured to adjust refractive powers of the plurality of first focus adjustment regions such that different vergences are formed according to the plurality of first focus adjustment regions.

In accordance with another aspect of the disclosure, an AR device includes a plurality of first variable a plurality of first variable focus lenses and a plurality of second variable focus lenses, wherein each of the first variable focus lenses and each of the second variable focus lenses is an electrically tunable liquid crystal lens; a plurality of waveguides, wherein each of the waveguides is disposed between the plurality of first variable focus lenses and the plurality of second variable focus lenses; a plurality of eye trackers configured to obtain a left eye vector by tracking a direction of the left eye of an user of the augmented reality device and a right eye vector by tracking a direction of the right eye of the user of the augmented reality device; a display module configured to project light of a virtual image toward the waveguide; and one or more processors configured to determine a first focus adjustment region of a first left eye variable focus lens among the plurality of first variable focus lenses based on the left eye vector obtained from the eye tracker and determine a third focus adjustment region of a first right eye variable focus lens among the plurality of first variable focus lenses based on the right eye vector, obtain a gaze point based on the left eye vector and the right eye vector, adjust a refractive power of the first focus adjustment region and a refractive power of the third focus adjustment region based on the gaze point, to change a focal length of a real world object, adjust a refractive power of a second focus adjustment region of a second left eye variable focus lens among the plurality of second variable focus lenses and refractive power of a fourth focus adjustment region of a second right eye variable focus lens among the plurality of second variable focus lenses, and independently adjust the refractive power of the second focus adjustment region and the refractive power of the fourth focus adjustment region regardless of the refractive power of the first focus adjustment region and the refractive power of the third focus adjustment region.

In accordance with another aspect of the disclosure, an operating method of an AR device includes obtaining a left eye vector by tracking a direction of the left eye using a first eye tracker and obtaining a right eye vector by tracking a direction of the right eye using a second eye tracker; determining a first focus adjustment region of a first left eye variable focus lens based on the obtained left eye vector and determining a third focus adjustment region of a first right eye variable focus lens based on the obtained right eye vector; obtaining a gaze point based on the left eye vector and the right eye vector, adjusting a refractive power of the first focus adjustment region and a refractive power of the third focus adjustment region based on the gaze point; based on the adjusted refractive power of the first focus adjustment region and the adjusted refractive power of the third focus adjustment region, adjusting a refractive power of a second focus adjustment region of a second left eye variable focus lens and a refractive power of a fourth focus adjustment region of a second right eye variable focus lens; and projecting light of a virtual image toward a waveguide using a display module.

For example, the adjusting of the refractive powers of the first focus adjustment region and the third focus adjustment region includes: applying a control voltage that generates a phase modulation profile relating to a position corresponding to the first focus adjustment region to the first left eye variable focus lens; and based on the applied control voltage, adjusting the refractive power of the first focus adjustment region by changing an angle at which liquid crystal molecules arranged at a position of the first focus adjustment region are arranged among liquid crystal molecules of the first left eye variable focus.

For example, the adjusting of the refractive power of the first focus adjustment region and the refractive power of the third focus adjustment region includes: measuring a depth value of a real world object disposed on the gaze point using a depth sensor; and adjusting the refractive power of the first focus adjustment region based on the measured depth value so as to adjust a focal length of the virtual object which is a partial region of the virtual image.

For example, the adjusting of the refractive power of the second focus adjustment region and the refractive power of the fourth focus adjustment region includes: adjusting the refractive power of the second focus adjustment region such that the second focus adjustment region forms a vergence in a direction opposite to a direction of an adjusted vergence of the first focus adjustment region and adjusting the refractive power of the fourth focus adjustment region such that the fourth focus adjustment region forms a vergence in a direction opposite to a direction of an adjusted vergence of the third focus adjustment region.

For example, the adjusting of the refractive power of the second focus adjustment region and the refractive power of the fourth focus adjustment region includes: adjusting the refractive power of the second focus adjustment region to be the same as adjusted refractive power of the first focus adjustment region in a direction opposite to a direction of the adjusted refractive power of the first focus adjustment region.

For example, the operating method may further include: determining the second focus adjustment region based on the left eye vector such that the first focus adjustment region and the second focus adjustment region are aligned in a direction of the left eye vector.

For example, a size of the first focus adjustment region may be determined based on a size of a virtual object that is a partial region of the virtual image output through the waveguide.

For example, a size of the second focus adjustment region may be determined based on a size of a virtual object that is a partial region of the virtual image output through the waveguide and a spaced distance between the first left eye variable focus lens and the second left eye variable focus lens.

For example, a plurality of a first focus adjustment regions may be provided on the first left eye variable focus lens, and the adjusting of the refractive powers of the first focus adjustment region and the third focus adjustment region includes: adjusting refractive powers of the plurality of first focus adjustment regions such that different vergences are formed according to the plurality of first focus adjustment regions.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart illustrating a method of operating an AR device according to an embodiment of the disclosure;

FIG. 17 is a block diagram illustrating an AR device according to an embodiment of the disclosure.

DETAILED DESCRIPTION

Figure 1:
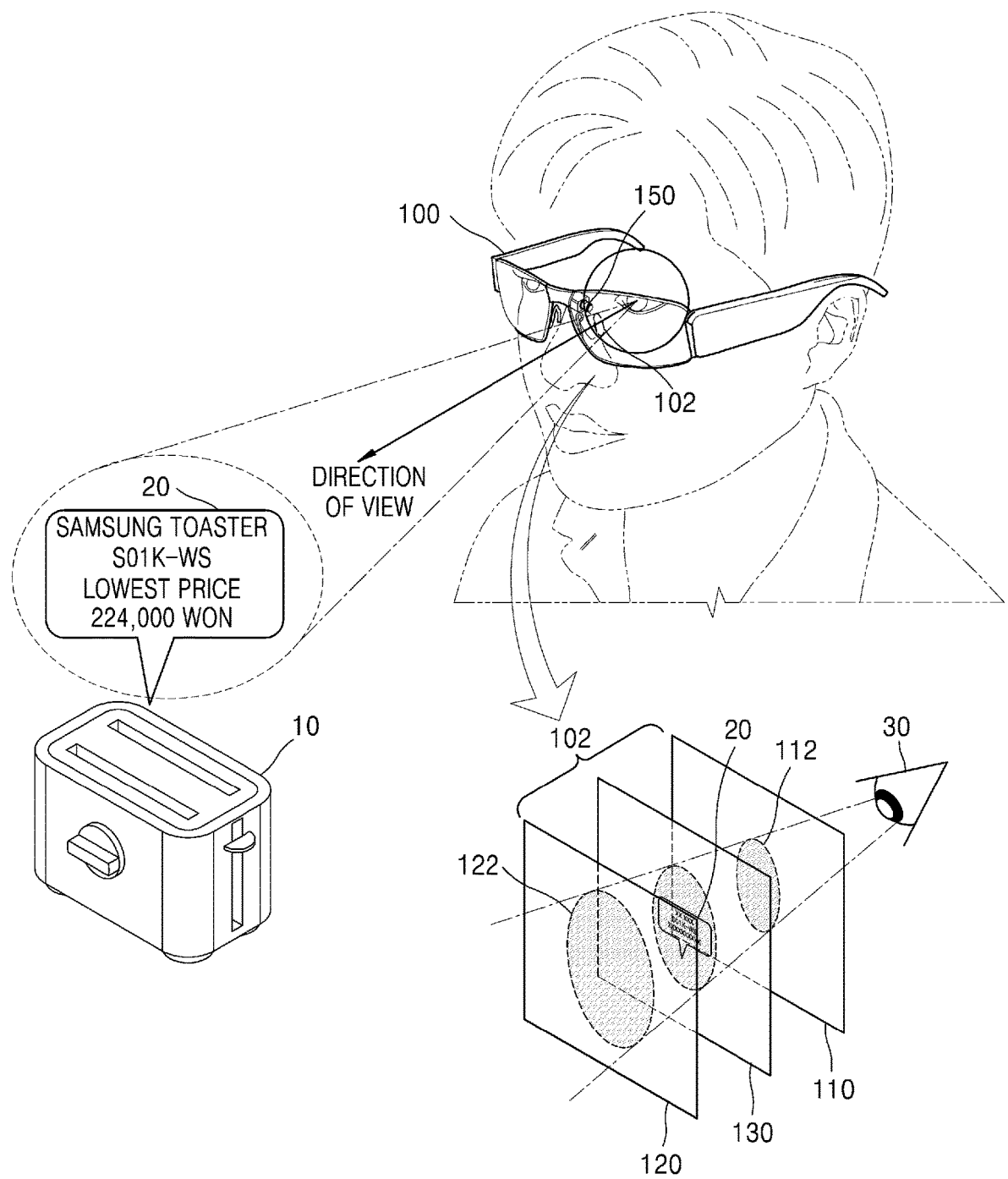
FIG. 1 is a diagram illustrating an augmented reality (AR) device that displays a virtual image on a real world object, according to an embodiment of the disclosure.

Although the terms used in the disclosure have been described in general terms that are currently used in consideration of the functions referred to in the disclosure, the terms are intended to encompass various other terms depending on the intent of those skilled in the art, precedents, or the emergence of new technology. Also, some of the terms used herein may be selected by the applicant. In this case, these terms are defined in detail below. Accordingly, the terms used in the disclosure are not defined based on the meaning of the term, not on the name of a simple term, but on the contents throughout the disclosure.

An expression used in the singular encompasses the expression in the plurality, unless a clearly different meaning is provided in the context. The terms including technical and scientific terms used herein have the same meaning as commonly understood by one of ordinary skill in the art to which the disclosure belongs.

Throughout the disclosure, the expression "at least one of a, b or c" indicates only a, only b, only c, both a and b, both a and c, both b and c, all of a, b, and c, or variations thereof.

Throughout the entirety of the specification of the disclosure, when a certain part includes a certain element, the term 'including' means that a corresponding element may further include other elements unless a specific meaning opposed to the corresponding element is written. The term used in the embodiments of the disclosure such as "unit" or "module" indicates a unit for processing at least one function or operation, and may be implemented in hardware, software, or in a combination of hardware and software.

According to the context, the expression "configured to" used herein may be used as, for example, the expression "suitable for," "having the capacity to," "designed to," "adapted to," "made to," or "capable of." The term "configured to" is not limited to only "specifically designed to" in hardware. Instead, the expression "a device configured to" may mean that the device is "capable of" operating together with another device or other elements. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

In the disclosure, a refractive index refers to a degree to which a luminous flux is reduced in a medium as compared to a vacuum.

In the disclosure, a refractive power refers to a force that redirects a direction of a ray of light or a light path by the curved surface of a lens. The refractive power is the inverse of the focal length, and the unit of the refractive power is m−1 or diopter (D). The sign of the refractive power is positive (+) in case of a convex lens and negative (−) in case of a concave lens.

In the disclosure, a vergence is an index indicating a degree to which light converges or diverges. The vergence may be adjusted according to the refractive power of the lens. In an embodiment of the disclosure, a variable focus lens may adjust the vergence by adjusting the refractive power of the lens and changing the ray of light or the light path.

In the disclosure, a virtual image is a project image projected onto a waveguide by the emission surface of a display module of an augmented reality (AR) device.

In the disclosure, a virtual object refers to a partial region of the virtual image output through the waveguide. The virtual object may represent information related to a real world object. The virtual object may include, for example, at least one of characters, numbers, symbols, icons, images, or animations.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein.

Reference will now be made in detail to embodiments of the disclosure, examples of which are illustrated in the accompanying drawings.

FIG. 1 is a diagram illustrating an augmented reality (AR) device 100 that displays a virtual object 20 on a real world object 10, according to an embodiment of the disclosure.

Referring to FIG. 1, a user may view the real world object 10 and the virtual object 20 while wearing the AR device 100. The virtual object 20 is a partial region of a virtual image generated by a display module 140 (see FIGS. 2 and 3) of the AR device 100 and output through a waveguide 130. The virtual object 20 may indicate information related to the real world object 10. In the embodiment of the disclosure shown in FIG. 1, the virtual object 20 may be an image including a name, a model name, and price information about a toaster that is an example of the real world object 10.

The user may view the real world object 10 and the virtual object 20 through a lens 102. The lens 102 may include a first variable focus lens 110, a second variable focus lens 120, and the waveguide 130.

When the user wears the AR device 100, the first variable focus lens 110 may be disposed at a position closer to a user's eye 30, and the second variable focus lens 120 may be disposed farther and spaced apart from the user's eye 30 than the first variable focus lens 110. In an embodiment of the disclosure, the first variable focus lens 110 may be disposed at a position spaced apart from the eye 30 by a first distance, and the second variable focus lens 120 may be disposed at a position spaced apart from the eye 30 by a second distance greater than the first distance. Each of the first variable focus lens 110 and the second variable focus lens 120 may include a liquid crystal molecule and may be configured as an electrically tunable liquid crystal lens capable of changing focus according to an electrical driving signal.

The waveguide 130 may be disposed between the first variable focus lens 110 and the second variable focus lens 120. The waveguide 130 is an optical element including a transparent material that may be described as a see-through display. The waveguide 130 may project light of a virtual image through the display module 140 (see FIG. 3). The waveguide 130 may include a plurality of regions in which a diffraction grating is formed. The light of the virtual image projected toward the waveguide 130 may be reflected in the waveguide 130 according to the principle of total reflection. In the light of the virtual image projected onto the waveguide 130, a light path may be changed by the diffraction grating formed in the plurality of regions such that the virtual object 20 is finally output to the user's eye 30. The waveguide 130 may perform functionality similar to a light guide plate that changes the light path of the virtual image.

The first variable focus lens 110 and the second variable focus lens 120 may respectively include first and second focus adjustment regions 112 and 122 capable of locally adjusting focus by adjusting the arrangement angle of liquid crystal molecules disposed in a specific region according to an applied control voltage. In an embodiment of the disclosure, the first variable focus lens 110 may adjust the refractive power of the first focus adjustment region 112 by changing the arrangement angle of the liquid crystal molecules disposed in the first focus adjustment region 112 according to the control voltage, thereby adjusting a vergence. The vergence is an index indicating a degree to which light converges or diverges. The vergence may be adjusted according to the refractive power of a lens.

The first focus adjustment region 112 may adjust the vergence formed on the first variable focus lens 110 by changing the refractive power like a concave lens, thereby changing a focal length by which the virtual object 20 is formed. The first focus adjustment region 112 may change the light path passing through the first focus adjustment region 112 with the adjusted refractive power, and adjust the focal length of the virtual object 20 projected onto the waveguide 130 to be the same as the focal length of the real world object 10.

Although the focal length of the virtual object 20 changes by the adjusted refractive power of the first focus adjustment region 112 of the first variable focus lens 110, because the focal length with respect to the real world object 10 also changes, the real world object 10 is not optimally focused, which may cause a problem in that the real world object 10 is perceived as dim by the user. To compensate for the focal length distortion of the real world object 10 caused by the vergence change due to the adjusted refractive power of the first focus adjustment region 112 of the first variable focus lens 110, the AR device 100 may complementarily adjust the refractive power of the second focus adjustment region 122 of the second variable focus lens 120 with respect to the refractive power of the first focus adjustment region 112.

In an embodiment of the disclosure, the AR device 100 may adjust the refractive power of the second focus adjustment region 122 to be the same as the adjusted refractive power of the first focus adjustment region 112 in a direction opposite to the direction of the refractive power of the first focus adjustment region 112. For example, when the first focus adjustment region 112 is adjusted to the refractive power of −1 diopter D, the second focus adjustment region 122 may be adjusted to +1 diopter D. In an embodiment of the disclosure, the second variable focus lens 120 may be an optical element that serves as a convex lens.

The AR device 100 may determine the positions of the first focus adjustment region 112 and the second focus adjustment region 122 according to a direction of a user's view. In an embodiment of the disclosure, the AR device 100 may obtain an eye vector indicating the direction of the user's view by tracking the position of the user's eye 30 using an eye tracker 150. The AR device 100 may determine the positions of the first focus adjustment region 112 and the second focus adjustment region 122 according to according to the eye vector. In an embodiment of the disclosure, the AR device 100 may determine the positions of the first focus adjustment region 112 and the second focus adjustment region 122 such that the first focus adjustment region 112 and the second focus adjustment region 122 are aligned along the direction of the eye vector.

The AR device 100 may determine the sizes of the first focus adjustment region 112 and the second focus adjustment region 122. In an embodiment of the disclosure, the AR device 100 may determine the sizes of the first focus adjustment region 112 and the second focus adjustment region 122 based on the size of the virtual object 20. In another embodiment of the disclosure, the AR device 100 may determine the sizes of the first focus adjustment region 112 and the second focus adjustment region 122 based on the size of the virtual object 20 and the distance between the first variable focus lens 110 and the second variable focus lens 120.

Conventionally, when viewing the virtual object 20 displayed through the waveguide 130 while wearing the AR device 100, the focal length formed on the virtual object 20 is fixed to the distance between the waveguide 130 and the eye 30, and the focal length is different from the focal length of the real world object 10 focused on a gaze point at which both eyes of the user converge according to a binocular disparity. This may cause a problem in that the virtual object 20 is displayed as dim or blurred and the user may experience dizziness or motion sickness. To avoid an undesirable user experience, an optical method of adjusting the focal length of the virtual object 20 by adjusting the refractive power of an optical lens and changing the vergence may be utilized. However, when an optical lens with a fixed focus region is used, the focus may not be adjusted according to the user's view, which causes a problem in that the optical performance is poor.

In general, when the user looks at the center of the lens, the optical performance is excellent. The AR device 100 according to an embodiment of the disclosure may include the first variable focus lens 110 and the second variable focus lens 120, respectively including the first focus adjustment region 112 and the second focus adjustment region 122, capable of locally adjusting the vergence by changing refractive power. The AR device 100 may automatically adjust the positions of the first focus adjustment region 112 and the second focus adjustment region 122 according to the eye vector obtained using the eye tracker 150, thereby adjusting the focal length of the virtual object 20 to be the same as the focal length of the real world object 10. Accordingly, the AR device 100 of the disclosure may display the virtual object 20 more clearly and improve the optical performance of the AR device. In addition, the AR device 100 may automatically adjust the focal length of the virtual object 20 according to the direction of the user's view, thereby alleviating the dizziness or motion sickness of the user and providing an improved user experience.

Figure 2:
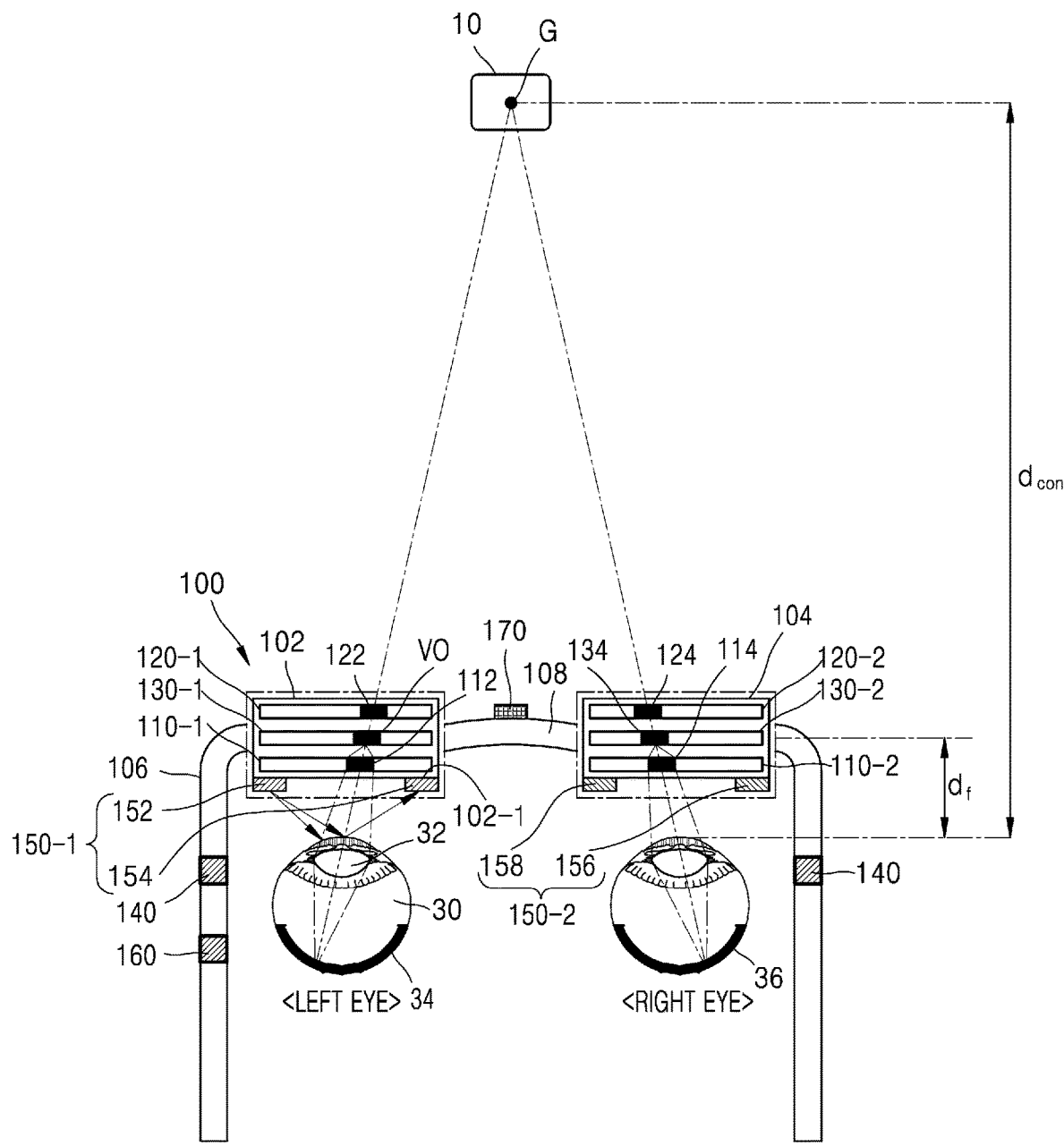
FIG. 2 is a plan view of an AR device according to an embodiment of the disclosure.

FIG. 2 is a plan view of the AR device 100 according to an embodiment of the disclosure.

Referring to FIG. 2, the AR device 100 may include a left eye lens 102, a right eye lens 104, a frame 106, a nose bridge 108, a display module 140, a left eye tracker 150-1, a right eye tracker 150-2, a processor 160, and a camera 170.

FIG. 2 is a diagram illustrating structural features of the AR device 100. The structural features are described in FIG. 2, and operations and/or functions of elements included in the AR device 100 are described in detail in FIG. 3.

The left eye lens 102 may include a first left eye variable focus lens 110-1, a second left eye variable focus lens 120-1, and a left eye waveguide 130-1. The right eye lens 104 may include a first right eye variable focus lens 110-2, a second right eye variable focus lens 120-2, and a right eye waveguide 130-2. Each of the first left eye variable focus lens 110-1, the first right eye variable focus lens 110-2, the second left eye variable focus lens 120-1, and the second right eye variable focus lens 120-2 may include a liquid crystal molecule and may be configured as an electrically tunable liquid crystal lens capable of changing focus according to an electrical driving signal.

The first left eye variable focus lens 110-1 may be disposed in the left eye lens 102 at a position closer to a user's left eye, and the second left eye variable focus lens 120-1 may be disposed in the left eye lens 102 farther and spaced apart from the user's left eye than the first left eye variable focus lens 110-1. In an embodiment of the disclosure, when a user wears the AR device 100, the first left eye variable focus lens 110-1 may be spaced apart from the left eye by a first distance, and the second left eye variable focus lens 120-1 may be disposed to be spaced apart from the left eye by a second distance. The second distance may be greater than the first distance.

The left eye waveguide 130-1 may be disposed between the first left eye variable focus lens 110-1 and the second left eye variable focus lens 120-1, and the right eye waveguide 130-2 may be disposed between the first right eye variable focus lens 110-2 and the second right eye variable focus lens 120-2. The right eye waveguide 130-2 is the same as the left eye waveguide 130-1 except for the disposition in the right eye variable focus lens 110-2, and thus the left eye waveguide 130-1 will be described below.

When the user wears the AR device 100, the left eye waveguide 130-1 may include a transparent material in which a partial region of a rear side is visible. The rear side of the left eye waveguide 130-1 refers to a surface that the user's eye faces when the user wears the AR device 100.

Conversely, the front side of the left eye waveguide 130-1 refers to a surface (i.e., a side far from the user's eye) opposite to the rear side.

The left eye waveguide 130-1 may be configured as a flat plate of a single layer or multilayer structure of the transparent material through which light may be reflected therein and propagated. The left eye waveguide 130-1 may include a plurality of regions that face the emission surface of the display module 140 to receive the light of a projected virtual image from the display module 140, propagate the light, change a light path, and finally output the light to the user's eye. A diffraction grating may be formed in the plurality of regions. The left eye waveguide 130-1 may perform functionality similar to a light guide plate. The shape and characteristics of the left eye waveguide 130-1 will be described in detail with reference to FIG. 9.

The frame 106 may be a support structure of the AR device 100 mounted to the user's head when the user wears the AR device 100. The frame 106 may have equipped thereon the display module 140, the processor 160, and the camera 170. The frame 106 may include an electrical wire for electrical connection between the display module 140, the processor 160, and the camera 170.

The nose bridge 108 is a support connecting the left eye lens 102 and the right eye lens 104 and may be supported by the user's nose when the user wears the AR device 100. In an embodiment of the disclosure, the frame 106 or the nose bridge 108 may have a built-in microphone that records sound and transmits a recorded voice signal to the processor 160.

The display module 140 may project light of the virtual image toward the left eye waveguide 130-1. The display module 140 may be disposed on the frame 106, but the disposition of the display module 140 is not limited thereto. The display module 140 may couple the virtual image generated by the processor 160 with the light to project the coupled the virtual image onto the left eye waveguide 130-1 and the right eye waveguide 130-2 through the emission surface. In an embodiment of the disclosure, the display module 140 may perform functionality similar to a projector.

The display module 140 may include a light source and an image panel. The light source is an optical element that illuminates the light and may generate the light by adjusting colors of RGB. The light source may be configured as, for example, a light emitting diode (LED). The image panel may be configured as a reflective image panel that modulates and reflects the light illuminated by the light source to light including a two-dimensional (2D) image. The reflective image panel may be, for example, a digital micromirror device (DMD) panel or a liquid crystal on silicon (LCoS) panel, or another known reflective image panel.

The display module 140 may obtain image data constituting the virtual image from the processor 160, generate the virtual image based on the obtained image data, couple the virtual image with the light output from the light source, and project lights of the coupled virtual image toward the left eye waveguide 130-1 and the right eye waveguide 130-2 through the emission surface. In an embodiment of the disclosure, the processor 160 may provide the image data including RGB color and luminance values of a plurality of pixels constituting the virtual image to the display module 140. The display module 140 may perform image processing using the RGB color value and the luminance value of each of the plurality of pixels and control the light source, thereby projecting light of the virtual image onto the left eye waveguide 130-1 and the right eye waveguide 130-2.

The display module 140 may be configured as a plurality of display modules to project the virtual image according to both eyes. In an embodiment of the disclosure, the AR device 100 may include the display module 140 that projects the virtual image onto the right eye waveguide 130-2. However, the display module 140 is not limited thereto and may be configured as one display module. When the AR device 100 includes one display module 140, the AR device 100 may further include a reflective member that reflects light of the virtual image projected from the display module 140 and propagates the reflected light of the virtual image to the left eye waveguide 130-1 and the right eye waveguide 130-2. For example, the reflective member may be configured as a mirror.

The display module 140 will be described in detail with reference to FIG. 9.

The left eye tracker 150-1 may be disposed in a left portion of the frame 106 supporting the left eye lens 102. The right eye tracker 150-2 may be disposed in a right portion of the frame 106 supporting the right eye lens 104. The left eye tracker 150-1 may obtain a first eye vector indicating a direction of the left eye's view by tracking the position and the direction of the user's left eye. The right eye tracker 150-2 may obtain a second eye vector indicating a direction of the right eye's view by tracking the position and the direction of the user's right eye.

In an embodiment of the disclosure, the left eye tracker 150-1 and the right eye tracker 150-2 may obtain the eye vector of the user according to a technique of detecting a direction of view using the corneal reflection of infrared rays. In an embodiment of the disclosure, the left eye tracker 150-1 may include an infrared irradiator 152 and an infrared detector 154, and the right eye tracker 150-2 may include an infrared irradiator 156 and an infrared detector 158. The infrared irradiators 152 and 156 may irradiate the infrared light to the corneal portions of the left and right eyes, respectively, and the infrared detectors 154 and 158 may detect the infrared light reflected from the corneas of the left and right eyes. The left eye tracker 150-1 and the right eye tracker 150-2 may determine directions of user's both eyes view through an amount of infrared light detected by the infrared detectors 154 and 158, respectively, and obtain the eye vectors indicating the respective directions of view of each of the eyes. The left eye tracker 150-1 may provide the processor 160 with the first eye vector. The right eye tracker 150-2 may provide the processor 160 with the second eye vector.

The processor 160 may be located within the frame 106. The processor 160 may be composed of one or a plurality. The processor 160 may obtain the first eye vector and the second eye vector from the left eye tracker 150-1 and the right eye tracker 150-2, and estimate the gaze point G viewed through both eyes based on the first eye vector and second eye vector. In an embodiment of the disclosure, the processor 160 may calculate a three-dimensional (3D) position coordinate value of the gaze point G based on the first eye vector and the second eye vector. In an embodiment of the disclosure, the processor 160 may determine a focus position based on the 3D position coordinate value of the gaze point G.

The processor 160 may determine the positions of the first focus adjustment region 112 and the second focus adjustment region 122 such that the first focus adjustment region 112 and the second focus adjustment region 122 are aligned along the first eye vector. In an embodiment of the disclosure, the processor 160 may obtain a two-dimensional (2D) position coordinate value of a region in which the first eye vector arrives in the entire region of the first left eye variable focus lens 110-1, and determine the position of the first focus adjustment region 112 based on the 2D position coordinate value. Similarly, the processor 160 may obtain a 2D position coordinate value of a region in which the first eye vector arrives in the entire region of the second left eye variable focus lens 120-1, and determine the position of the second focus adjustment region 122 based on the 2D position coordinate value.

The processor 160 may determine the positions of the third focus adjustment region 114 and the fourth focus adjustment region 124 such that the third focus adjustment region 114 and the fourth focus adjustment region 124 are aligned along the second eye vector. In an embodiment of the disclosure, the processor 160 may determine the position of the first focus adjustment region 112 by changing the phase of a control voltage applied to the first left eye variable focus lens 110-1, and may determine the position of the second focus adjustment region 122 by changing the phase of a control voltage applied to the second left eye variable focus lens 120-1. The processor 160 may determine a region corresponding to the first focus adjustment region 112 by adjusting the applied control voltage through a plurality of excitation electrodes disposed on a liquid crystal layer of the first left eye variable focus lens 110-1. A specific method performed by the processor 160 of determining the position of a focus adjustment region according to the phase change of the control voltage will be described in detail with reference to FIGS. 6A and 6B.

The processor 160 may change the focal length of the virtual object based on the 3D position information value of the gaze point G. In an embodiment of the disclosure, the processor 160 may calculate a distance at which the eyes of both eyes converge according to the binocular disparity, that is, the convergence distance $d_{con}$ between the user's eyes 30 and the gaze point G. Thus, the processor 160 may change the focal length $d_f$ of the virtual object based on the convergence distance $d_{con}$. In an embodiment of the disclosure, the processor 160 may change the vergence of the first left eye variable focus lens 110-1 by adjusting the refractive power of the first focus adjustment region 112 of the first left eye variable focus lens 110-1 and may change the vergence of the first right eye variable focus lens 110-2 by adjusting the refractive power of the third focus adjustment region 114 of the first right eye variable focus lens 110-2.

In an embodiment of the disclosure, the processor 160 may adjust the refractive power of the first focus adjustment region 112 by changing the arrangement angle of liquid crystal molecules disposed in the region corresponding to the position of the first focus adjustment region 112. The processor 160 may change the light path of the virtual object displayed on the left eye waveguide 130-1 and transmitting an eye lens 32 of the left eye by adjusting the refractive power of the first focus adjustment region 112. Because the light path of the virtual object changes, the focal length $d_f$ of the virtual object formed on a retina 34 of the left eye may change. Because the processor 160 adjusts the refractive power of the first focus adjustment region 112, the vergence of the first left eye variable focus lens 110-1 may change, and thus the focal length $d_f$ physically formed on the left eye waveguide 130-1 may be adjusted to be the same as the convergence distance $d_{con}$. The processor 160 may also adjust the refractive power of the third focus adjustment region 114 with respect to the first right eye variable focus lens 110-2 in the same manner as the first left eye variable focus lens 110-1, and thus the virtual object formed on a retina 36 of the right eye may also be changed in the same manner.

Because the vergence of the first left eye variable focus lens 110-1 changes by the adjustment of the refractive power of the first focus adjustment region 112, a focus distortion, in which a real world object appears unfocused, may occur. To compensate for the focus distortion, the processor 160 may adjust the refractive power of the second focus adjustment region 122 of the second left eye variable focus lens 120-1. In an embodiment of the disclosure, the processor 160 may adjust the refractive power of the second focus adjustment region 122 such that the second focus adjustment region 122 forms a complementary vergence with respect to the vergence due to the adjusted refractive power of the first focus adjustment region 112. In an embodiment of the disclosure, the processor 160 may adjust the refractive power of the second focus adjustment region 122 to be the same as the adjusted refractive power of the first focus adjustment region 112 in a direction opposite to the direction of the refractive power of the first focus adjustment region 112. For example, when the first focus adjustment region 112 is adjusted to the refractive power of −1 diopter D, the second focus adjustment region 122 may be adjusted to +1 diopter D.

The camera 170 may be disposed on the frame 106. The camera 170 may obtain video data and still image data by capturing a physical environment or a space. The camera 170 may transmit the obtained video data and still image data to the processor 160. In an embodiment of the disclosure, the camera 170 may store the video data and the still image data in a storage 190 (see FIG. 3).

Figure 3:
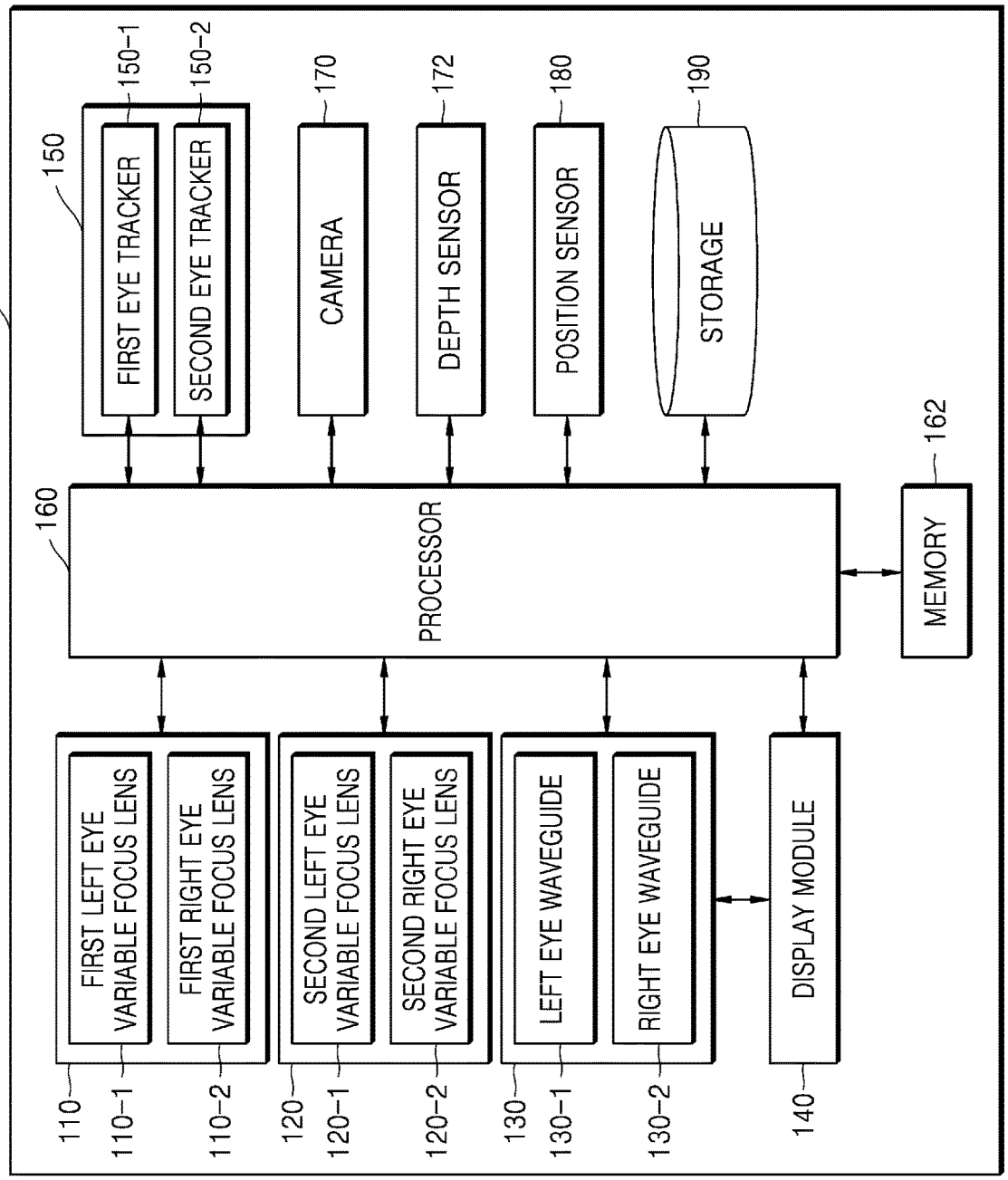
FIG. 3 is a block diagram illustrating elements of an AR device according to an embodiment of the disclosure.

FIG. 3 is a block diagram illustrating elements of the AR device 100 according to an embodiment of the disclosure.

Referring to FIG. 3, the AR device 100 may include the first variable focus lens 110, the second variable focus lens 120, the waveguide 130, the display module 140, an eye tracker 150, the processor. 160, a memory 162, the camera 170, a depth sensor 172, a position sensor 180, and the storage 190. The first variable focus lens 110, the second variable focus lens 120, the display module 140, the eye tracker 150, the processor 160, the memory 162, the camera 170, the depth sensor 172, and the storage 190 may be electrically and/or physically connected to each other. Elements having the same reference numerals as the elements shown in FIG. 2 among the elements shown in FIG. 3 are the same as the elements shown in FIG. 2. Therefore, redundant descriptions will be omitted.

Each of the first variable focus lens 110 and the second variable focus lens 120 may include liquid crystal molecules and may be configured as an electrically tunable liquid crystal lens capable of changing focus according to an electrical driving signal.

Each of the first variable focus lens 110 and the second variable focus lens 120 may change an arrangement angle of the liquid crystal molecules disposed in a specific region according to an applied control voltage, and thus the position of a focus adjustment region capable of locally changing a refractive power may move on a lens. The control voltage may be controlled by the processor 160 and may be applied to each of the first variable focus lens 110 and the second variable focus lens 120 by a voltage control circuit. This will be described in detail in the description with reference to FIGS. 6A and 6B.

The first variable focus lens 110 may be configured as a plurality of variable focus lenses. For example, when a user wears the AR device 100, the plurality of first variable focus lenses 110 may include the first left eye variable focus lens 110-1 disposed in a region corresponding to the left eye and the first right eye variable focus lens 110-2 disposed in a region corresponding to the right eye. Although the first variable focus lens 110 is illustrated as a single block including the first left eye variable focus lens 110-1 and the first right eye variable focus lens 110-2, it is understood that the first left eye variable focus lens 110-1 is disposed in a region corresponding to the left eye and the first right eye variable focus lens 110-2 is disposed in a region corresponding to the right eye, as illustrated in FIG. 2.

The second variable focus lens 120 may be configured as a plurality of variable focus lenses. For example, when the user wears the AR device 100, the plurality of second variable focus lenses 120 may include the second left eye variable focus lens 120-1 disposed in the region corresponding to the left eye and the second right eye variable focus lens 120-2 disposed in the region corresponding to the right eye. Although the second variable focus lens 120 is illustrated as a single block including the second left eye variable focus lens 120-1 and the second right eye variable focus lens 120-2, it is understood that the second left eye variable focus lens 120-1 is disposed in a region corresponding to the left eye and the second right eye variable focus lens 120-2 is disposed in a region corresponding to the right eye, as illustrated in FIG. 2.

The waveguide 130 is an optical element formed of a transparent material. When the user wears the AR device 100, the waveguide 130 may include the transparent material in which a partial region of a rear side is visible. The waveguide 130 may be configured as a flat plate of a single layer or multilayer structure of the transparent material through which light may be reflected therein and propagated. The waveguide 130 may include a plurality of regions that face the emission surface of the display module 140 to receive the light of a projected virtual image from the display module 140. The light of the virtual image projected onto the waveguide 130 may propagate in the waveguide 130 according to the principle of total reflection. The waveguide 130 may include a plurality of regions for changing the path of the light and finally outputting the light to the user's eyes. A diffraction grating may be formed in the plurality of regions. The waveguide 130 may perform functionality that is similar to a light guide plate. A specific shape and characteristics of the waveguide 130 will be described in detail with reference to FIG. 9.

The waveguide 130 may be configured as a plurality of waveguides. The waveguide 130 may include the left eye waveguide 130-1 and the right eye waveguide 130-2. Although the waveguide 130 is illustrated as a single block including the first left eye waveguide 130-1 and the right eye waveguide 130-2, it is understood that the left eye waveguide 130-1 is disposed in a region corresponding to the left eye and the right eye waveguide 130-2 is disposed in a region corresponding to the right eye, as illustrated in FIG. 2.

In an embodiment of the disclosure, the first left eye variable focus lens 110-1, the second left eye variable focus lens 120-1, and the left eye waveguide 130-1 may constitute the left eye lens 102 (see FIG. 2). Similarly, in an embodiment of the disclosure, the first right eye variable focus lens 110-2, the second right eye variable focus lens 120-2, and the right eye waveguide 130-2 may constitute the right eye lens 104 (see FIG. 2).

The display module 140 may project the light of the virtual image toward the waveguide 130. In an embodiment of the disclosure, the display module 140 may project the light of the virtual image using a transmissive projection technology in which a light source is modulated by an optically active material illuminated as a white light. The display module 140 may project the same virtual image onto the left eye waveguide 130-1 and the right eye waveguide 130-2 or may project different virtual images onto the left eye waveguide 130-1 and the right eye waveguide 130-2. Here, the virtual image may be generated by the processor 160. The display module 140 will be described in detail with reference to FIG. 9.

The eye tracker 150 may obtain an eye vector indicating a direction of the user's view by tracking the position and the direction of the user's eyes. In an embodiment of the disclosure, the eye tracker 150 may obtain the eye vector of the user by using a technique of detecting the direction of view using corneal reflection of infrared rays. The eye tracker 150 may provide the obtained eye vector to the processor 160.

The eye tracker 150 may include the left eye tracker 150-1 that obtains a first eye vector about the left eye and the right eye tracker 150-2 that obtains a second eye vector about the right eye. Although the eye tracker 150 is illustrated as a single block including the left eye tracker 150-1 and the right eye tracker 150-2, it is understood that the left eye tracker 150-1 is disposed in a region corresponding to the left eye for tracking thereof and the right eye tracker 150-2 is disposed in a region corresponding to the right eye for tracking thereof, as illustrated in FIG. 2. A specific method performed by the eye tracker 150 of obtaining the eye vector with respect to the direction of view of both eyes will be described in detail in the descriptions of FIGS. 5A to 5D.

The processor 160 may control overall functions and/or operations performed by the AR device 100 by executing one or more instructions of a program stored in and read from the memory 162. The processor 160 may include hardware elements that perform arithmetic, logic and input/output operations and signal processing.

The processor 160 may include at least one hardware of, for example, a central processing unit, a microprocessor, a graphics processing unit, application specific integrated circuits (ASICs), digital signal processors (DSPs), digital signals (DSPDs), digital signal processing devices (DSPDs), programmable logic devices (PLDs), or field programmable gate arrays (FPGAs), but is not limited thereto.

The memory 162 may store the program including one or more instructions. The memory 162 may include at least one type of hardware device of, for example, a flash memory type hardware device, a random access memory (RAM), a static random access memory (SRAM), a read-only memory (ROM), an electrically erasable programmable read (EPEROM), programmable read-only memory (PROM), magnetic memory, magnetic disk, or optical disk. The processor 160 may be composed of one or a plurality.

The processor 160 may change the arrangement angle of liquid crystal molecules disposed in a first focus adjustment region by applying a control voltage to the first left eye variable focus lens 110-1 and accordingly adjust the refractive power of the first focus adjustment region, thereby adjusting the refractive index of light passing through the first focus adjustment region. The processor 160 may adjust the vergence of the first left eye variable focus lens 110-1 by adjusting the refractive power of the first focus adjustment region. The vergence is an index indicating a degree by which light converges or diverges, and may be adjusted according to the refractive power of the lens. In an embodiment of the disclosure, the processor 160 may adjust the vergence of the first left eye variable focus lens 110-1 by adjusting the refractive power of the first focus adjustment region in a first direction, and adjust the focal length of a virtual object VO. When adjusting the vergence of the first focus adjustment region in a divergence direction, the path of the light passing through the first focus adjustment region may increase such that the focal length of the virtual object VO formed on the retina of the left eye may increase. In an embodiment of the disclosure, the processor 160 may adjust the vergence of the first focus adjustment region, and thus the focal length of the virtual object VO may be adjusted to be the same as the convergence distance of both eyes.

The processor 160 may change the arrangement angle of liquid crystal molecules disposed in a third focus adjustment region by applying a control voltage to the first right eye variable focus lens 110-2, and accordingly adjusting the refractive power of the third focus adjustment region.

In an embodiment of the disclosure, the processor 160 may calculate a 3D position coordinate value of a gaze point at which the directions of view of both eyes converge, by using both a first eye vector obtained through the left eye tracker 150-1 and a second eye vector obtained through the right eye tracker 150-2. Accordingly, based on a convergence distance which is the distance between both eyes and the gaze point, the processor 160 may adjust the refractive power of the first focus adjustment region of the first left eye variable focus lens 110-1 and the third focus adjustment region of the first right eye variable focus lens 110-2. The processor 160 may adjust the refractive power of the first focus adjustment region to change the focal length of the virtual object VO displayed through the left eye waveguide 130-1 to be the same as the convergence distance. Similarly, the processor 160 may adjust the refractive power of the third focus adjustment region to change the focal length of the virtual object VO displayed through the right eye waveguide 130-2 to be the same as the convergence distance.

In an embodiment of the disclosure, the processor 160 may store information about the 3D position coordinate value of the gaze point in the memory 160 and/or the storage 190.

In an embodiment of the disclosure, the first left eye variable focus lens 110-1 may include a plurality of first focus adjustment regions and the processor 160 may adjust the refractive power of the plurality of first focus adjustment regions to have focal lengths different from each other according to the plurality of first focus adjustment regions. In an embodiment of the disclosure, the first right eye variable focus lens 110-2 may include a plurality of third focus adjustment regions, and the processor 160 may adjust the refractive power of the plurality of third focus adjustment regions to have focal lengths different from each other according to the plurality of third focus adjustment regions.

The processor 160 may change the arrangement angle of liquid crystal molecules disposed in a second focus adjustment region by applying a control voltage to the second left eye variable focus lens 120-1 and accordingly adjust the refractive index of light passing through the second focus adjustment region, thereby adjusting the refractive power of the second left eye variable focus lens 120-1. In an embodiment of the disclosure, to compensate for a focus distortion in which a real world object is perceived as blurry due to the adjusted refractive power of the first focus adjustment region, the processor 160 controlling the second left eye variable focus lens 120-1 may complementarily adjust the refractive power of the second focus adjustment region of the second left eye variable focus lens 120-1 with respect to the adjusted refractive power of the first focus adjustment region.

In an embodiment of the disclosure, the processor 160 may adjust the refractive power of the second focus adjustment region to be the same as the adjusted refractive power of the first focus adjustment region in a direction opposite to the direction of the adjusted refractive power of the first focus adjustment region. For example, when the first focus adjustment region is adjusted to the refractive power of −1 diopter D, the processor 160 may adjust the second focus adjustment region to +1 diopter D.

The processor 160 may adjust the refractive power of the fourth focus adjustment region to be the same as the adjusted refractive power of the third focus adjustment region in a direction opposite to the direction of the refractive power of the third focus adjustment region such that the fourth focus adjustment region of the second right eye variable focus lens 120-2 complementarily forms the vergence with respect to the vergence of the third focus adjustment region of the first right eye variable focus lens 110-2.

In an embodiment of the disclosure, the processor 160 may independently adjust the refractive power of the second focus adjustment region irrespective of the refractive power of the first focus adjustment region. In an embodiment of the disclosure, the processor 160 may adjust the refractive power of the second focus adjustment region of the second left eye variable focus lens 120-1 to change the focus of the real world object viewed through the second left eye variable focus lens 120-1. In an embodiment of the disclosure, when the user experiences hyperopia or myopia, the processor 160 may adjust the refractive power of the second focus adjustment region of the second left eye variable focus lens 120-1 and the fourth focus adjustment region of the second right eye variable focus lens 120-2 for the purpose of correcting the user's vision. In this case, the processor 160 may adjust the refractive power of the second focus adjustment region and the fourth focus adjustment region based on the refractive index input by an external input or may adjust the refractive power of the second focus adjustment region and the fourth focus adjustment region to have the refractive index previously stored in the memory 162 and/or the storage 190.

The processor 160 may determine the position of the first focus adjustment region of the first variable focus lens 110 based on the eye vector obtained from the eye tracker 150. The processor 160 may determine the positions of the first focus adjustment region and the second focus adjustment region such that the first focus adjustment region of the first left eye variable focus lens 110-1 and the second focus adjustment region of the second left eye variable focus lens 120-1 are aligned according to the direction of the first eye vector. In an embodiment of the disclosure, the processor 160 may obtain a two-dimensional (2D) position coordinate value of a region in which the first eye vector arrives in the entire region of the first left eye variable focus lens 110-1, and determine the position of the first focus adjustment region 112 based on the 2D position coordinate value. Similarly, the processor 160 may obtain a 2D position coordinate value of a region in which the first eye vector arrives in the entire region of the second left eye variable focus lens 120-1, and determine the position of the second focus adjustment region 122 based on the 2D position coordinate value. Similarly, the processor 160 may determine the positions of the third focus adjustment region and the fourth focus adjustment region such that the third focus adjustment region of the first right eye variable focus lens 110-2 and the fourth focus adjustment region of the first right eye variable focus lens 110-2 are aligned according to the direction of the second eye vector.

The processor 160 may determine sizes of the first focus adjustment region and the second focus adjustment region. In an embodiment of the disclosure, the processor 160 may determine the sizes of the first focus adjustment region and the second focus adjustment region based on the size of the virtual object VO projected onto the user's eye through the left eye waveguide 130-1. In an embodiment of the disclosure, the processor 160 may determine the sizes of the first focus adjustment region and the second focus adjustment region based on the size of the virtual object VO and the distance between the first left eye variable focus lens 110-1 and the second left eye variable focus lens 120-1. In an embodiment of the disclosure, the processor 160 may determine sizes of the third focus adjustment region and the fourth focus adjustment region based on the size of the virtual object VO projected through the right eye waveguide 130-2. In an embodiment of the disclosure, the processor 160 may determine the sizes of the third focus adjustment region and the fourth focus adjustment region based on the size of the virtual object VO and the distance between the first right eye variable focus lens 110-2 and the second right eye variable focus lens 120-2.

The camera 170 may obtain video data and still image data by capturing a physical environment or a space viewed by the user. The camera 170 may transmit the video data and still image data to the processor 160. In an embodiment of the disclosure, the camera 170 may visually monitor the surrounding space of the user. In an embodiment of the disclosure, the camera 170 may perform one or more controls or operations within an application controlled by the processor 160 or may capture a gesture or a motion performed by the user as well as the real world object of the surrounding space to operate to provide input within the application.

The depth sensor 172 may be a sensor and/or camera that measures the depth value of the real world object viewed by the user. The depth sensor 172 may scan the physical space or environment, measure the depth value of the real world object disposed in the physical space or environment according to a 3D position coordinate value of the real world object, and measure the measured depth value in each 3D position coordinate value to generate a depth map. The depth sensor 172 may store the depth map in the memory 162 and/or the storage 190.

In an embodiment of the disclosure, the depth sensor 172 may obtain a depth image that includes the depth value of the real world object. The depth image includes a 2D pixel region of a captured scene, in which each pixel in the 2D pixel region may represent, for example, a depth value such as the distance of the real world object in the captured scene by using the depth sensor 172 in centimeters (cm), millimeters (mm), etc.

The depth sensor 172 may measure the 3D depth value by using any one of, for example, stereo-type, time-of-flight (ToF), and structured pattern. In an embodiment of the disclosure, the depth sensor 172 may include an RGB camera, an infrared light element, and a 3D camera that may be used to capture the depth image about the real world object.

The depth sensor 172 may transmit the depth image including the depth value of the real world object to the processor 160 or store the depth image in the memory 162 and/or the storage 190. In an embodiment of the disclosure, the processor 160 may obtain the depth image from the depth sensor 172 or obtain the depth value of the real world object by loading the depth map stored in the memory 162 and/or the storage 190, and adjust the refractive power of the first focus adjustment region to change the focal length of the virtual object VO based on the obtained depth value. In an embodiment of the disclosure, the processor 160 may adjust the vergence of the first left eye variable focus lens 110-1 by adjusting the refractive power of the first focus adjustment region and adjust the focal length of the virtual object VO through the adjustment of the vergence. A specific method of adjusting the focal length of the virtual object VO using the depth value of the real world object will be described in detail with reference to FIGS. 13A and 13B.

The position sensor 180 may obtain position information of the AR device 100. In an embodiment of the disclosure, the position sensor 180 may obtain a location or geographic position coordinates where the AR device 100 is currently located. For example, the position sensor 180 may include a GPS sensor.

The storage 190 may store at least one of the virtual image generated by the processor 160, an image of the real world object captured by the camera 170, or the depth image or the depth map with respect to the real world object captured through the depth sensor 172. In an embodiment of the disclosure, the storage 190 may store information about the refractive power of the first focus adjustment region of the first left eye variable focus lens 110-1 and the second focus adjustment region of the second left eye variable focus lens 120-1. In an embodiment of the disclosure, the storage 190 may store information about the refractive power of the third focus adjustment region of the first right eye variable focus lens 110-2 and the fourth focus adjustment region of the second right eye variable focus lens 120-2.

The storage 190 may include, for example, at last one type storage medium of a flash memory type memory, a hard disk type memory, a multimedia card micro type memory, a card type memory (e.g., SD or XD memory, etc.), a magnetic memory, a magnetic disk, or an optical disk, but the storage 190 is not limited to the above-described example.

FIG. 4 is a flowchart illustrating a method of operating the AR device 100 according to an embodiment of the disclosure.

In operation S410, the AR device 100 may obtain a first eye vector with respect to a first direction of view of the left eye using a first eye tracker and obtain a second eye vector with respect to a second direction of view of the right eye using a second eye tracker. The first eye tracker and the second eye tracker may obtain the first eye vector and the second eye vector indicating the direction of the user's view by tracking the respective positions and directions of pupils of both eyes and provide the first eye vector and second eye vector to the AR device 100. In an embodiment of the disclosure, an eye tracker may obtain the eye vector of the user by using a technique of detecting the direction of view using corneal reflection of infrared rays. In an embodiment of the disclosure, the eye tracker may obtain an image of the pupil using a vision technology, track the position change of the pupil using the image of the pupil, and obtain the eye vector based on the change in position. The eye tracker may provide the processor 160 (see FIG. 3) with data about the vector value and the direction of each of the obtained first eye vector and second eye vector.

In operation S420, the AR device 100 may determine the position of a first focus adjustment region of a first left eye variable focus lens based on the first eye vector and may determine the position of a third focus adjustment region of a first right eye variable focus lens based on the second eye vector. The first left eye variable focus lens and the first right eye variable focus lens may be liquid crystal lenses capable of adjusting the refractive index of light passing through the first focus adjustment region and the third focus adjustment region by changing the arrangement angle of liquid crystal molecules disposed in the first focus adjustment region and the third focus adjustment region, respectively, according to control voltage phases applied thereto. In an embodiment of the disclosure, the first left eye variable focus lens and the first right eye focus adjusting lens may be configured as electrically tunable liquid crystal lenses capable of changing focus according to an electrical driving signal.

In an embodiment of the disclosure, the processor 160 (see FIG. 3) may calculate position coordinate values of the first left eye variable focus lens and the first right eye variable focus lens through which the eye of user's left and right eyes focus, based on the data about the vector value and the direction of each of the first eye vector and second eye vector obtained from the eye tracker. The processor 160 may determine each of the first focus adjustment region and the third focus adjustment region based on the calculated position coordinate value.

The AR device 100 may adjust the refractive power with respect to the first focus adjustment region, which is a region through which the first eye vector passes in the entire region of the first left eye variable focus lens. Similarly, the AR device 100 may adjust the refractive power with respect to the third focus adjustment region, which is a region through which the second eye vector passes in the entire region of the first right eye variable focus lens. Because the direction of the first eye vector changes, the position of the first focus adjustment region may change. Similarly, because the direction of the second eye vector changes, the position of the third focus adjustment region may change.

In operation S430, the AR device 100 may obtain a gaze point at which the first eye vector and the second eye vector converge according to binocular disparity. In an embodiment of the disclosure, the gaze point may be obtained by using a triangulation method. The AR device 100 may calculate a 3D position coordinate value of the gaze point based on the distance between both eyes, the first eye vector, and the second eye vector. The AR device 100 may calculate a vergence distance, which is a distance between both eyes and the obtained gaze point.

In operation S440, the AR device 100 may adjust the refractive power of the first focus adjustment region and the third focus adjustment region based on the gaze point. In an embodiment of the disclosure, the AR device 100 may adjust the refractive power of the first focus adjustment region and the third focus adjustment region to adjust the focal length of a virtual object based on the vergence distance. Vergences formed in the first focus adjustment region and the third focus adjustment region may be adjusted by adjusting the refractive power of the first focus adjustment region and the third focus adjustment region.

In an embodiment of the disclosure, the AR device 100 may obtain the vergence distance of a real world object disposed on the gaze point, and adjust the refractive power of the first focus adjustment region and the third focus adjustment region based on the vergence distance such that the virtual object has the same focal length as the real world object. The AR device 100 may change the vergence formed in the first focus adjustment region to a divergence direction by adjusting the refractive power of the first focus adjustment region, and accordingly adjust the focal length of the virtual object formed on the retina of the left eye. Similarly, AR device 100 may change the vergence formed in the third focus adjustment region to the divergence direction by adjusting the refractive power of the third focus adjustment region, and accordingly adjust the focal length of the virtual object formed on the retina of the right eye.

In an embodiment of the disclosure, the processor 160 (see FIG. 3) may adjust the refractive power of the first focus adjustment region by controlling an amount of control voltage applied to a plurality of excitation electrodes of the first left eye variable focus lens. The processor 160 may apply the control voltage to an excitation electrode corresponding to the position of the first focus adjustment region, which is a target region of which refractive power is to be adjusted among the plurality of excitation electrodes of the first left eye variable focus lens, and adjust the refractive power of the first focus adjustment region by adjusting the amount of the control voltage. A specific method performed by the processor 160 of determining the position of a focus adjustment region of a focus adjustment lens and adjusting the refractive power of the focus adjustment region will be described in detail with reference to FIGS. 6A and 6B.

In an embodiment of the disclosure, the AR device 100 may obtain a depth value of the real world object included in a depth image captured by using a depth sensor and adjust the refractive power of the first focus adjustment region and the third focus adjustment region such that the focal length of the virtual object is adjusted based on the obtained depth value of the real world object.

In operation S450, the AR device 100 may complementarily adjust the refractive power of each of the second focus adjustment region of the second left eye variable focus lens and the fourth focus adjustment region of the second right eye variable focus lens with respect to the refractive power of each of the first focus adjustment region and the third focus adjustment region. In an embodiment of the disclosure, the AR device 100 may adjust the refractive power of the second focus adjustment region and the fourth focus adjustment region such that the second focus adjustment region and the fourth focus adjustment region complementarily adjust the vergence with respect to the vergence of the first focus adjustment region and the third focus adjustment region, respectively. Although the focal length of the virtual object changes by the vergence of the first focus adjustment region adjusted in operation S440, the focal length with respect to the real world object also changes by the vergence of the first focus adjustment region, which may cause a focus distortion in which the real world object looks blurry. To compensate for the focus distortion of the real world object due to the adjusted vergence of the first focus adjustment region of the first left eye variable focus lens and the third focus adjustment region of the first right eye variable focus lens, the AR device 100 may adjust the refractive power of the second focus adjustment region of the second left eye variable focus lens and the fourth focus adjustment region of the second right eye variable focus lens to be the same as the adjusted refractive power of the first focus adjustment region and the third focus adjustment region in directions opposite to the directions of the refractive power of the first focus adjustment region and the third focus adjustment region, respectively. For example, when the first focus adjustment region is adjusted to the refractive power of −1 diopter D, the AR device 100 may adjust the refractive power of the second focus adjustment region to +1 diopter D. Similarly, when the third focus adjustment region is adjusted to the refractive power of −2 diopter D, the AR device 100 may adjust the refractive power of the fourth focus adjustment region to +2 diopter D.

In operation S460, the AR device 100 may project light of a virtual image toward a waveguide. The waveguide may be an optical element formed of a transparent material through which light may be reflected therein and propagated. The waveguide may be configured as a flat plate of a single layer or multilayer structure. The waveguide may perform a function of a light guide plate that changes the direction of light through the diffraction principle of the light and transmits the light to the user's eye. The waveguide may include a first region in which light of the virtual image is received from the display module 140 (see FIG. 3), a second region in which the light of the virtual image incident on the first region propagates, and a third region that outputs the virtual image by changing the direction of the light of the virtual image propagated in the second region to the direction of the user's eye. A diffraction grating may be formed in the first region, the second region, and the third region. Due to the diffraction grating formed in the first region, the second region, and the third region of the waveguide, the light of the virtual image projected from the display module 140 may be transmitted to the user's eye, and accordingly the user may observe the virtual object of the virtual image. The structure of the waveguide and the light guiding principle will be described in detail with reference to FIG. 9.

The display module 140 (see FIG. 3) may project the light of the virtual image toward the waveguide such that the virtual object is displayed at the position coordinate value determined by the processor 160 (see FIG. 3) based on the first eye vector and the second eye vector obtained by the eye tracker.

The AR device 100 may determine the position of the virtual object which is a partial region of the virtual image output through the waveguide 130 (see FIG. 3) based on the eye vector. In an embodiment of the disclosure, the processor 160 may obtain a 2D position coordinate value of a region at which the first eye vector arrives in the entire region of the left eye waveguide 130-1 from the eye tracker 150 and form the virtual image such that the virtual object is displayed at the 2D position coordinate value. The processor 160 may provide generated image data of the virtual image to the display module 140. The processor 160 may couple the virtual image with the light by controlling the light source and control the display module 140 to project the coupled virtual image such that the virtual object of the virtual image is displayed on a region corresponding to the 2D position coordinate value of the left eye waveguide 130-1.

Figure 5A:
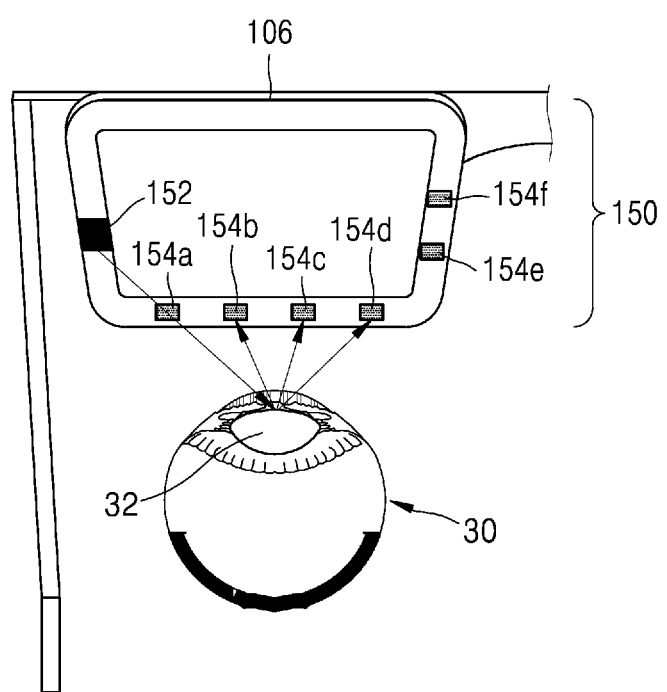
FIG. 5A illustrates an eye tracker of an AR device according to an embodiment of the disclosure.

FIG. 5A illustrates the eye tracker 150 of an AR device according to an embodiment of the disclosure.

Referring to FIG. 5A, the eye tracker 150 may include an infrared irradiator 152 and a plurality of infrared detectors 154a, 154b, 154c, 154d, 154e, and 154f. Although six infrared detectors 154a to 154f are shown in FIG. 5A, this is for convenience of description, and the quantity of the plurality of infrared detectors 154a to 154f and the positioning thereof are not limited to this configuration.

The infrared irradiator 152 may irradiate an infrared light to the cornea portion corresponding to where the lens 32 of the eye 30 is disposed. The plurality of infrared detectors 154a to 154f may detect the infrared light reflected from the cornea. In an embodiment of the disclosure, the infrared irradiator 152 may include a reflector that changes the path of the infrared light to irradiate the infrared light to the direction of the eye 30. In an embodiment of the disclosure, the eye tracker 150 may obtain information about an amount of the infrared light detected by each of the plurality of infrared detectors 154a to 154f, determine a direction of view viewed by the user's eye 30 based on the obtained amount of infrared light, and obtain an eye vector indicating the direction of view. The eye tracker 150 may provide the processor 160 (see FIG. 3) with data indicating the vector value and the direction of the obtained eye vector.

Figure 5B:
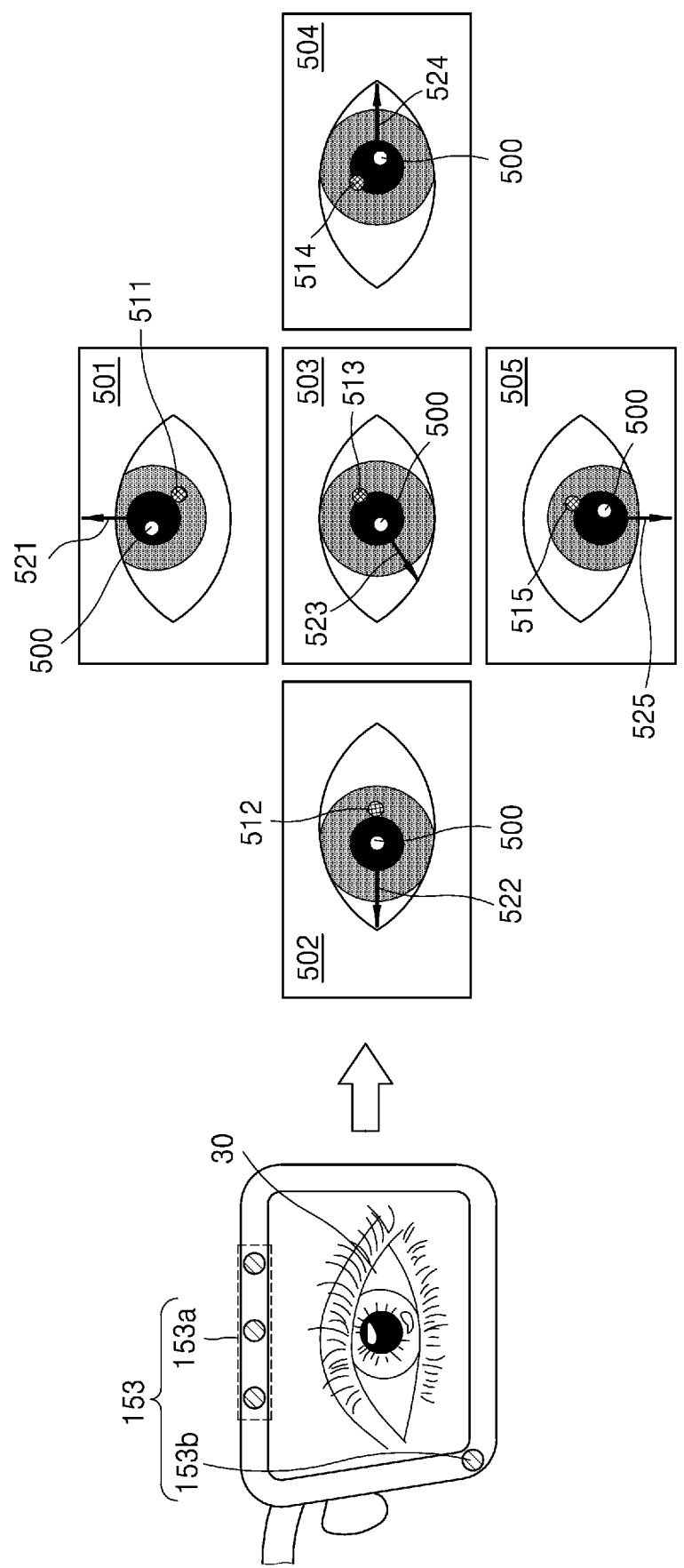
FIG. 5B illustrates an eye tracker of an AR device according to an embodiment of the disclosure.

FIG. 5B illustrates an eye tracker of an AR device according to an embodiment of the disclosure.

Referring to FIG. 5B, the eye tracker 153 may track the eye of a user based on positions of reflection light 511, 512, 513, 514, and 515 reflected from the user's eye 30 and obtain an eye vector based on the positions of reflection light 511, 512, 513, 514, and 515 reflected from the user's eye 30. The eye tracker 153 may include a light source 153a and a camera 153b.

The light source 153a may include an infrared light emitting diode (IR LED). In the embodiment of the disclosure illustrated in FIG. 5B, the light source 153a may include a plurality of LEDs disposed at different positions. The light source 153a may provide light (e.g., an infrared light) to the user's eye 30 when an image of the eye 30 is captured by the camera 153b. Because the light is provided to the user's eye 30, the reflection light reflected from the user's eye 30 may be generated.

The camera 153b may be configured to include at least one camera. The camera 153b may be implemented as an infrared camera (IR). The AR device may track the view of the user's eye 30 using images 501, 502, 503, 504, and 505 of the user's eye 30 captured by the camera 153b. For example, the eye tracker 153 may track the user's view by detecting the pupil 500 and the reflection light 511 to 515 from the images 501 to 505 of the user's eye 30, thereby obtaining an eye vector. The eye tracker 153 may detect the positions of the pupil 500 and the reflection light 511 to 515 from the images 501 to 505 of the user's eye 30 and determine the direction of view of the user's eye 30 based on the relationship between the position of the pupil 500 and the positions of the reflection light 511 to 515.

For example, the eye tracker 153 may detect the pupil 500 and the reflection light 511 from the captured first eye image 501 and determine a direction of view 521 of the user's eye 30 based on the relationship between the position of the pupil 500 and the position of the reflection light 511. In the same manner, the eye tracker 153 may detect the pupil 500 and the reflection light 512, 513, 514, and 515 respectively from the second to fifth eye images 502, 503, 504, and 505 and determine directions of view 522, 523, 524, and 525 of the user's eye 30 based on the relationships between the position of the pupil 500 and the positions of the reflection lights 512, 513, 514, and 515.

In an embodiment of the disclosure, the eye tracker 153 may obtain the eye vector based on information about the direction of view. The eye tracker 153 may provide the processor 160 (see FIG. 3) with data indicating the vector value and the direction of the eye vector.

In another embodiment of the disclosure, the eye tracker 153 may provide the processor 160 (see FIG. 3) with only coordinate values with respect to the position of the pupil 500 and the positions of the reflection light 511 to 515 detected from the plurality of eye images 501 to 505 and the processor 160 may calculate the eye vector of the user's eye 30 based on the coordinate values obtained from the eye tracker 153.

Figure 5C:
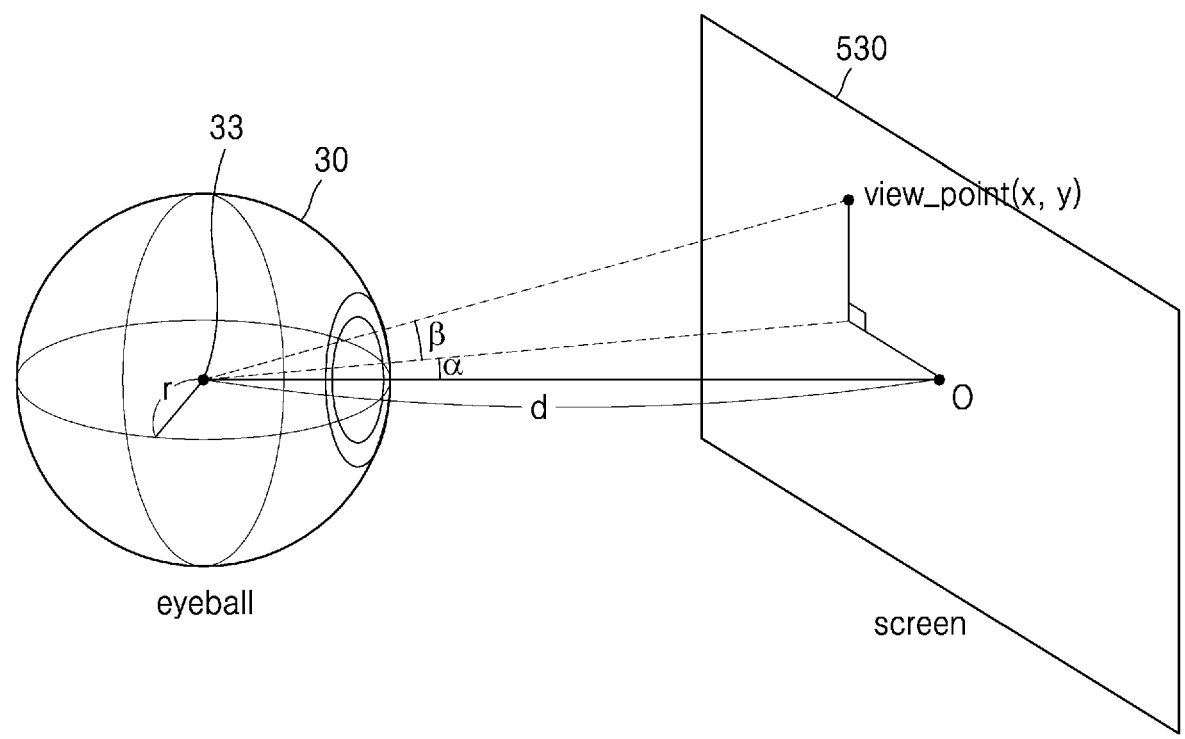
FIG. 5C is a diagram illustrating a three-dimensional (3D) eyeball model with respect to the direction of a user's view.

FIG. 5C is a diagram illustrating a 3D eyeball model with respect to the direction of a user's view.

Referring to FIG. 5C, an AR device may determine the direction of view of the user's eye 30 using the eye trackers 150 and 153. For example, the AR device may determine the direction of view based on an average eyeball model of a person. The eyeball model may be modeled by assuming that the human eye 30 has a spherical shape and the eyeball

30 ideally rotates according to the direction of view. In addition, the eyeball model may be expressed mathematically as shown in Equations 1 and 2 below.

$$x = d \cdot \tan \alpha,$$

$$y = d \cdot \sec \alpha \cdot \tan \beta, \qquad \text{[Equation 1]}$$

$$\beta = \sin^{-1}(\text{diff}\_y/r),$$

$$\alpha = \sin^{-1}(\text{diff}\_x/r \cos \beta). \qquad \text{[Equation 2]}$$

In Equation 1, d denotes a distance between a center 33 of the user's eye 30 and a virtual screen 530, α denotes an angle of rotation of the user's eye 30 in the x-axis direction based on an instance in which the user's eye 30 gazes at the front of the virtual screen 530, and β denotes an angle of rotation of the user's eye 30 in the y-axis direction based on an instance in which the user's eye 30 gazes at the front of the virtual screen 530. In addition, in Equation 2, r denotes the radius of a sphere assuming that the user's eye 30 is the sphere.

The eye trackers 150 and 153 according to an embodiment of the disclosure may use a method described in FIGS. 5A and 5B to measure degrees of rotation (e.g., α and β) of the user's eye 30, and the AR device may use the degrees of rotation α and β of the user's eye 30 to calculate a 2D coordinate value of the direction of view of the user's eye 30 on the virtual screen 530.

Figure 5D:
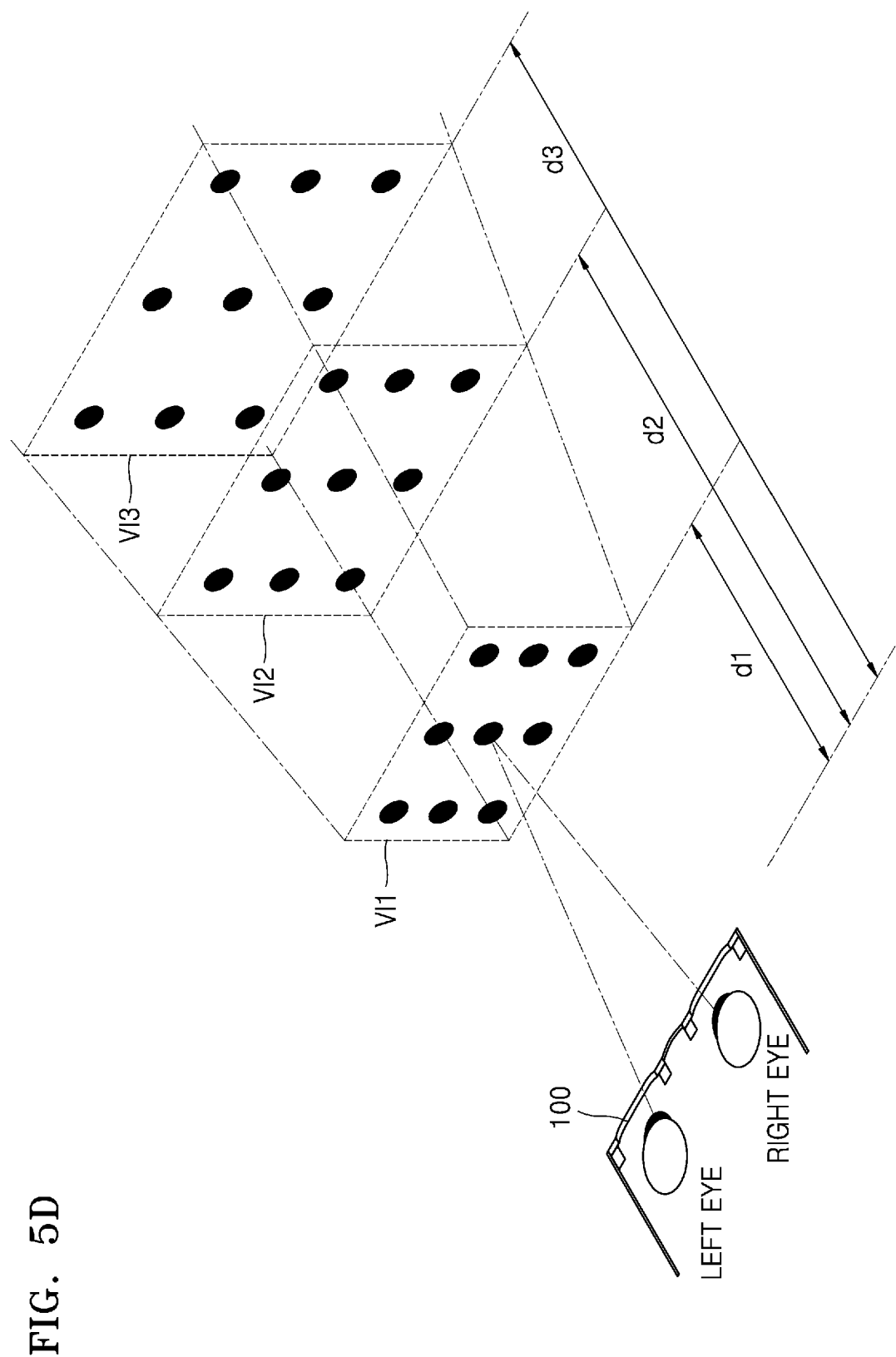
FIG. 5D is a reference diagram for describing a method of calibrating an eye tracker according to an embodiment of the disclosure.

FIG. 5D is a reference diagram for describing a method of calibrating an eye tracker according to an embodiment of the disclosure.

Referring to FIG. 5D, when a user first uses an AR device, the AR device may perform a process of calibrating the eye trackers 150 and 153 to accurately measure directions of view of the left and right eyes. The AR device may output virtual images VI1, VI2, and VI3 of different depths (e.g., d1, d2, and d3) marked with a plurality of points for guiding a user's view and induce the user to gaze at each of the plurality of points. In FIG. 5D, although 9 points are shown in each of the virtual images VI1, VI2, and VI3, this is an example and the quantity of points and positions of the points are not limited.

When the user gazes at each point included in the virtual images VI1, VI2, and VI3, the AR device may store data (e.g., an eye vector) output from the eye trackers 150 and 153 in the storage 190 (see FIG. 3) in the form of a table.

As shown in FIG. 5A, the method of tracking a view using an amount of infrared light reflected from the cornea may previously store information about the reflection angle and the amount of light at each point in the storage 190 as view information in the form of the table. As shown in FIG. 5B, the method of capturing a user's eye using an infrared light may previously store an image including the user's eye captured at each point and a reflection light in the storage 190 as view information in the form of the table.

The AR device may determine the direction of view of the user's eye by comparing previously stored view information with view information output from the eye trackers 150 and 153. The processor 160 (see FIG. 3) of the AR device may determine directions of view of the left and right eyes using the view information output from the eye trackers 150 and 153. In an embodiment of the disclosure, the processor 160 may calculate a first eye vector indicating a direction of view of the left eye and a second eye vector indicating a direction of view of the right eye using the view information output from the eye trackers 150 and 153.

The AR device may estimate the position coordinate value of the gaze point G (see FIG. 2) by using a binocular disparity and the view information with respect to the direction of view of the left eye and the direction of view of the right eye. For example, the processor 160 (see FIG. 3) may use coordinate mapping to previously set a point (the gaze point G) at which the user gazes in the entire space described in FIG. 2 to be mapped to a 3D position coordinate value (e.g., an x coordinate value, a y coordinate value, and a z coordinate value) or may store the 3D position coordinate value of the gaze point G in the storage 190 in the form of the table.

Figure 6A:
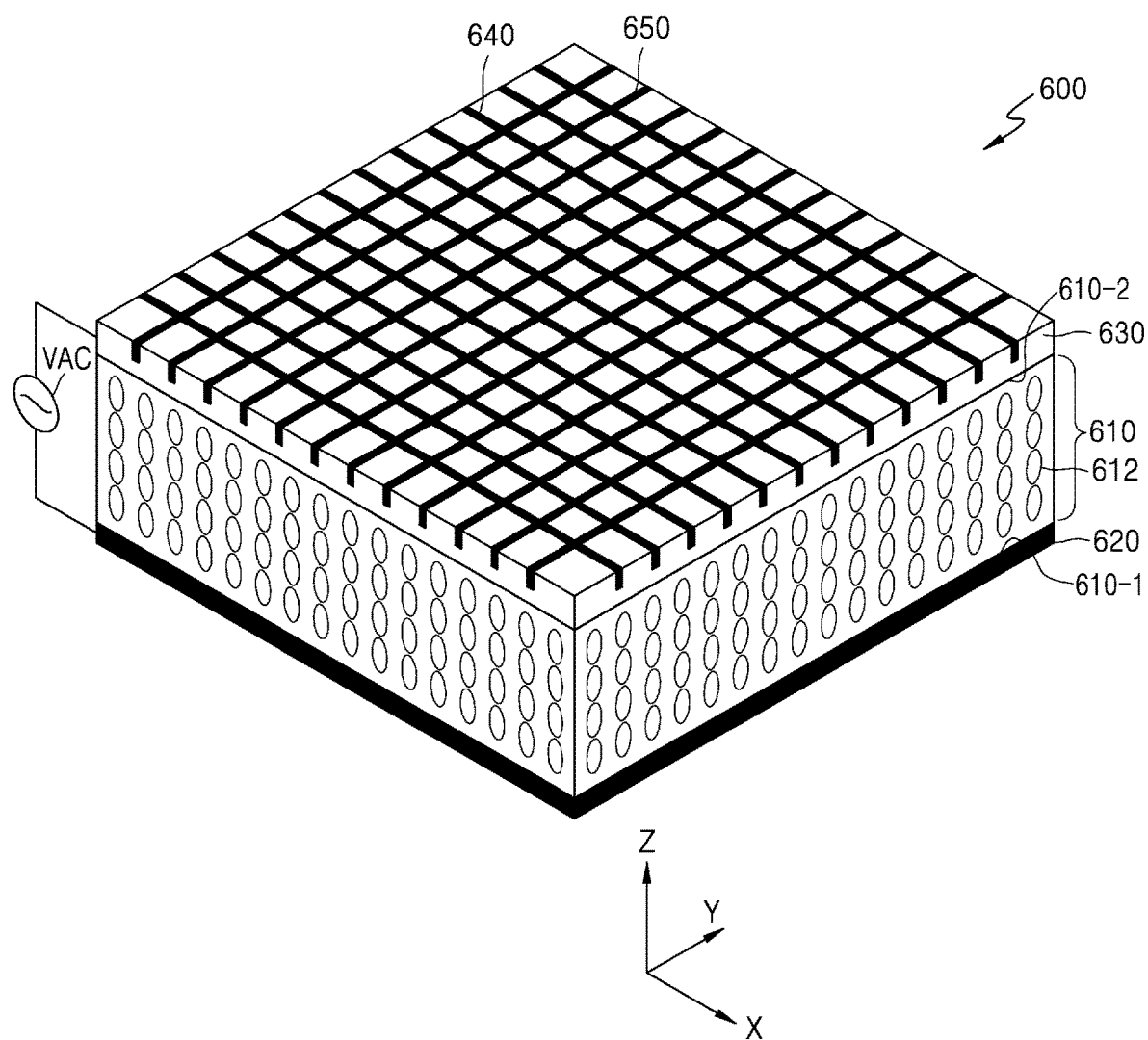
FIG. 6A is a perspective view of a variable focus lens of an AR device according to an embodiment of the disclosure.

FIG. 6A is a perspective view of a variable focus lens of an AR device according to an embodiment of the disclosure.

Referring to FIG. 6A, the variable focus lens 600 may include a liquid crystal layer 610, a common electrode 620, a transparent film 630, and first and second excitation electrodes 640 and 650. The variable focus lens 600 may further include a transparent layer formed in contact with the lower surface of the common electrode 620.

The variable focus lens 600 may be an electrically tunable liquid crystal lens capable of adjusting the refractive index of light by changing an arrangement angle of liquid crystal molecules 612 based on a control voltage applied from a power supply VAC through the first and second excitation electrodes 640 and 650. In an embodiment of the disclosure, the variable focus lens 600 may include an electro-optic material having a pixel grid. A pixel may be arranged in a matrix of N rows and M columns. Each N×M pixel may accommodate a set of possible gray levels independent of all other pixels.

The liquid crystal layer 610 may be an electro-optical layer including a plurality of liquid crystal molecules 612. The liquid crystal layer 610 may be an electro-optical layer of which a property of a liquid crystal changes by the applied control voltage. In an embodiment of the disclosure, the liquid crystal layer 610 may be configured as a polarization-independent liquid crystal layer (e.g., a cholesteric liquid crystal). In the liquid crystal layer 610, the arrangement angle of the liquid crystal molecules 612 disposed in a specific region within an active region changes by the control voltage applied through the first and second excitation electrodes 640 and 650, and thus the refractive index of the specific region may be locally adjusted.

The common electrode 620 and the first and second excitation electrodes 640 and 650 may receive the control voltage from the power supply VAC and apply the control voltage to the liquid crystal layer 610. The common electrode 620 may be in contact with a first surface 610-1 of the liquid crystal layer 610.

The first and second excitation electrodes 640 and 650 may be disposed in contact with the upper surface of the transparent thin film 630 on a second surface 610-2 opposing the first surface 610-1 of the liquid crystal layer 610. Each of the first and second excitation electrodes 640 and 650 may be respectively oriented in a direction orthogonal along the X-axis and Y-axis directions on the upper surface of the transparent thin film 630. Each of the first array excitation electrode 640 and the second array excitation electrode 650 may include the parallel strip of a conductive material extending over the active region. In an embodiment of the disclosure, the first array excitation electrode 640 and the second array excitation electrode 650 may include a transparent conductive material such as indium tin oxide (ITO).

The pixel may be defined by a region at which the strip of the first array excitation electrode 640 and the strip of the second array excitation electrode 650 overlap. The center-to-center distance between the strip of the first array excitation electrode 640 and the strap of the second array excitation electrode 650 may define the pitch of a pixel array, and the width of the strip defines may define the size of the pixel.

The processor 160 (see FIGS. 2 and 3) may control to apply a control voltage waveform having a phase modulation profile to each of the first array excitation electrode 640 and the second array excitation electrode 650 through the power supply VAC and modulate the control voltage applied to each of the first array excitation electrode 640 and the second array excitation electrode 650. The processor 160 may simultaneously control to modulate the control voltage waveforms applied to the first array excitation electrode 640 and the second array excitation electrode 650 to generate a specific phase modulation profile in the liquid crystal layer 610.

Because the control voltage having a waveform modulated by the processor 160 is applied, the refractive power of the variable focus lens 600 may be locally adjusted in the specific region within the active region by a phase modulation profile of the applied control voltage. The variable focus lens 600 may function as a lens in which vergence is adjusted according to the adjusted refractive power. Here, the vergence is an index indicating a degree of convergence or divergence of light and may be adjusted according to the refractive power of the variable focus lens 600. In an embodiment of the disclosure, the variable focus lens 600 may adjust the vergence by adjusting the refractive power of the lens to change a ray of light or a light path.

The processor 160 may change a focal length by adjusting the vergence of a specific region of the variable focus lens 600, that is, a focus adjustment region. A specific method of determining the position of a specific region 612A (see FIG. 6B) of the variable focus lens 600 and adjusting the refractive power of the specific region 612A will be described in detail with reference to FIG. 6B.

Figure 6B:
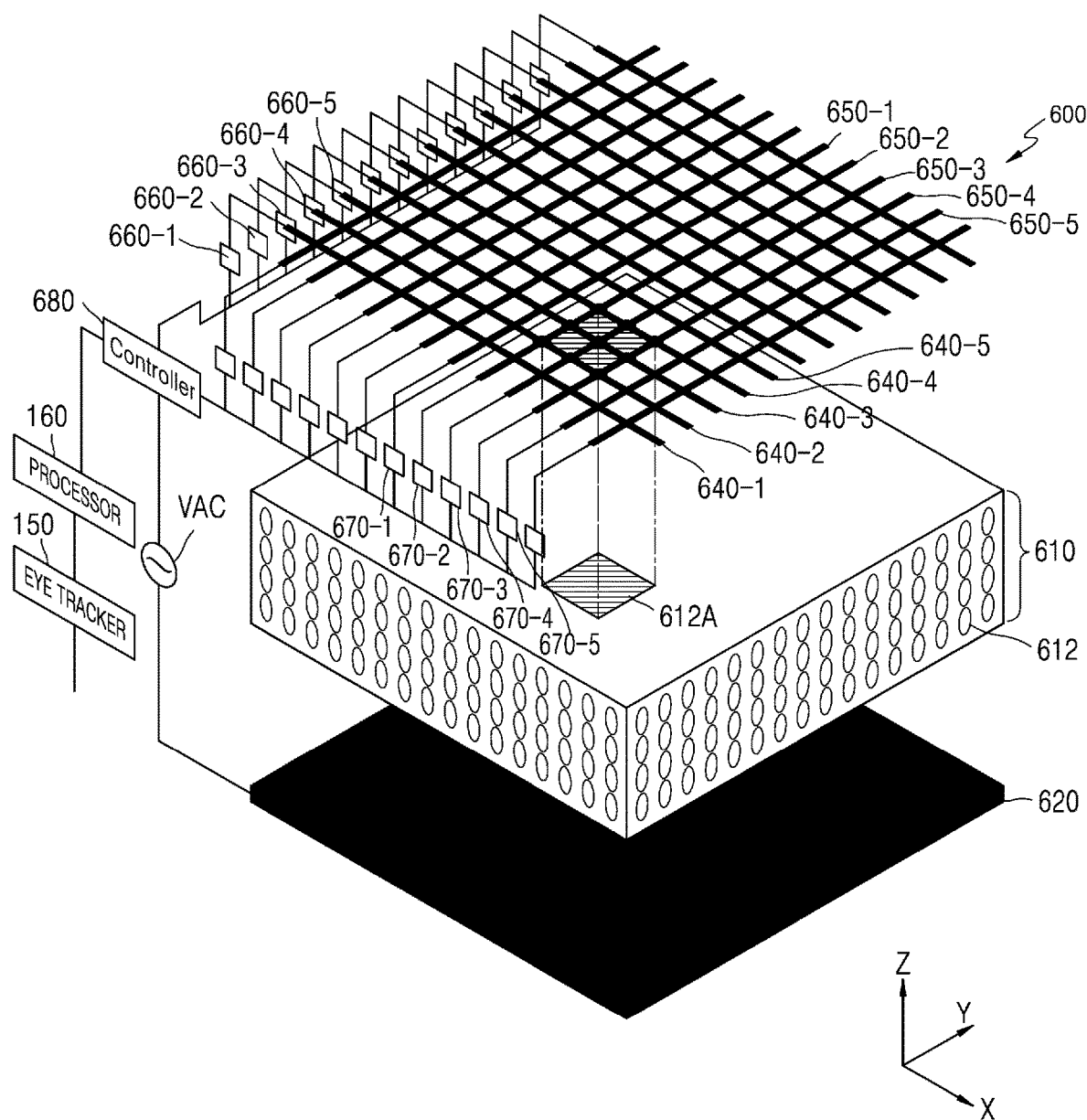
FIG. 6B is a perspective view for describing a method, performed by a variable focus lens of an AR device, of adjusting the refractive power of a focus adjustment region according to an embodiment of the disclosure.

FIG. 6B is a perspective view for describing a method, performed by the variable focus lens of an AR device, of adjusting the refractive power of a focus adjustment region according to an embodiment of the disclosure. In FIG. 6B, the variable focus lens 600 may include the first variable focus lenses 110-1 and 110-2 (see FIG. 2) or the second variable focus lenses 120-1 and 120-2 (see FIG. 2) of the left or right eye.

Referring to FIG. 6B, the variable focus lens 600 may include the liquid crystal layer 610, the common electrode 620, a plurality of first array excitation electrodes 640-1, 640-2, 640-3, 640-4, and 640-5, and a plurality of second array excitation electrodes 650-1, 650-2, 650-3, 650-4, and 650-5. In FIG. 6B, unlike the case of FIG. 6A, the transparent thin film 630 is not illustrated for convenience of description.

The plurality of first array excitation electrodes 640-1 to 640-5 may be arranged along the X axis direction, and the plurality of second array excitation electrodes 650-1 to 650-5 may be arranged along the Y axis direction. The plurality of first array excitation electrodes 640-1 to 640-5 and the plurality of second array excitation electrodes 650-1 to 650-5 may be arranged to be orthogonal to each other.

A plurality of first driver terminals 660-1, 660-2, 660-3, 660-4, and 660-5 that control a control voltage applied to the plurality of first array excitation electrodes 640-1 to 640-5 from the power supply VAC may be connected to each of the plurality of first array excitation electrodes 640-1 to 640-5. A plurality of second driver terminals 670-1, 670-2, 670-3, 670-4, and 670-5 that control a control voltage applied to the plurality of second array excitation electrodes 650-1 to 650-5 from the power supply VAC may be connected to each of the plurality of second array excitation electrodes 650-1 to 650-5.

A controller 680 for controlling operations of the variable focus lens 600 may be connected to the plurality of first driver terminals 660-1 to 660-5, the plurality of second driver terminals 670-1 to 670-5, and the power supply VAC.

The controller 680 may control the control voltage applied to the plurality of first array excitation electrodes 640-1 to 640-5 and the plurality of second array excitation electrodes 650-1 to 650-5 by controlling the plurality of first driver terminals 660-1 to 660-5 and the plurality of second driver terminals 670-1 to 670-5. Accordingly, the arrangement angle of liquid crystal molecules disposed in a specific region may be controlled. in an embodiment, the variable focus lens 600 may not include the plurality of first driver terminals 660-1 to 660-5 and the plurality of second driver terminals 670-1 to 670-5 and the controller 680 may be directly connected to the plurality of first array excitation electrodes 640-1 to 640-5 and the plurality of second array excitation electrodes 650-1 to 650-5.

The controller 680 may receive view information including an eye vector value indicating the direction of view of the user's eye and the direction information of a vector from the processor 160 and determine the position of the region A 612A of which focus is to be adjusted based on the view information received from the processor 160. In an embodiment of the disclosure, the eye tracker 150 may obtain the eye vector by tracking the direction of view of the user's eye and provide the obtained eye vector to the processor 160. The processor 160 may calculate a position coordinate value with respect to a region at which the view arrives in the entire region of the variable focus lens 600 based on the vector direction of the eye vector and provide information about the position coordinate value to the controller 680. The controller 680 may determine the region A 612A, which is a target region of which focus is to be adjusted, based on the position coordinate value obtained from the processor 160.

In the embodiment of the disclosure shown in FIG. 6B, to change the arrangement angle of liquid crystal molecules disposed in the region A 612A among the plurality of liquid crystal molecules 612 included in the liquid crystal layer 610, the controller 680 may control voltages to be applied to a 1-2th excitation electrode 640-2, a 1-3th excitation electrode 640-3, and a 1-4th excitation electrode 640-4 among the plurality of first array excitation electrodes 640-1 to 640-5 and a 2-2th excitation electrode 650-2, a 2-3th excitation electrode 650-3, and a 2-4th excitation electrode 650-4 among the plurality of second array excitation electrodes 650-1 to 650-5. In an embodiment of the disclosure, the controller 680 may control the voltages to be applied to the 1-2th excitation electrode 640-2, the 1-3th excitation electrode 640-3, and the 1-4th excitation electrode 640-4 and the 2-2th excitation electrode 650-2, the 2-3th excitation electrode 650-3, and the 2-4th excitation electrode 650-4 by the power supply VAC by controlling a 1-2th driver terminal 660-2 to a 1-4th driver terminal 660-4 and a 2-2th driver terminal 670-2 to a 2-4th driver terminal 670-4. In this configuration, the controller 680 may control voltages not to be applied to a 1-1th excitation electrode 640-1 and a 1-5th excitation electrode 640-5 by controlling a 1-1th driver terminal 660-1 and a 1-5th driver terminal 660-5 and may control voltages not to be applied to a 2-1th excitation electrode 650-1 and a 2-5th excitation electrode 650-5 by controlling a 2-1th driver terminal 670-1 and a 2-5th driver terminal 670-5.

The controller 680 may control whether to apply the control voltage from the power supply VAC and may control the magnitude of the control voltage applied from the power supply VAC. The controller 680 may control the magnitude of the arrangement angle of the liquid crystal molecules by controlling the magnitude of the applied control voltage. For example, when the controller 680 controls to apply the control voltage to the 1-2th excitation electrode 640-2 by a first magnitude through the control of the 1-2th driver terminal 660-2 and controls to apply the control voltage to the 1-3th excitation electrode 640-3 by a second magnitude greater than the first magnitude through the control of the 1-3th driver terminal 660-3, the arrangement angle of the liquid crystal molecules positioned in a region where the 1-3th excitation electrode 640-3 is disposed in the entire region of the liquid crystal layer 610 may be adjusted to be greater than the arrangement angle of the liquid crystal molecules positioned in a region where the 1-2th excitation electrode 640-2 is disposed.

That is, the controller 680 may determine a region in which the arrangement angle of the liquid crystal molecules 612 changes in the entire region of the liquid crystal layer 610 by modulating the phase profile of the control voltages applied to the plurality of first array excitation electrodes 640-1 to 640-5 and the plurality of second array excitation electrodes 650-1 to 650-5 through the plurality of first driver terminals 660-1 to 660-5 and the plurality of second driver terminals 670-1 to 670-5. Accordingly, the controller 680 may determine the region A 612A of the variable focus lens 600 as a focus adjustment region. In addition, the controller 680 may adjust the refractive power of the focus adjustment region of the variable focus lens 600 by modulating the phase profile of the control voltage and adjusting the arrangement angle of the liquid crystal molecules 612 in the liquid crystal layer 610.

In the above-described embodiment of the disclosure, a method of adjusting the refractive power of the region corresponding to the region A 612A of the variable focus lens 600 by changing the arrangement angle of the liquid crystal molecules 612 disposed in the region A 612A is described. When the variable focus lens 600 is the first variable focus lens 110-1 or 110-2 (see FIG. 2) of the left eye or the right eye, a region for adjusting the refractive power in the second variable focus lens 120-1 or 120-2 (see FIG. 2). That is, the focus control region, may be determined differently according to the direction of view. For example, when the region A 612A is determined as the focus adjustment region in the first variable focus lens, a region aligned with the position of the region A 612A of the first variable focus lens along the direction of view in the entire region of the second variable focus lens may be determined as the focus adjustment region. In an embodiment of the disclosure, information about the direction of view may be obtained from the eye tracker 150. The processor 160 may use the information about the direction of view information obtained from the eye tracker 150 to determine the position of the region aligned with the region A 612A of the first variable focus lens along the direction of view in the entire region of the second variable focus lens.

In the embodiment of the disclosure illustrated in FIG. 6B, when the variable focus lens 600 is the second variable focus lens, the region aligned with the region A of the region 612A along the direction of view may be a region at which the 1-3th excitation electrode 640-3 to the 1-5th excitation electrode 640-5 and the 2-1th excitation electrode 650-1 to the 2-3th excitation electrode 650-3 intersect. To change the arrangement angle of the liquid crystal molecules arranged in the region aligned with the region A of the region 612A along the direction of view among the plurality of liquid crystal molecules 612 included in the liquid crystal layer 610, the controller 680 may control voltages to be applied to the 1-3th excitation electrode 640-3, the 1-4th excitation electrode 640-4, and the 1-5th excitation electrode 640-5 among the plurality of first array excitation electrodes 640-1 to 640-5 and the 2-1th excitation electrode 650-1, the 2-2th excitation electrode 650-2, and the 2-3th excitation electrode 650-3 among the plurality of second array excitation electrodes 650-1 to 650-5. In an embodiment of the disclosure, the controller 680 may control the voltages to be applied to the 1-3th excitation electrode 640-3, the 1-4th excitation electrode 640-4, and the 1-5th excitation electrode 640-5 and the 2-1th excitation electrode 650-1, the 2-2th excitation electrode 650-2, and the 2-3th excitation electrode 650-3 by the power supply VAC by controlling the 1-3th driver terminal 660-3 to the 1-5th driver terminal 660-5 and the 2-1th driver terminal 670-1 to the 2-3th driver terminal 670-3, based on the information about the direction of view received from the processor 160. In this case, the controller 680 may control voltages not to be applied to the 1-1th excitation electrode 640-1 and the 1-2th excitation electrode 640-2 by controlling a 1-1th driver terminal 660-1 and a 1-2th driver terminal 660-2 and may control voltages not to be applied to the 2-4th excitation electrode 650-4 and the 2-5th excitation electrode 650-5 by controlling a 2-4th driver terminal 670-4 and a 2-5th driver terminal 670-5.

By using the above-described method, the controller 680 may determine the positions of the region A 612A of the first variable focus lens and the focus adjustment region of the second variable focus lens and adjust the refractive power of the determined focus adjustment region. A specific method of determining positions of the first focus adjustment region of the first variable focus lens and the second focus adjustment region of the second variable focus lens according to the direction of view will be described in detail with reference to FIGS. 11A and 11B.

Figure 7A:
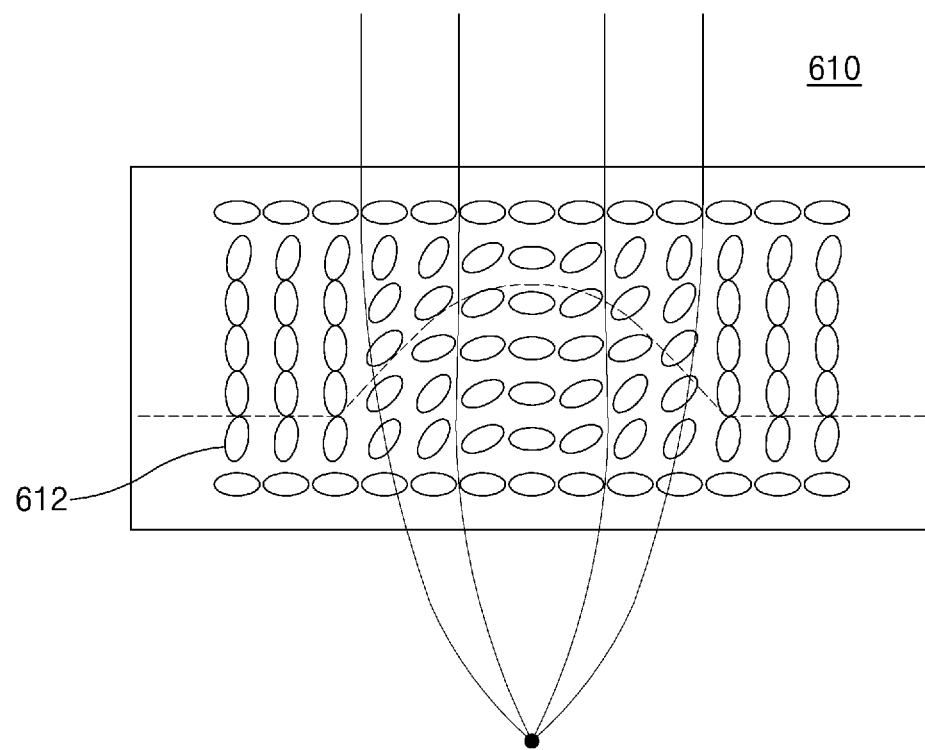
FIG. 7A is a diagram for describing concept of vergence of a variable focus lens of an AR device according to an embodiment of the disclosure.

FIG. 7A is a conceptual diagram illustrating vergence formation of the variable focus lens of an AR device according to an embodiment of the disclosure.

Figure 7B:
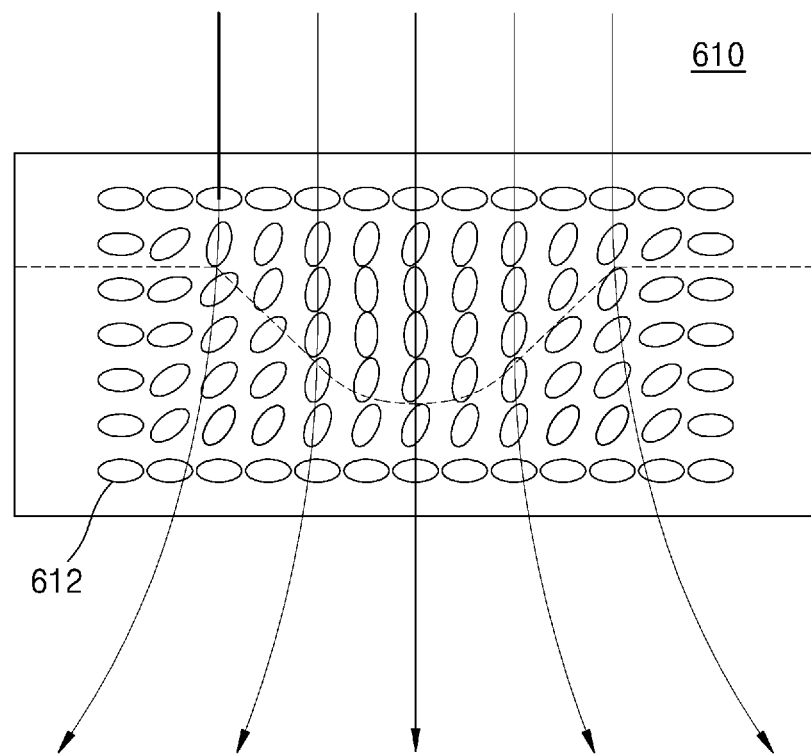
FIG. 7B is a diagram for describing concept of vergence of a variable focus lens of an AR device according to an embodiment of the disclosure.

Referring to FIGS. 7A and 7B, because a control voltage modulated to have a specific phase profile is applied to the liquid crystal layer 610 of the variable focus lens 600, the arrangement angle of the liquid crystal molecules 612 disposed at a specific position in an active region may change. Because the arrangement angle of the liquid crystal molecules 612 disposed at the specific region of the liquid crystal layer 610 changes, the refractive index of light passing through the liquid crystal molecules 612 may change. When the refractive index of the light changes, the refractive power of the variable focus lens 600 changes, and the path of the light passing through the variable focus lens 600 changes, and thus a vergence may change. The vergence is an index indicating a degree by which the light passing through the variable focus lens 600 converges or diverges. The vergence may be adjusted according to the refractive power of the variable focus lens 600.

In the embodiment of the disclosure shown in FIG. 7A, light passing through a region in which the alignment angle of the liquid crystal molecules 612 included in the liquid crystal layer 610 changes may form a positive vergence, and thus the variable focus lens 600 may perform functionality similar to the function of a convex lens. When the positive vergence is formed, a focal length may be reduced.

FIG. 7B is a conceptual diagram illustrating vergence formation of the variable focus lens of an AR device according to an embodiment of the disclosure.

In the embodiment of the disclosure shown in FIG. 7B, light passing through a region in which the rotation angle of the liquid crystal molecules 612 included in the liquid crystal layer 610 changes may form a negative vergence, and thus the variable focus lens 600 may perform functionality similar to the function of a concave lens. When the negative vergence is formed, the focal length may increase.

Figure 8:
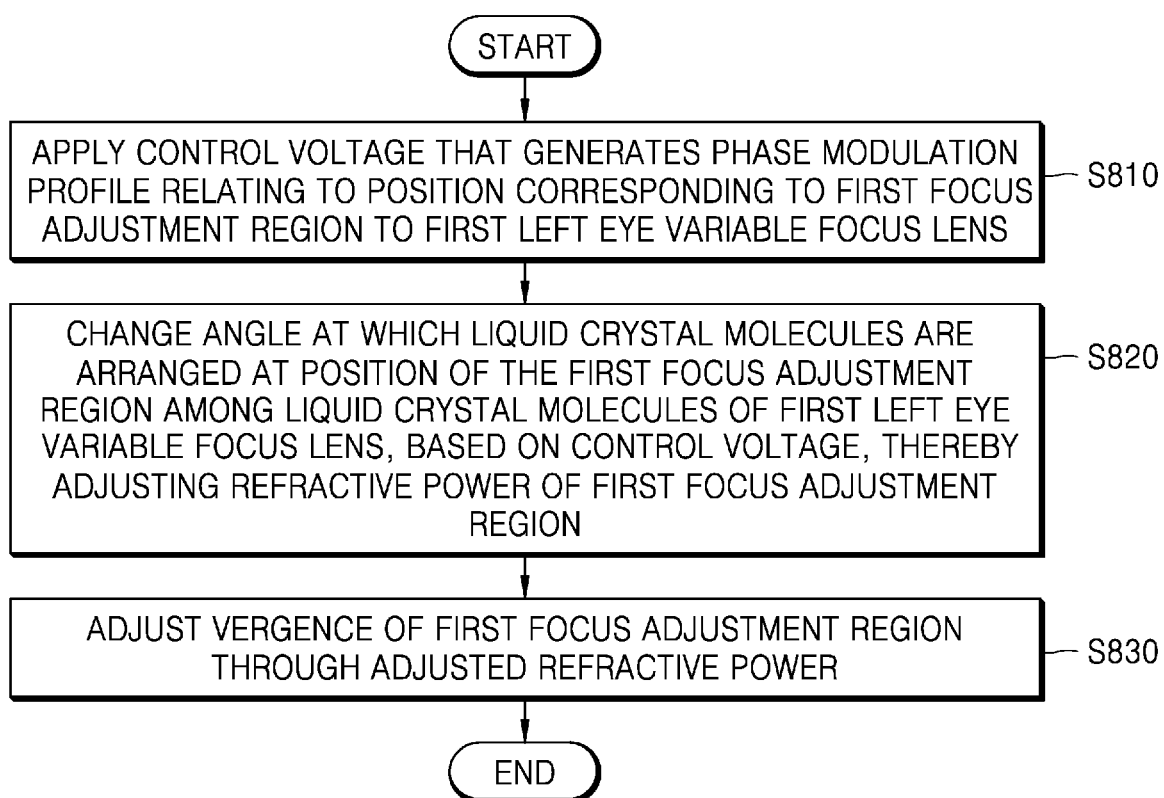
FIG. 8 is a flowchart illustrating a method, performed by an AR device, of adjusting the refractive power of a variable focus lens to change a focal length according to an embodiment of the disclosure.

FIG. 8 is a flowchart illustrating a method performed by an AR device of adjusting the refractive power of a variable focus lens and changing a focal length according to an embodiment of the disclosure.

In operation S810, the AR device may apply a control voltage that generates a phase modulation profile relating to a position corresponding to a first focus adjustment region to a first left eye variable focus lens. In an embodiment of the disclosure, the processor 160 (see FIG. 6B) of the AR device may calculate a position coordinate value with respect to a region where the view of the user's eyes reach in the entire region of the variable focus lens, based on an eye vector obtained by the eye tracker 150 (see FIG. 6B). The processor 160 may provide the calculated position coordinate value to the controller 680 (see FIG. 6B) of the variable focus lens, and the controller 680 may determine the position of a first focus adjustment region that is a target region of which focus is to be adjusted based on the position coordinate value.

The controller 680 may control to apply a control voltage waveform having a phase modulation profile to each of the plurality of first array excitation electrodes 640-1 to 640-5 (see FIG. 6B) and the plurality of second array excitation electrodes 650-1 to 650-5 (see FIG. 6B) through the power supply VAC (see FIGS. 6A and 6B) and modulate the control voltage applied to each of the plurality of first array excitation electrodes 640-1 to 640-5 and the plurality of second array excitation electrodes 650-1 to 650-5. The processor 160 may modulate the control voltage through the controller 680 such that, among pixels formed by overlapping the plurality of first array excitation electrodes 640-1 to 640-5 and the plurality of second array excitation electrodes 650-1 to 650-5, the pixels disposed in a region corresponding to the first focus adjustment region have phase values different from the other pixels.

In operation S820, the AR device may change the angle at which liquid crystal molecules are arranged at the position of the first focus adjustment region among the liquid crystal molecules of the first left eye variable focus lens, based on the control voltage, thereby adjusting the refractive power of the first focus adjustment region. The AR device may apply the control voltage having the phase modulation profile to the first left eye variable focus lens, thereby changing the arrangement angle of the liquid crystal molecules disposed in the region corresponding to the first focus adjustment region among the whole liquid crystal molecules included in a liquid crystal layer. Because the arrangement angle of the liquid crystal molecules in the region corresponding to the first focus adjustment region changes, the refractive power of light passing through the first focus adjustment region may change. The AR device may adjust the refractive power of the first focus adjustment region by adjusting the arrangement angle of the liquid crystal molecules in the region corresponding to the first focus adjustment region.

In operation S830, the AR device may adjust the vergence of the first focus adjustment region through the refractive power. The AR device may adjust the path of the light by adjusting the refractive power of the first focus adjustment region, thereby adjusting a degree of convergence or divergence of the light. In an embodiment of the disclosure, the AR device may adjust the refractive power of the first focus adjustment region in a positive or negative direction, thereby correspondingly reducing or increasing a focal length, which is the distance of an image formed on the retina by passing through the lens of the eye. When the refractive power is adjusted such that the first focus adjustment region has a positive vergence, the first focus adjustment region may perform functionality that is similar to a function of a convex lens. When the refractive power is adjusted such that the first focus adjustment region has a negative vergence, the first focus adjustment region may perform functionality that is similar to a function of a concave lens.

In an embodiment of the disclosure, the refractive power of the first focus adjustment region may be adjusted in the negative direction to form the negative vergence. In this case, the focal length of a virtual object output to the user's eye through the left eye waveguide 130-1 may increase.

The method of adjusting the vergence of the first focus adjustment region described with reference to FIG. 8 may also be applied to a first right eye variable focus lens. The AR device of the disclosure may adjust the refractive power of a third focus adjustment region of the first right eye variable focus lens by using the method illustrated in FIG. 8, thereby adjusting the vergence of the third focus adjustment region.

Figure 9:
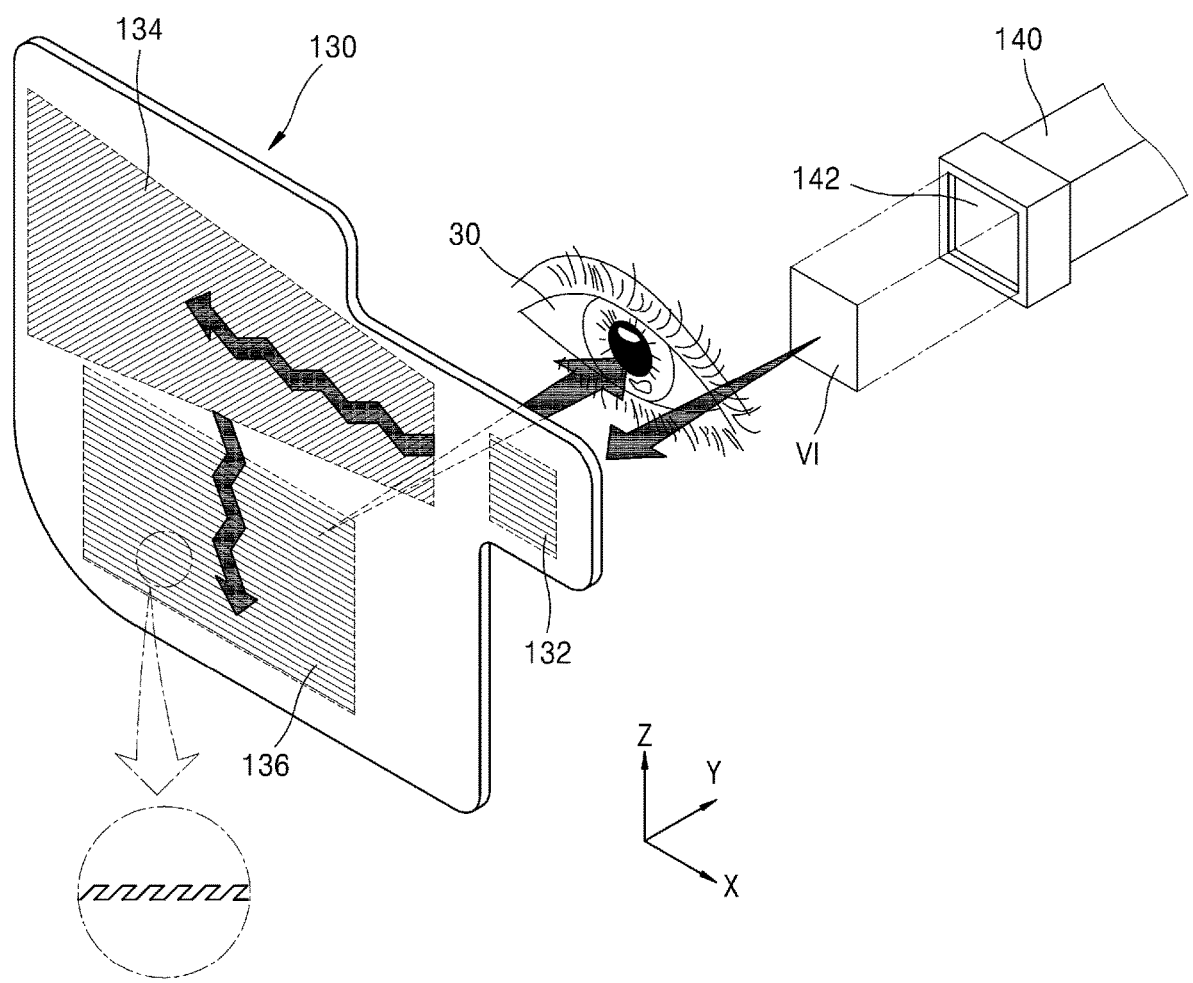
FIG. 9 is a perspective view illustrating a waveguide and a display module of an AR device according to an embodiment of the disclosure.

FIG. 9 is a perspective view illustrating the waveguide and the display module of an AR device according to an embodiment of the disclosure.

Referring to FIG. 9, when a user wears the AR device, the waveguide 130 may include a transparent material in which a partial region of a rear side is visible. The rear side of the waveguide 130 refers to a surface that the user's eye face when the user wears the AR device, and the front side of the waveguide 130 refers to a surface (i.e., a side far from the user's eye) opposite to the rear side.

The waveguide 130 may be configured as a flat plate of a single layer or multilayer structure of the transparent material through which light may be reflected therein and propagated. The waveguide 130 may include a first region 132 in which light of a virtual image VI projected by facing an emission surface 142 of the display module 140 is received, a second region 134 in which the light of the virtual image VI incident on the first region 132 propagates, and a third region 136 that outputs the light of the virtual image VI propagated in the second region 134 to the direction of the user's eye. Here, the transparent material may be a material through which light may pass, and transparency thereof may not be 100% and may have a predetermined color or tint.

In an embodiment of the disclosure, because the waveguide 130 includes the transparent material, the user may view the virtual object of the virtual image VI through the AR device and also view an external scene. Thus, the waveguide 130 may be referred to as a see through display. AR may be implemented by outputting the virtual object of the virtual image VI through the waveguide 130.

A diffraction grating may be formed in the first region 132, the second region 134, and the third region 136 to change the light path of the light of the virtual image VI. The waveguide 130 may use the diffraction grating formed in the first region 132, the second region 134, and the third region 136 to change the propagation path of the light of the virtual image VI, and may perform the function of a light guide plate such that the light of the virtual image VI reflected through the third region 136 may be output to the user's eyes.

A diffraction grating may be formed in the first region 132 to couple the light of the virtual image VI incident from the emission surface 142 of the display module 140 and transmit the light in the X-axis direction. The display module 140 may be disposed such that the emitted light is perpendicular to the first region 132 or is incident to be inclined at a predetermined angle. The arrangement direction of the display module 140 may vary according to the pattern of the diffraction grating of the first region 132.

The second region 134 may be spaced apart in the X-axis direction with respect to the first region 132. A diffraction grating may be formed in the second region 134 to propagate at least a part of the light received from the first region 132 downward along the Z-axis direction. When the waveguide 130 is formed in a single layer structure, the diffraction grating of the second region 134 may be formed on the same plane as the diffraction grating of the first region 132. Alternatively, when the waveguide 130 is formed in a multilayer structure, the diffraction grating of the second region 134 may be formed on a layer different from the layer on which the diffraction grating of the first region 132 is formed. The light incident on the first region 132 may propagate by being reflected between the front and rear sides of the waveguide 130.

The third region 136 may be spaced apart downward in the Z-axis direction with respect to the second region 134. A diffraction grating may be formed in the third region 136 such that at least a part of the light propagated from the second region 134 is output in a two-dimensional (2D) plane. When the waveguide 130 is formed in a single layer structure, the diffraction grating of the third region 136 may be formed on the same plane as the diffraction gratings of the first region 132 and the second region 134. Alternatively, when the waveguide 130 is formed in a multilayer structure, the diffraction grating of the third region 136 may be formed on a layer different from the layer on which the diffraction grating of the second region 134 is formed and may be formed on the same layer as or a layer different from the diffraction grating of the first region 132.

The diffraction grating of the first region 132 may have a different pattern from the grating of the second region 134 and the diffraction grating of the third region 136.

The display module 140 may couple the virtual image VI generated by the processor 160 (see FIGS. 2 and 3) with light to project the coupled virtual image VI onto the waveguide 130 through the emission surface 142. The display module 140 of the disclosure may perform the same function as a projector.

The display module 140 may further include an illumination optical system, a light path converter, an image panel, a beam splitter, and a projection optical system.

The illumination optical system is an optical element that illuminates light and may include a light source and lenses. The light source is an element that generates light by adjusting the color of RGB and may be configured as, for example, a light emitting diode (LED).

The image panel may be a reflective image panel that reflects and modulates the light illuminated by the light source into light including a 2D image. The reflective image panel may be, for example, a digital micromirror device (DMD) panel or a liquid crystal on silicon (LCoS) panel, or another known reflective image panel. The DMD panel may operate using a digital light processing (DLP) method of illuminating the RGB of the light output from the light source with a plurality of mirrors each having a pixel size, switching each of the plurality of mirrors on and off, and mixing the RGB of the light to project the virtual image VI. The LCoS panel may operate using a liquid crystal display (LCD) method of separating the light output from the light source into RGB through a mirror that passes only light of a specific wavelength, inputting the light to the image panel, and projecting the virtual image VI generated by mixing the RGB.

The beam splitter may be disposed between the image panel and the projection optical system. The beam splitter may be configured to reflect the light output from the light source and transmit the light reflected by the image panel.

The projection optical system is an element that projects light including the image reflected by the image panel onto the waveguide 130 and may include a single or a plurality of projection lenses. In the embodiment of the disclosure shown in FIG. 9, the projection surface of the projection optical system refers to the emission surface 142 of the outermost projection lens of a single or a plurality of projection lenses.

The display module 140 may obtain image data constituting the virtual image VI from the processor 160 (see FIGS. 2 and 3), generate the virtual image VI based on the obtained image data, and couple the virtual image VI with the light output from the light source to the coupled virtual image VI onto the waveguide 130 through the emission surface 142. In an embodiment of the disclosure, the processor 160 may provide the display module 140 with the image data including RGB color and luminance values of the plurality of pixels constituting the virtual image VI. The display module 140 may project light of the virtual image VI onto the waveguide 130 by performing image processing by using the RGB color value and the luminance value of each of the plurality of pixels and controlling the light source.

In an embodiment of the disclosure, the display module 140 may generate the virtual image VI using image data stored in the storage 190 (see FIG. 3), couple the virtual image VI with light by controlling a light source, and project the light of the virtual image VI onto the waveguide 130.

Figure 10A:
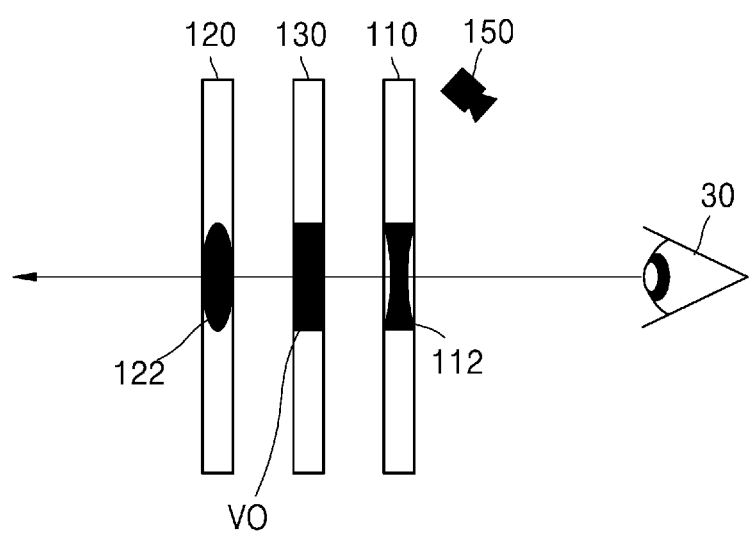
FIG. 10A is a diagram illustrating a method, performed by an AR device, of changing a position of a focus adjustment region of a variable focus lens according to a direction of a user's view according to an embodiment of the disclosure.

FIG. 10A is a diagram illustrating a method performed by an AR device of changing a position of a focus adjustment region of a variable focus lens according to a direction of the user's view according to an embodiment of the disclosure.

Figure 10B:
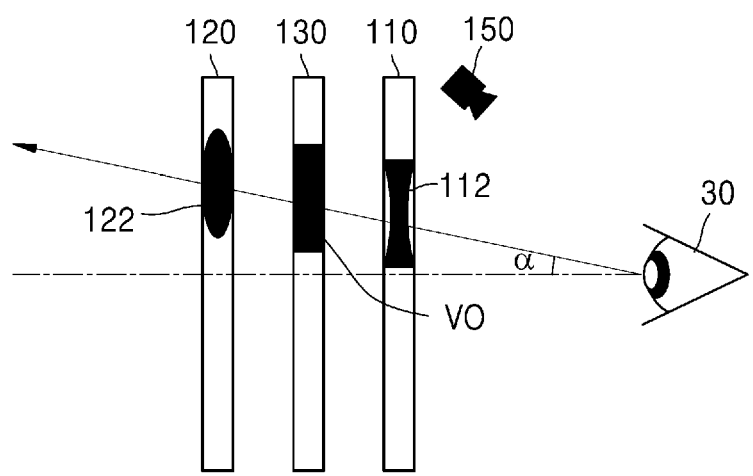
FIG. 10B is a diagram illustrating a method, performed by an AR device, of changing a position of a focus adjustment region of a variable focus lens according to a direction of a user's view according to an embodiment of the disclosure.

FIG. 10B is a diagram illustrating a method performed by an AR device of changing a position of a focus adjustment region of a variable focus lens according to a direction of the user's view according to an embodiment of the disclosure.

In FIGS. 10A and 10B, the first variable focus lens 110 may include the first focus adjustment region 112, and the second variable focus lens 120 may include the second focus adjustment region 122. The waveguide 130 may be disposed between the first variable focus lens 110 and the second variable focus lens 120 and project light or a virtual object VO of a virtual image. The virtual object VO may be a virtual object displayed on a partial region of the virtual image.

Referring to FIG. 10A, the AR device may determine positions of the first focus adjustment region 112, the second focus adjustment region 122, and the virtual object VO according to the direction of the user's view. In an embodiment of the disclosure, the eye tracker 150 of the AR device may obtain an eye vector indicating the direction of view by tracking the position and direction of the user's eye 30. The eye tracker 150 may provide the eye vector to the processor 160 (see FIGS. 2 and 3), and the processor 160 may determine the positions of the first focus adjustment region 112 and the second focus adjustment region 122 such that the first focus adjustment region 112 and the second focus adjustment region 122 are aligned according to the direction of the eye vector. In an embodiment of the disclosure, the processor 160 may obtain a 2D position coordinate value of a region at which the eye vector arrives in the entire region of the first variable focus lens 110, and determine the position of the first focus adjustment region 112 based on the obtained 2D position coordinate value. Similarly, the processor 160 may obtain the 2D position coordinate value of a region at which the eye vector arrives in the entire region of the second variable focus lens 120, and determine the position of the second adjustment region 122 based on the obtained 2D position coordinate value. The processor 160 may determine a position at which the virtual object VO, which provides information related to a real world object in the virtual image, is displayed such that the virtual object VO is aligned with the first focus adjustment region 112 and the second focus adjustment region 122 along the direction of the eye vector.

Referring to FIG. 10B, the AR device may change the positions of the first focus adjustment region 112 and the second focus adjustment region 122 in response to changes of the direction of view of the user. When the user's eye 30 looks in the horizontal direction and looks upward by α° with respect to the horizontal direction, the eye tracker 150 may obtain the eye vector indicating the direction of view by tracking the position of the eye 30 and the direction change and provide the eye vector to the processor 160. The processor 160 may change the positions of the first focus adjustment region 112 and the second focus adjustment region 122 based on the eye vector. In an embodiment of the disclosure, the processor 160 may change the positions of the first focus adjustment region 112 and the second focus adjustment region 122 such that the first focus adjustment region 112 and the second focus adjustment region 122 are aligned according to the direction of the eye vector.

In an embodiment of the disclosure, the AR device may modulate the phase profile of a control voltage by the processor 160 (see FIGS. 2 and 3) and apply the control voltage having the modulated phase profile to the first and second excitation electrodes 640 and 650 (see FIG. 6A), thereby changing the positions of the first focus adjustment region 112 and the second focus adjustment region 122. The first variable focus lens 110 and the second variable focus lens 120 may include partial regions of the entire region where the focus is changed, that is, the first focus adjustment region 112 and the second focus adjustment region 122. The positions of the first focus adjustment region 112 and the second focus adjustment region 122 change according to the direction of the eye vector, and thus the first variable focus lens 110 and the second variable focus lens 120 may perform functionality similar to a function of a moving lens.

Figure 11A:
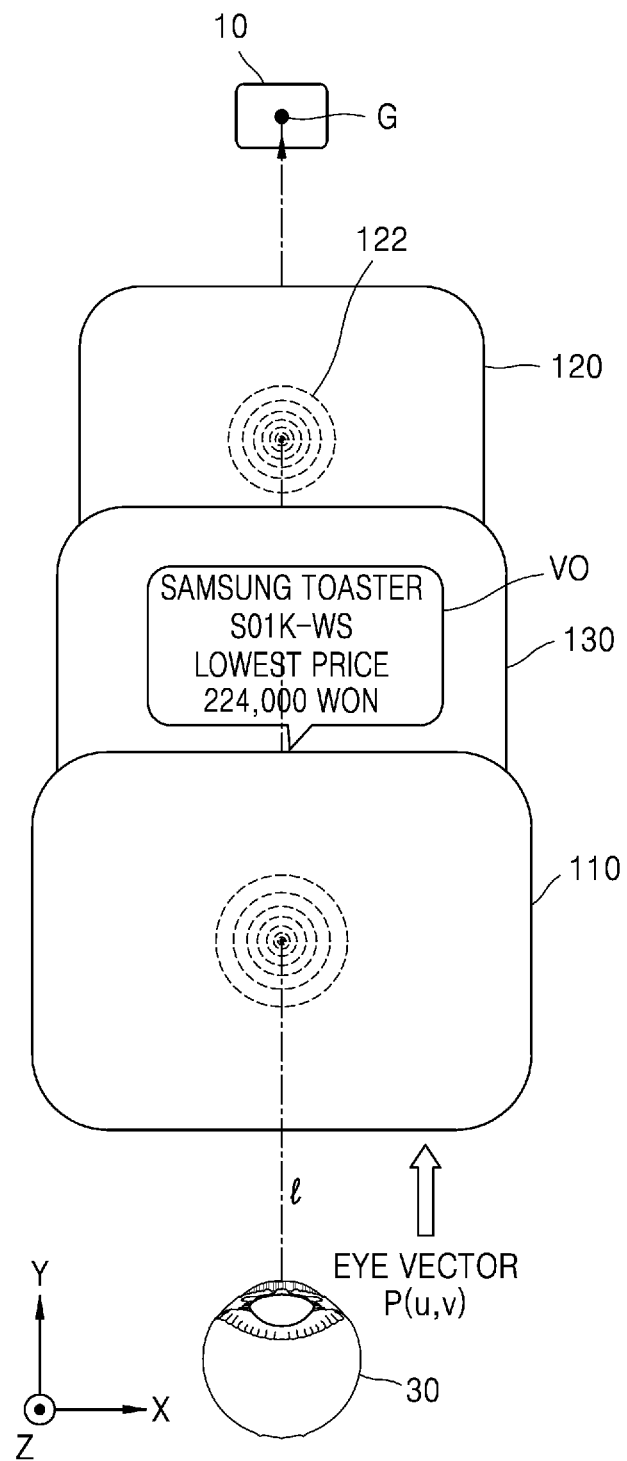
FIG. 11A is a diagram illustrating a method, performed by an AR device, of changing positions of focus adjustment regions of variable focus lenses based on an eye vector according to an embodiment of the disclosure.

FIG. 11A is a diagram illustrating a method performed by an AR device of changing positions of the first focus adjustment region and the second focus adjustment region of the first variable focus lens and the second variable focus lens based on an eye vector according to an embodiment of the disclosure.

Referring to FIG. 11A, the AR device may obtain the eye vector indicating a direction of the user's view as the user is looking at the real world object 10. In an embodiment of the disclosure, an eye tracker may obtain a first eye vector p (u, v) representing the direction of view. The eye tracker may provide the obtained eye vector p (u, v) to the processor 160 (see FIGS. 2 and 3).

The AR device may obtain the gaze point G based on the binocular disparity and the direction of the first eye vector p (u, v). The processor 160 of the AR device may use the first eye vector p (u, v) obtained with respect to the binocular disparity and the left eye and a second eye vector obtained with respect to the right eye to calculate a 3D position coordinate value of the gaze point G. The processor 160 may recognize a virtual line/connecting the gaze point G from the user's eye 30. The processor 160 may obtain coordinate information about a position where the virtual line/meets the first variable focus lens 110 in the entire region of the first variable focus lens 110. The processor 160 may determine a region including the position where the virtual line/meets on the first variable focus lens 110 as the first focus adjustment region 112. The first focus adjustment region 112 may be formed in a circular shape, but is not limited thereto.

The AR device may determine the position of the second focus adjustment region 122 based on the eye vector such that the first focus adjustment region 112 and the second focus adjustment region 122 are aligned in the direction of the first eye vector p (u, v). In an embodiment of the disclosure, the processor 160 may determine the position of the second focus adjustment region 122 such that the first focus adjustment region 112 and the second focus adjustment region 122 are aligned along the virtual line I connecting the first eye vector p (u, v) and the gaze point G. In an embodiment of the disclosure, the first focus adjustment region 112, the second focus adjustment region 122, and the virtual object VO may be aligned along the virtual line I.

The AR device may determine the size of the first focus adjustment region 112 based on the size of the virtual object VO of the virtual image output through the waveguide 130.

In an embodiment of the disclosure, the AR device may determine the size of the second focus adjustment region 122 based on the spaced distance between the first variable focus lens 110 and the second variable focus lens 120. This will be described in detail with reference to FIGS. 15A and 15B.

Figure 11B:
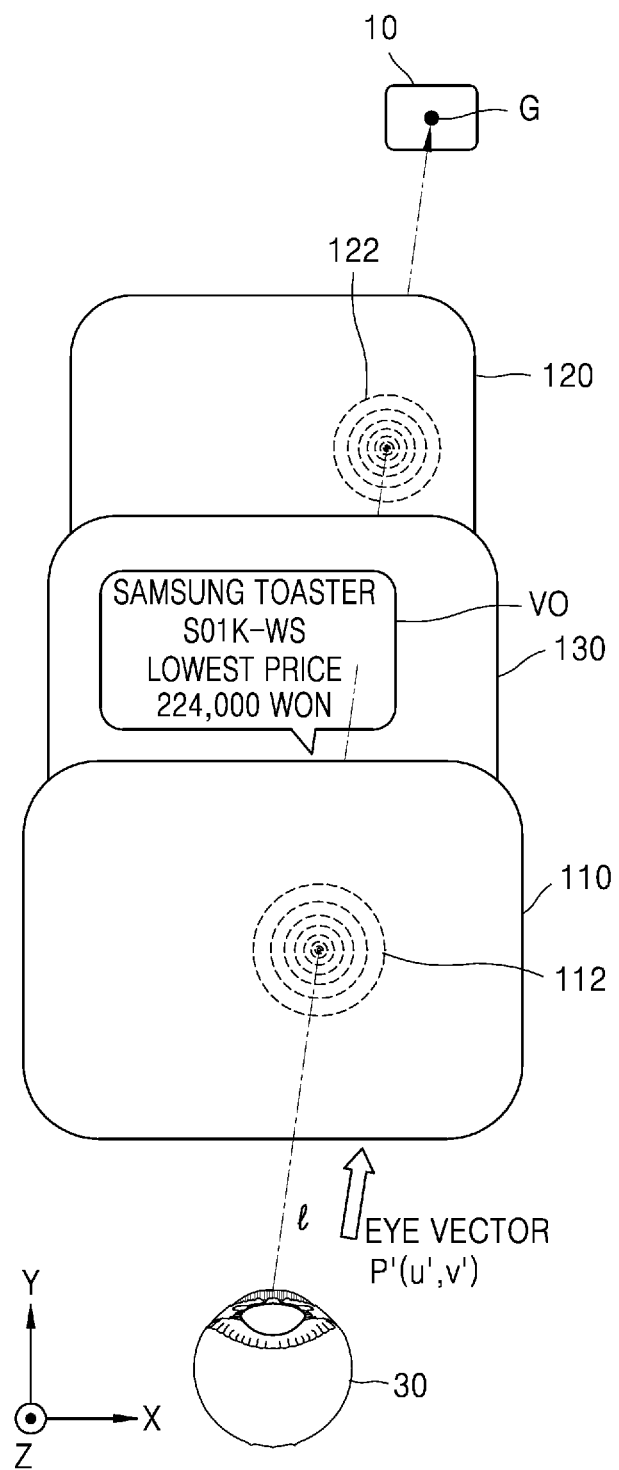
FIG. 11B is a diagram illustrating a method, performed by an AR device, of changing positions of focus adjustment regions of variable focus lenses based on an eye vector according to an embodiment of the disclosure.

FIG. 11B is a diagram illustrating a method performed by an AR device of changing positions of the first focus adjustment region and the second focus adjustment region of the first variable focus lens and the second variable focus lens based on an eye vector according to an embodiment of the disclosure.

Referring to FIG. 11B, when the user looks at the real world object 10 moving in the X-axis direction, the eye tracker may track a direction of the user's view and obtain a changed second eye vector p' (u', v'). The eye tracker may provide the second eye vector p' (u', v') to the processor 160. The processor 160 may change the positions of the first focus adjustment region 112 and the second focus adjustment region 122 based on the changed second eye vector p' (u', v').

The AR device may obtain the gaze point G using the second eye vector p' (u', v') and binocular disparity information. In an embodiment of the disclosure, the processor 160 may recognize the virtual line/connecting the user's eye 30 and the gaze point G and coordinate information about the position where the virtual line/meets the first variable focus lens 110 in the entire region of the first variable focus lens 110. The processor 160 may determine a region including the position where the virtual line/meets on the first variable focus lens 110 as the first focus adjustment region 112. The processor 160 may determine the position of the second focus adjustment region 122 based on the eye vector such that the first focus adjustment region 112 and the second focus adjustment region 122 are aligned in the direction of the second eye vector p' (u', v'). In an embodiment of the disclosure, the processor 160 may determine the positions of the second focus adjustment region 122 such that the first focus adjustment region 112 and the second focus adjustment region 122 are aligned along the virtual line I obtained based on the second eye vector p' (u', v').

Referring to FIGS. 11A and 11B, when the real world object 10 moves, the AR device may change the positions of the first focus adjustment region 112 and the second focus adjustment region 122 based on the eye vector obtained through the eye tracker. In another embodiment of the disclosure, the direction of view may change when the user looks at the other real world object 10, in which case the AR device may track a change in the direction of the eye vector using the eye tracker and change the positions of the first focus adjustment region 112 and the second focus adjustment region 122 according to the change in the direction of the eye vector.

Figure 12A:
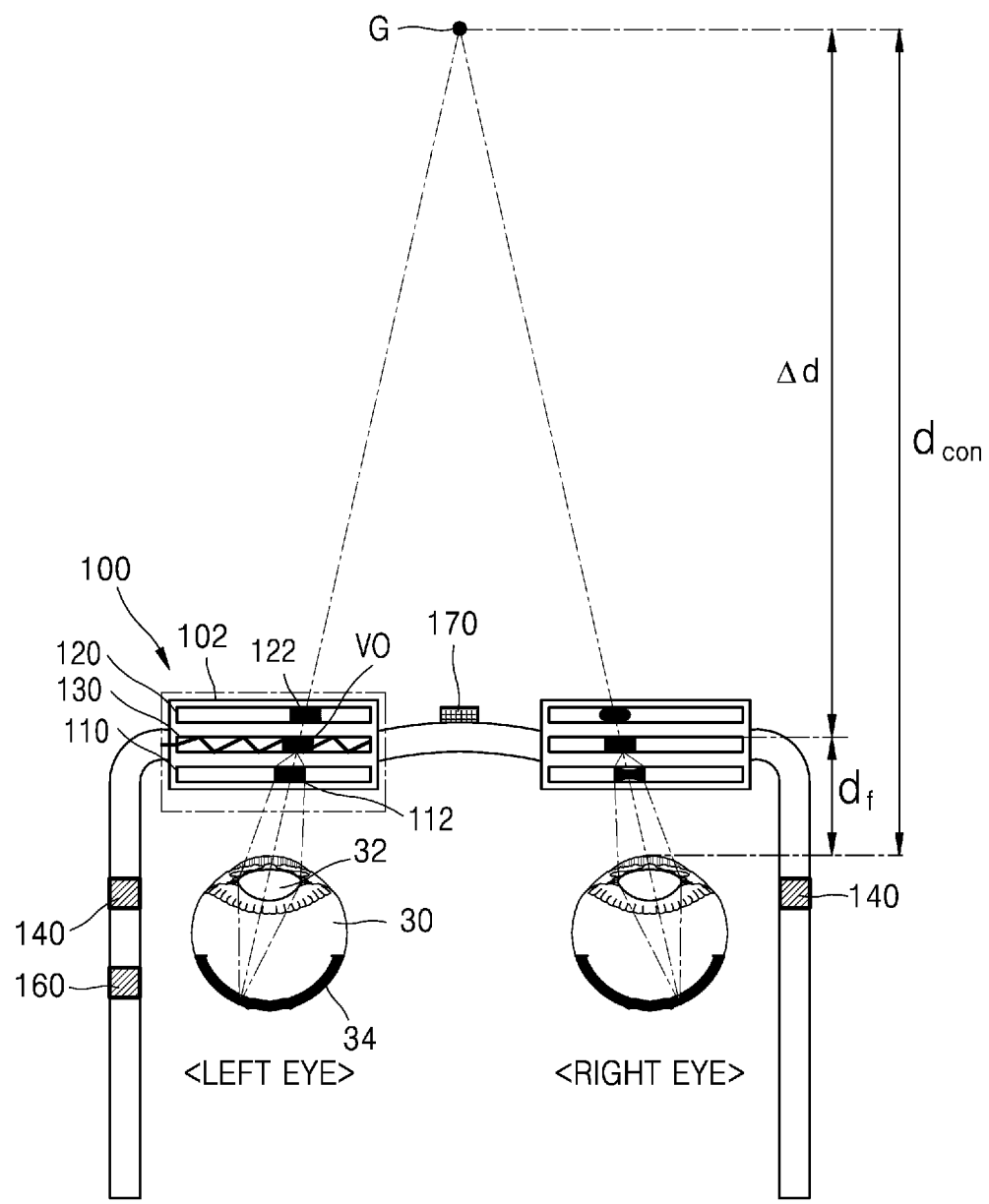
FIG. 12A illustrates a method, performed by an AR device, of adjusting a focal length according to an embodiment of the disclosure.
Figure 12B:
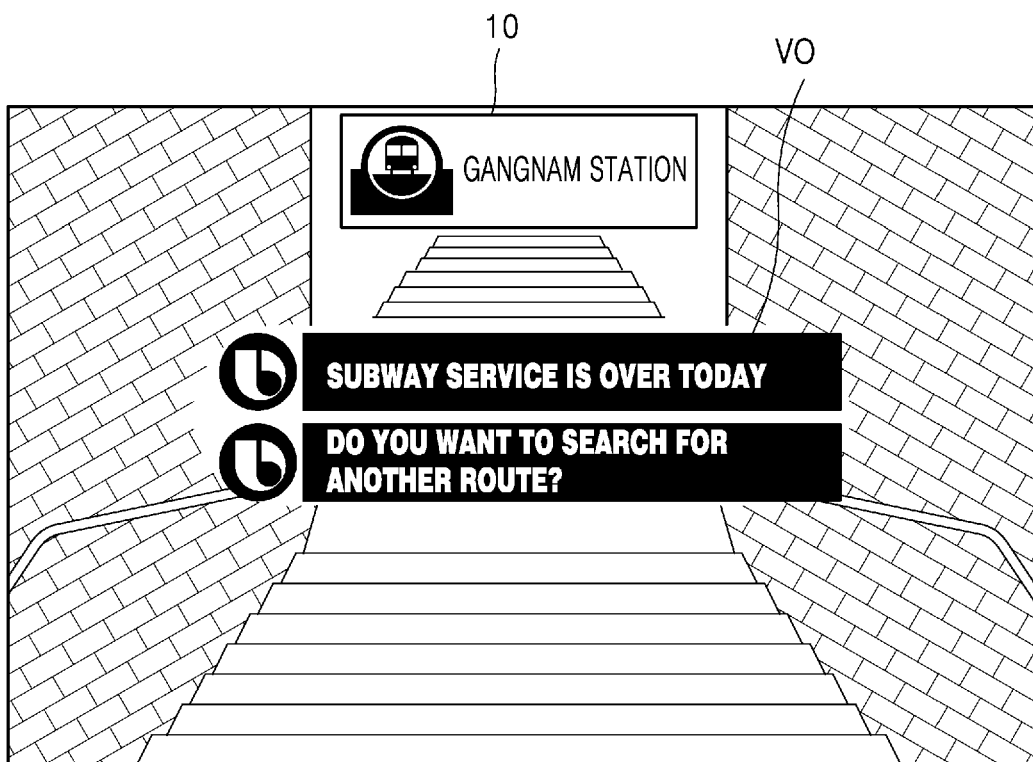
FIG. 12B illustrates a virtual image displayed on a real world object through the AR device according to an embodiment of the disclosure.

FIG. 12A illustrates a method of adjusting a focal length of the AR device according to an embodiment of the disclosure, and FIG. 12B illustrates a virtual image displayed on a real world object through the AR device.

Referring to FIG. 12A, the AR device 100 may project light of the virtual object VO which provides information about the real world object viewed by a user in the virtual image onto the waveguide 130 and adjust the refractive power of the first focus adjustment region 112 of the first variable focus lens 110, thereby adjusting the vergence of the first variable focus lens 110. Because the vergence of the first focus adjustment region 112 is adjusted, the focal length of the virtual object VO may be adjusted.

The AR device 100 may adjust the vergence of the first focus adjustment region 112 by adjusting the refractive power of the first focus adjustment region 112. The vergence is an index indicating a degree to which light passing through the first focus adjustment region 112 converges or diverges. Because the vergence is adjusted, the path of the light incident on the lens 32 changes, and accordingly the position of the focal point on the retina 34 may change. Thus, the focal length may be adjusted.

In the embodiment of the disclosure shown in FIG. 12A, the AR device 100 may adjust the vergence of the first focus adjustment region 112, thereby the focal distance of the virtual object VO displayed through the waveguide 130. The AR device 100 may obtain the gaze point G in which a direction of view of the left eye and a direction of view of the right eye converge using a binocular disparity, the direction of view of the left eye and the direction of view of the right eye, and calculate the vergence distance $d_{con}$ that is a distance between both eyes and the gaze point G using a triangulation method. In an embodiment of the disclosure, the AR device 100 may change the focal length $d_{fi}$ which is a physical distance between the waveguide 130 on which the virtual object VO is displayed and both eyes, based on the vergence distance $d_{con}$. In an embodiment of the disclosure, the processor 160 of the AR device 100 may adjust the vergence of the first focus adjustment region 112 to shift the focal length converged to the virtual object VO through both eyes by Δd such that the focal length is the same as the vergence distance $d_{con}$. Here, the distance Δd is a distance at which the user does not feel dizzy when observing the virtual object VO while wearing the AR device 100, and may be calculated by the processor 160 and stored in the storage 190 (FIG. 3).

In an embodiment of the disclosure, the first focus adjustment region 112 may perform functionality similar to a function of a concave lens that reflects the light path to form a negative vergence, and thus increases the light path passing through the lens 32 and changes the focus position formed on the retina 34. When the negative vergence is formed, the focal length of the virtual object VO may increase. In an embodiment of the disclosure, to compensate for a focus distortion in which the real world object or a physical space looks dim or blurry due to the adjusted refractive power of the first focus adjustment region 112, the AR device 100 may adjust the refractive power of the second focus adjustment region 122 such that the vergence of the second focus adjustment region 122 of the second variable focus lens 120 is complementarily formed with respect to the vergence of the first focus adjustment region 112. A method of complementarily adjusting the refractive power of the second focus adjustment region 122 with respect to the refractive power of the first focus adjustment region 112 is described with reference to FIGS. 1 and 3, and thus redundant descriptions thereof will be omitted.

Referring to FIG. 12B, the AR device 100 may display, on the real world object 10, the virtual object VO indicating information related to the real world object 10 viewed through the first variable focus lens 110, the second variable focus lens 120, and the waveguide 130. The virtual object VO refers to a part of the virtual image output to the user's eye through diffraction by the waveguide 130.

In an embodiment of the disclosure, the AR device 100 may obtain an image by capturing a physical environment or space viewed by the user through a camera 170 (see FIG. 12A) and provide the obtained image to the processor 160 (see FIG. 12A). The processor 160 may recognize the real world object 10 in the obtained image through image processing and generate the virtual object VO including the information related to the real world object 10. In the embodiment of the disclosure shown in FIG. 12B, the AR device 100 may obtain an image of a subway entrance by capturing the subway entrance through the camera 170, and the processor 160 may recognize the real world object 10 which describes subway line and exit information at the subway entrance and generate the virtual object VO including information related to the recognized real world object 10, i.e., information that 'the subway service is stopped'.

In an embodiment of the disclosure, the AR device 100 may obtain position information of the user wearing the AR device 100 using the position sensor 180 (see FIG. 3) and generate the virtual object VO including information related to the position information. For example, the AR device 100 may generate the virtual object VO including a road guidance UI, a navigation UI, etc.

The AR device 100 may project the generated virtual image onto the waveguide 130 and adjust the refractive power of the first focus adjustment region 112, thereby forming the vergence of the first focus adjustment region 112 and accordingly changing the focal length of the virtual object VO, which is a region of the virtual image formed on the retina 34.

Figure 13A:
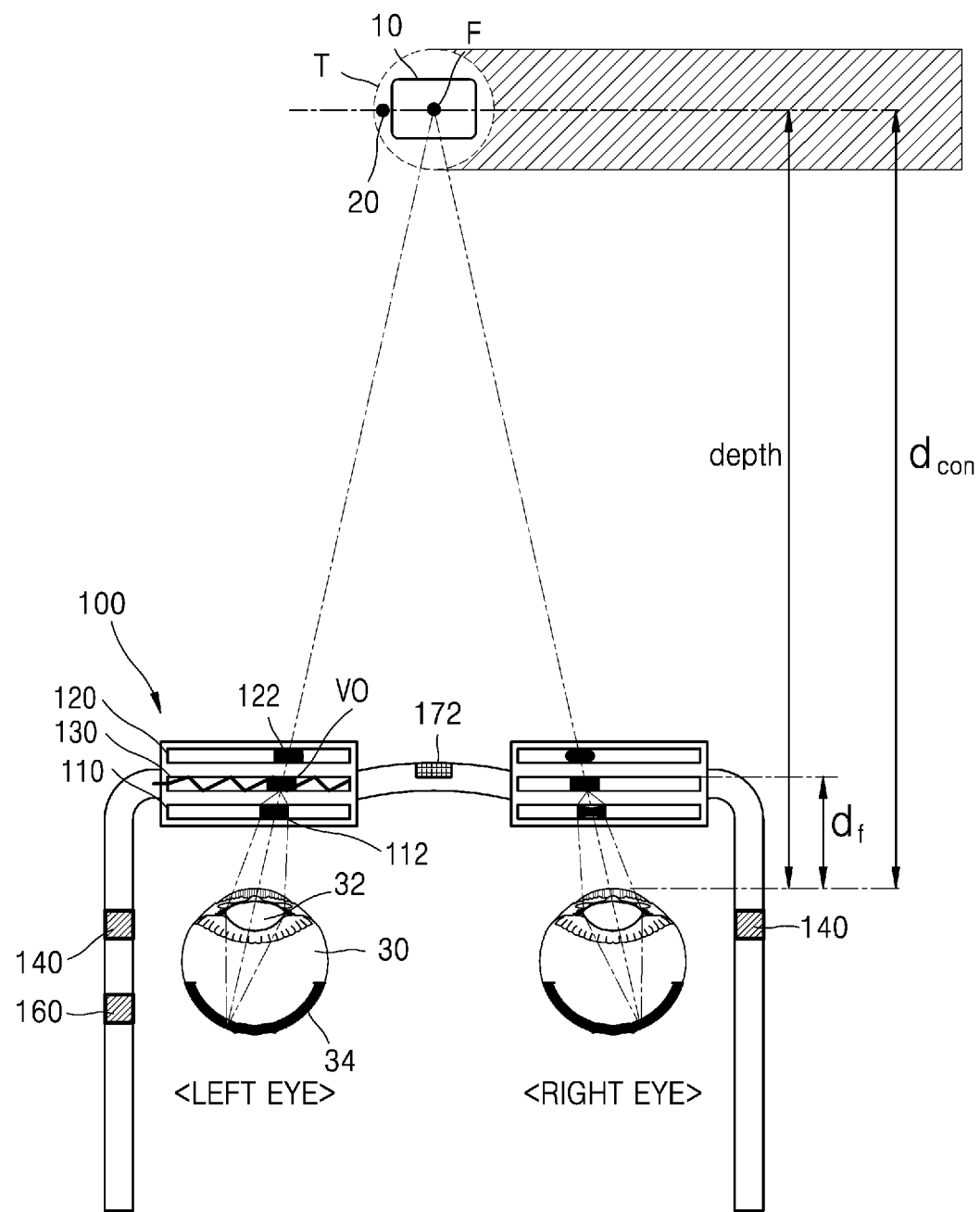
FIG. 13A is a diagram for describing a method, performed by an AR device, of adjusting a focal length according to an embodiment of the disclosure.
Figure 13B:
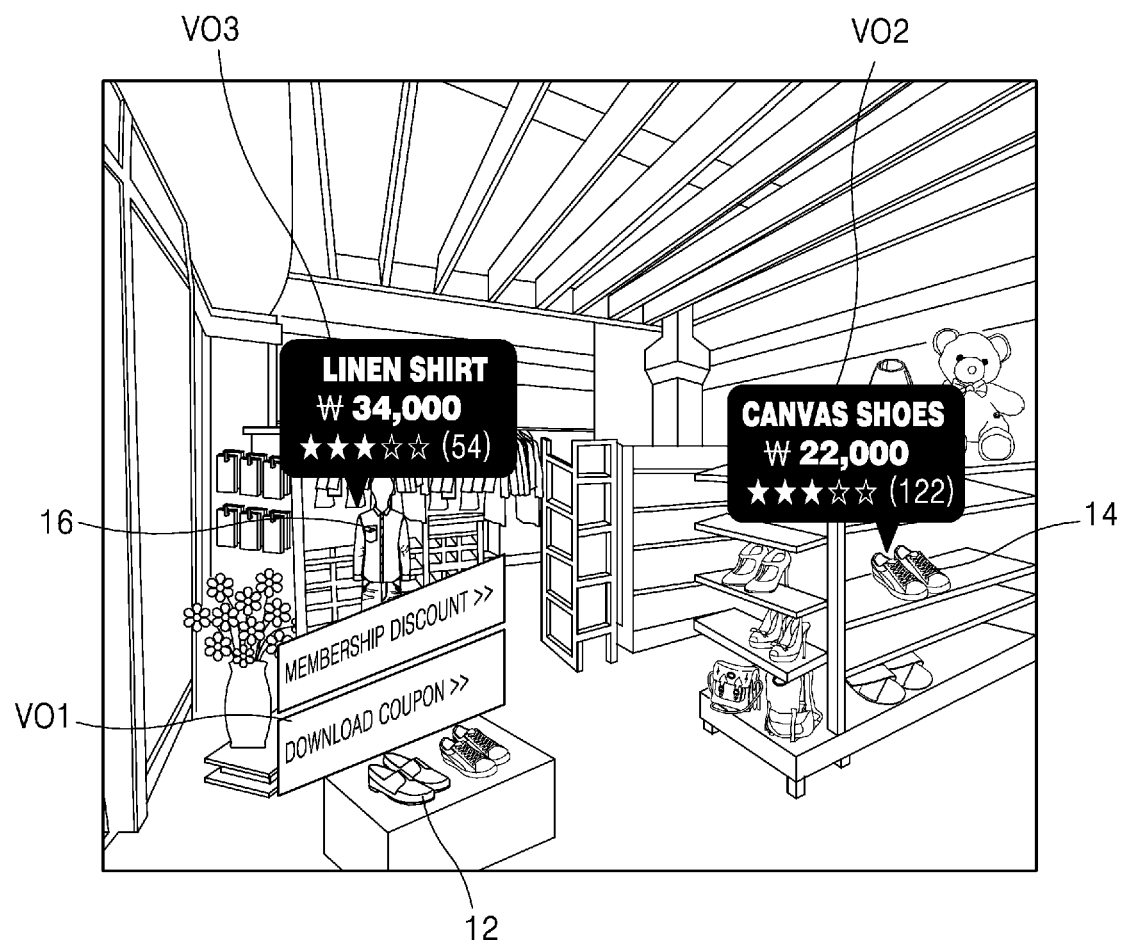
FIG. 13B is a diagram of a virtual image displayed on a real world object through the AR device according to an embodiment of the disclosure.

FIG. 13A is a diagram for describing a method performed by the AR device of adjusting a focal length according to an embodiment of the disclosure, and FIG. 13B is a diagram of a virtual image displayed on a real world object through the AR device.

Referring to FIG. 13A, an eye tracker may obtain an eye vector by tracking a direction of view of a user's eye and provide the eye vector to the processor 160. The processor 160 may obtain the gaze point G on the real world object 10 that the user views based on the eye vector. According to an embodiment of the disclosure, the processor 160 may obtain a first eye vector indicating a direction of view of the left eye and a second eye vector indicating a direction of view of the right eye using the eye tracker. The processor 160 may calculate a 3D position coordinate value of the gaze point G at which views of both eyes converge based on a binocular disparity, the first eye vector, and the second eye vector. The processor 160 may calculate the vergence distance $d_{con}$, which is a distance between both eyes and the gaze point G. In an embodiment of the disclosure, the vergence distance $d_{con}$ may be determined by a triangulation method.

The processor 160 may recognize the real world object 10 viewed by the user based on the gaze point G and obtain depth value information about the real world object 10. In an embodiment of the disclosure, the depth sensor 172 may scan a physical space or environment around the user and measure the depth value of the real world object 10 disposed in the physical space or environment. The depth sensor 172 may measure the depth value according to the 3D position coordinate value of the real world object 10 in the physical space or environment and arrange the measured depth value according to each 3D position coordinate value to generate a depth map. The depth sensor 172 may measure the depth value of the real world object 10 by using any one of, for example, stereo-type, ToF, and structured pattern techniques.

The depth sensor 172 may store the depth map in the storage 190 (see FIG. 3). The processor 160 may load the depth map from the storage 190 to obtain the depth information, which indicates a distance between the user and the real world object 10 disposed on the gaze point G.

In an embodiment of the disclosure, the depth sensor 172 may obtain the 3D position coordinate value of the gaze point G from the processor 160, measure the depth value corresponding to the obtained 3D position coordinate value, and provide the measured depth value to the processor 160.

The AR device 100 may adjust the vergence of the first focus adjustment region 112 by adjusting the refractive power of the first focus adjustment region 112 of the first variable focus lens 110. The processor 160 may change the focus position of the virtual object VO, which is one region of a virtual image output by the waveguide 130, by adjusting the vergence of the first focus adjustment region 112. In an embodiment of the disclosure, the processor 160 may adjust the vergence of the first focus adjustment region 112, thereby changing the light path passing through each lens 32 of both eyes, and accordingly change the focus position of the virtual object VO formed on the retina 34, thereby adjusting the focal length of the virtual object VO. In an embodiment of the disclosure, the processor 160 may obtain the depth value of the real world object 10 disposed on the gaze point G by loading the depth map previously stored in the storage 190 and adjust the focal length $d_f$ of the virtual object VO output through the waveguide 130 to be the same as the obtained depth value of the real world object 10.

In an embodiment of the disclosure, the AR device 100 may adjust the refractive power of the first focus adjustment region 112, thereby changing the focal length $d_f$ of the virtual object VO output through the waveguide 130 to be the same as the vergence distance $d_{con}$. In this case, the first focus adjustment region 112 may be adjusted to have a refractive power by which the focal length focused on the virtual object VO output through the waveguide 130 may be shifted by the same distance as the depth value of the real world object 10.

In an embodiment of the disclosure, the AR device 100 may adjust the refractive power of the first focus adjustment region 112 to place the focus position converging on the virtual object VO within a target position T, and accordingly adjust the focus position of the virtual object VO. The target position T represents a position within a predetermined range from the position of the gaze point G at which views of both eyes converge on the real world object 10. In this case, the focal length $d_f$ of the virtual object VO may not be exactly the same as the depth value of the real world object 10. In an embodiment of the disclosure, the focal length $d_f$ may be larger or smaller than the depth value of the real world object 10 by a predetermined distance.

In an embodiment of the disclosure, to compensate for a focus distortion in which the real world object or a physical space looks dim or blurry due to the adjusted refractive power of the first focus adjustment region 112 by adjusting the refractive power of the first focus adjustment region 112, the AR device 100 may adjust the refractive power of the second focus adjustment region 122 such that the vergence of the second focus adjustment region 122 of the second variable focus lens 120 is complementarily formed with respect to the vergence of the first focus adjustment region 112. A method of complementarily adjusting the refractive power of the second focus adjustment region 122 with respect to the refractive power of the first focus adjustment region 112 is described with reference to FIGS. 1 and 3, and thus redundant descriptions thereof will be omitted.

Referring to FIG. 13B, the AR device 100 may capture a physical space or environment around the user wearing the AR device 100 using the depth sensor 172 (see FIG. 3) and obtain depth value information of each of a plurality of first through third real world objects 12, 14, and 16 included in the physical space or environment.

The AR device 100 may use the depth value information of each of the plurality of first through third real world objects 12, 14, and 16 to change the focal distance such that virtual objects VO1, VO2, and VO3 are the same as depth values of the plurality of first through third real world objects 12, 14, and 16 or are displayed within predetermined ranges of the depth values respectively.

In an embodiment of the disclosure, the AR device 100 may use the depth sensor 172 to measure the depth values according to 3D position coordinate values of the first through third real world objects 12, 14, and 16 in the physical space or environment viewed by the user and arrange the measured depth values according to the respective 3D position coordinate values to generate a depth map. The generated depth map may be stored in the storage 190 (see FIG. 3). The processor 160 (see FIG. 13A) may load the depth map from the storage 190 to obtain depth information which is distances between the first through third real world objects 12, 14, and 16 and the user. In an embodiment of the disclosure, the processor 160 may obtain the depth value which is the distance between the first real world object 12 and the user from the storage 190 and adjust the refractive power of the first focus adjustment region 112 such that the focal length of the first virtual object VO1 is the same as the depth value of the first real world object 12. The processor 160 may adjust the refractive index of light passing through the first virtual object VO1 by adjusting the refractive power of the first focus adjustment region 112, thereby changing the vergence of the first variable focus lens 110 and accordingly adjust the focal length of the first virtual object VO1.

In the embodiment of the disclosure shown in FIG. 13B, positions where the first real world object 12, the second real world object 14, and the third real world object 16 are disposed are different from each other, and thus, depth values with respect to the first real world object 12, the second real world object 14 and the third real world object 16 are different. In an embodiment of the disclosure, the AR device 100 may track the direction of the user's view by using an eye tracker, thereby obtaining a gaze point at which user's both eyes converge among the first real world object 12, the second real world object 14 and the third real world object 16 and adjusting the refractive power of the first focus adjustment region 112 using the depth value of the real word object disposed on the gaze point. The depth values of the first real world object 12, the second real world object 14 and the third real world object 16 may be obtained using the depth map previously stored in the storage 190. The AR device 100 may adjust the refractive power of the second focus adjustment region 122 to form a complementary vergence with respect to the vergence formed due to the adjusted refractive power of the first focus adjustment region 112.

The AR device 100 may recognize the plurality of first through third real world objects 12, 14, and 16, and generate the virtual objects VO1, VO2, and VO3 including information about the plurality of first through third real world objects 12, 14, and 16 respectively. For example, the AR device 100 may generate the virtual objects VO1, VO2, and VO3 including at least one of detailed descriptions, price information, discount information, purchaser's website addresses, user ratings, or advertisements regarding the plurality of first through third real world objects 12, 14, and 16. In the embodiment of the disclosure illustrated in FIG. 13B, the AR device 100 may recognize that the first real world object 12 is shoes, generate the first virtual object VO1 including membership discounts, coupon downloads, etc. related to the shoes, and display the first virtual object VO1 through the waveguide 130. The AR device 100 may also generate the second virtual object VO2 including price information and user rating information about the second real world object 14 and display the second virtual object VO2 through the waveguide 130. The AR device 100 may recognize that the third real world object 16 is a shirt, generate the third virtual object VO3 including price information and about user rating information about the shirt, and display the third virtual object VO3 through the waveguide 130.

Figure 14:
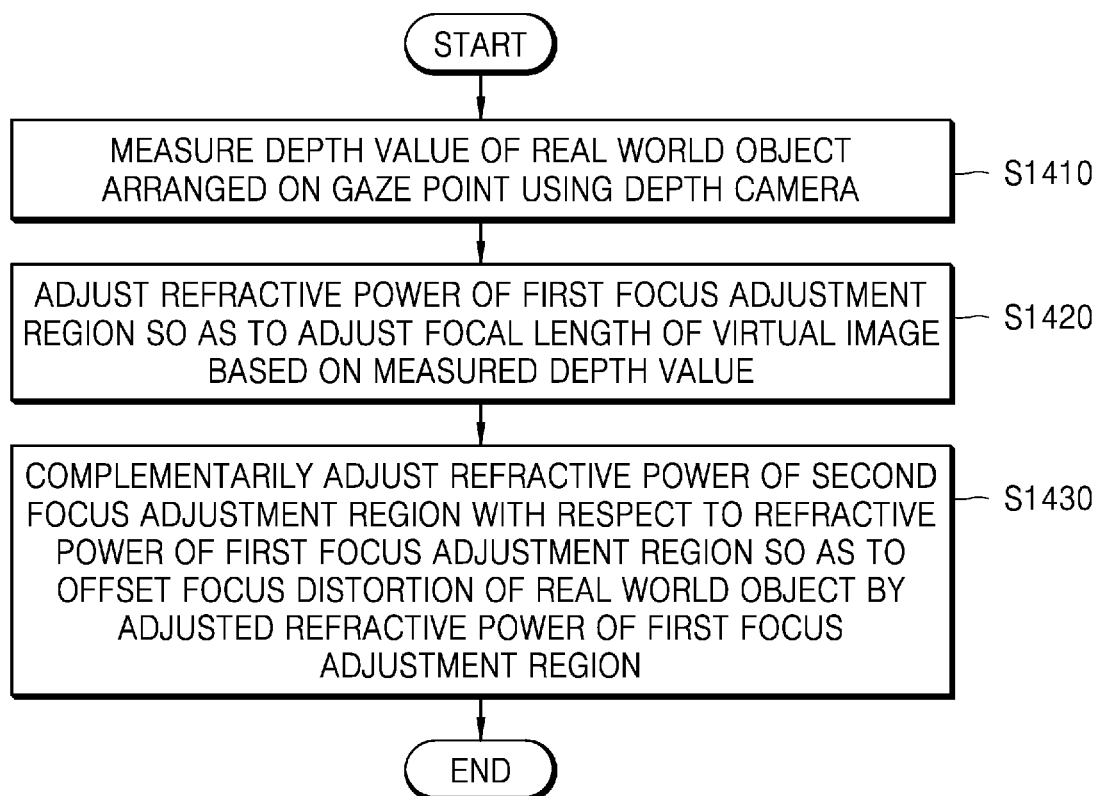
FIG. 14 is a flowchart of a method, performed by an AR device, of adjusting refractive power of a focus adjustment region of a variable focus lens based on a depth value of a real world object according to an embodiment of the disclosure.

FIG. 14 is a flowchart of a method performed by an AR device of adjusting a refractive index of a focus adjust adjustment region of a variable focus lens based on a depth value of a real world object according to an embodiment of the disclosure.

In operation S1410, the AR device may measure the depth value of the real world object disposed on a gaze point using a depth camera. In an embodiment of the disclosure, a depth sensor may scan a physical space or environment around a user wearing the AR device and measure the depth value of the real world object disposed in the physical space or environment. The depth sensor may measure the depth value according to the 3D position coordinate value of the real world object in the physical space or environment and arrange the measured depth value according to each 3D position coordinate value to generate a depth map. The depth sensor may measure the depth value of the real world object by using any one of, for example, stereo-type, ToF, and structured pattern technique. The depth sensor may store the generated depth map in the storage 190 (see FIG. 3). The AR device may load the depth map from the storage 190 to obtain the depth information, which is a distance between the user and the real world object disposed on the gaze point.

In an embodiment of the disclosure, the depth sensor may obtain the 3D position coordinate value of the gaze point from the processor 160 (see FIG. 3), and measure the depth value corresponding to the obtained 3D position coordinate value and provide the measured depth value to the processor 160.

In operation S1420, the AR device may adjust the refractive power of a first focus adjustment region to adjust the focal length of a virtual object based on the measured depth value. The AR device may adjust the focal length of the virtual object corresponding to a region of a virtual image based on depth value information of the real world object obtained by loading the depth value information from the storage 190. The AR device may adjust the refractive power of the first focus adjustment region of a first variable focus lens such that the depth value of the real world object and the focal length converged on the virtual object are the same. In an embodiment of the disclosure, the AR device may adjust the refractive power of the first focus adjustment region of the first variable focus lens to adjust the focal length of the virtual object to be larger or smaller by a predetermined size with respect to the depth value of the real world object.

The AR device may adjust a vergence formed in the first focus adjustment region by adjusting the refractive power of the first focus adjustment region. The vergence is an index indicating a degree of convergence or divergence of light and may be adjusted according to the refractive power of the first focus adjustment region. The AR device may change the light path passing through a lens through the virtual object by adjusting the vergence of the first focus adjustment region and accordingly change the focus position of the virtual object formed on the retina, thereby adjusting the focal length of the virtual object.

In operation S1430, the AR device may complementarily adjust the refractive power of a second focus adjustment region with respect to the refractive power of the first focus adjustment region to offset the focus distortion of the real world object by the adjusted refractive power of the first focus adjustment region. To compensate for a focus distortion in which the real world object looks dim or blurry that occurs by the vergence formed due to the adjusted refractive power of the first focus adjustment region of the first variable focus lens, the AR device may adjust the refractive power of the second focus adjustment region of a second variable focus lens to be the same as the adjusted refractive power of the first focus adjustment region in a direction opposite to the direction of the refractive power of the first focus adjustment region. For example, when the first focus adjustment region is adjusted to the refractive power of −1 diopter D, the second focus adjustment region may be adjusted to +1 diopter D.

Figure 15A:
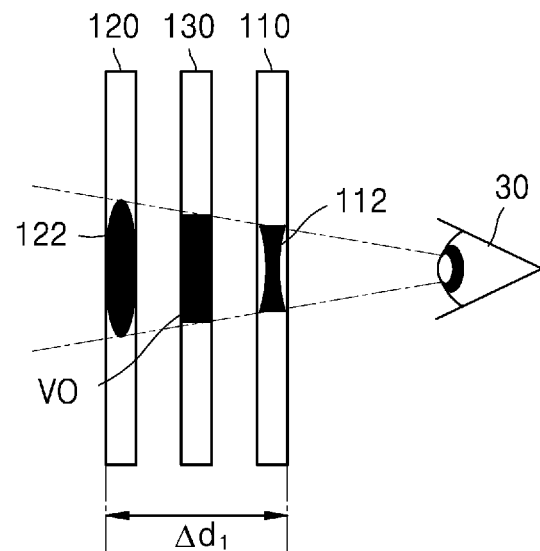
FIG. 15A is a diagram illustrating a method, performed by an AR device, of determining a size of a focus adjustment region of a variable focus lens according to an embodiment of the disclosure.

FIG. 15A is a diagram illustrating a method performed by an AR device of determining a size of a focus adjustment region of a variable focus lens according to an embodiment of the disclosure.

Referring to FIG. 15A, the first focus adjustment region 112 of the first variable focus lens 110, the second focus adjustment region 122 of the second variable focus lens 120, and the virtual object VO output through the waveguide 130 may be aligned in a line according to an eye vector. In an embodiment of the disclosure, the AR device may determine the size of the first focus adjustment region 112 based on the size of the virtual object VO output through the waveguide 130. In an embodiment of the disclosure, the AR device may determine the size of the first focus adjustment region 112 based on a distance between the user's eye 30 and the first variable focus lens 110 and the size of the virtual object VO.

When a real world object is viewed through the eye 30, a viewing angle may gradually increase in a direction from the eye 30 toward the real world object. The AR device may determine the size of the second focus adjustment region 122 based on the size of the virtual object VO and a first distance Δd1 spaced apart between the first variable focus lens 110 and the second variable focus lens 120.

Figure 15B:
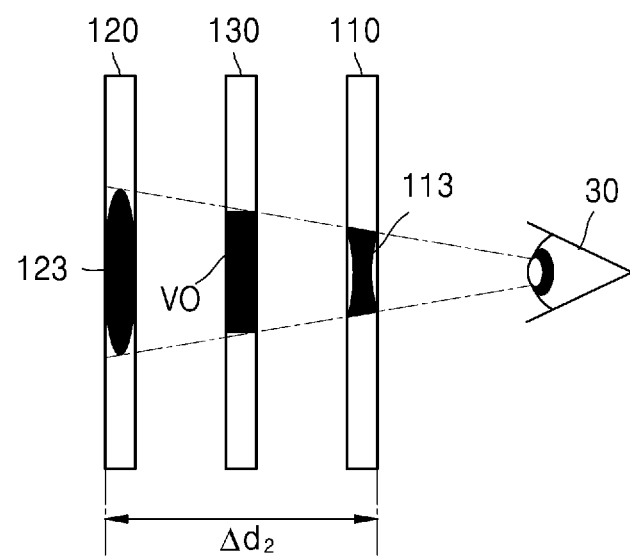
FIG. 15B is a diagram illustrating a method, performed by an AR device, of determining a size of a focus adjustment region of a variable focus lens according to an embodiment of the disclosure.

FIG. 15B is a diagram illustrating a method performed by an AR device of determining a size of a focus adjustment region of a variable focus lens according to an embodiment of the disclosure.

Referring to FIG. 15B, even when the viewing angle of the eye 30 is the same, when a second distance Δd1 spaced apart between the first variable focus lens 110 and the second variable focus lens 120 is larger than the first distance Δd1 (see FIG. 15A), the size of a second focus adjustment region 123 may be determined to be larger than the size of the second focus adjustment region 122 shown in FIG. 15A. In FIG. 15B, the size of a first focus adjustment region 113 may be determined based on the size of the virtual object VO and a distance between the first variable focus lens 110 and the waveguide 130.

Figure 16:
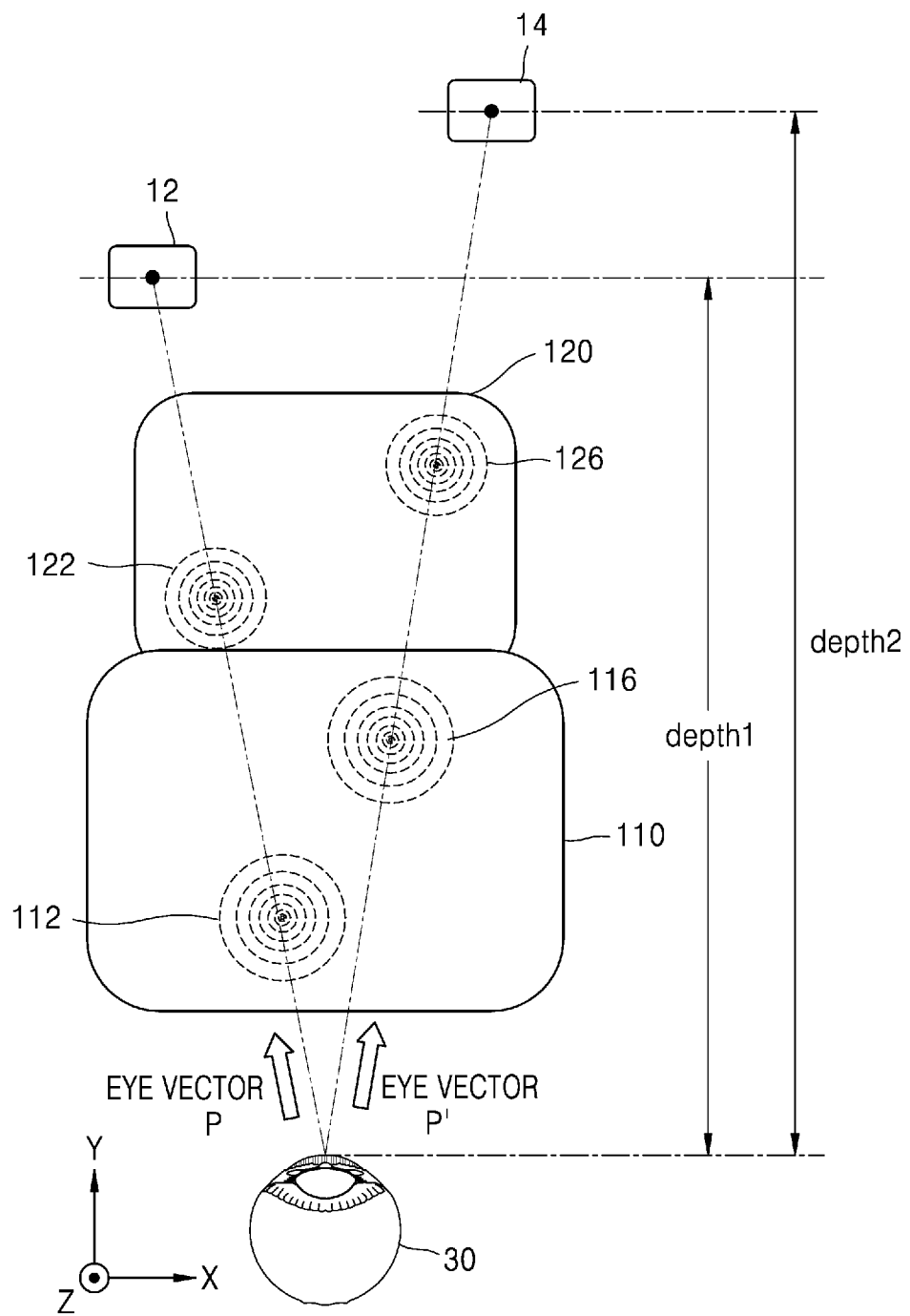
FIG. 16 illustrates a variable focus lens that includes a plurality of focus adjustment regions according to an embodiment of the disclosure.

FIG. 16 illustrates an embodiment of the disclosure in which a variable focus lens includes a plurality of first through fourth focus adjustment regions.

Referring to FIG. 16, the first variable focus lens 110 may include the plurality of first and third focus adjustment regions 112 and 116, and the second variable focus lens 120 may include the plurality of second and fourth focus adjustment regions 122 and 126. In FIG. 16, the first variable focus lens 110 may include the two first and third focus adjustment regions 112 and 116, and the second variable focus lens 120 may include the two second and fourth focus adjustment regions 122 and 126, but this is for convenience of explanation. In the disclosure, the quantities of focus adjustment regions included in the first variable focus lens 110 and the second variable focus lens 120 are not limited as illustrated in FIG. 16. In an embodiment of the disclosure, the first variable focus lens 110 may include three or more focus adjustment regions, and the second variable focus lens 120 may also include three or more focus adjustment regions.

The second focus adjustment region 122 of the second variable focus lens 120 may be disposed at a position aligned with the first focus adjustment region 112 along the direction of a first eye vector p. In an embodiment of the disclosure, the processor 160 (see FIGS. 2 and 3) may obtain a 2D position coordinate value of a region in which the first eye vector p arrives in the entire region of the second variable focus lens 120 and determine a preset area region around the 2D position coordinate value as the second focus adjustment region 122.

The fourth focus adjustment region 126 of the second variable focus lens 120 may be disposed at a position aligned with the third focus adjustment region 116 along the direction of a second eye vector p'. In an embodiment of the disclosure, the processor 160 may obtain a 2D position coordinate value of a region in which the second eye vector p' arrives in the entire region of the second variable focus lens 120 and determine a preset area region around the 2D position coordinate value as the fourth focus adjustment region 126.

The refractive power of the first focus adjustment region 112 and the third focus adjustment region 116 may be adjusted to have different refractive indices. In an embodiment of the disclosure, the AR device may change the light path passing through the first focus adjustment region 112 by adjusting the first focus adjustment region 112 to a first refractive power such that the virtual object viewed through the first focus adjustment region 112 is displayed on a first focus distance. Through this, the vergence of the first focus adjustment region 112 may be adjusted, and the focal length may be adjusted. In addition, the AR device may adjust the light path passing through the third focus adjustment region by adjusting the third focus adjustment region 116 to a second refractive index such that the virtual object viewed through the third focus adjustment region 116 is displayed on a second focal length. Through this, the vergence of the third focus adjustment region 116 may be adjusted, and the focal length may be adjusted.

In an embodiment of the disclosure, the AR device may adjust the refractive power of each of the plurality of first and third focus adjustment regions 112 and 116 on the first variable focus lens 110 based on a depth value of each of a plurality of real word objects 12 and 14 disposed at positions corresponding to the plurality of first and third focus adjustment regions 112 and 116 at the user's view. The depth value of each of the plurality of first and second real world objects 12 and 14 may be obtained by loading a depth map previously stored in the storage 190 (see FIG. 3). The depth map may be generated by scanning the plurality of first and second real world objects 12 and 14 by the depth sensor 172 (see FIG. 3) and storing a depth value corresponding to each of 3D position coordinate values of the plurality of first and second real world objects 12 and 14.

For example, the AR device may adjust the refractive power of the first focus adjustment region 112 to obtain a first depth value depth1 of the first real world object 12 viewed in the direction of view of the first eye vector p using the depth sensor and set the focal distance of the virtual object to be the same as the first depth value depth1 about the first real world object 12. For example, the AR device may adjust the refractive power of the third focus adjustment region 116 to obtain a second depth value depth2 of the second real world object 14 viewed in the direction of view of the second eye vector p' and set the focal distance of the virtual object to be the same as the second depth value depth2 about the second real world object 14.

In an embodiment of the disclosure, the AR device may adjust the refractive power of the plurality of first and third focus adjustment regions 112 and 116 by modulating a phase profile of a control voltage applied through the plurality of first array excitation electrodes 640-1 to 640-5 (see FIG. 6B) and the plurality of second array excitation electrodes 650-1 to 650-5 (see FIG. 6B) disposed on the liquid crystal layer 610 (see FIGS. 6A and 6B) of the first variable focus lens 110. For example, to adjust the refractive power of each of the plurality of first and third focus adjustment regions 112 and 116, when applying the control voltage through a redundant excitation electrode among the plurality of first array excitation electrodes 640-1 to 640-5 and the plurality of second array excitation electrodes 650-1 to 650-5, the AR device may perform time division on the control voltage through the plurality of first driver terminals 660-1 to 660-5 (see FIG. 6B) and the plurality of second driver terminals 670-1 to 670-5 (see FIG. 6B) and control the control voltage to be alternately applied to the excitation electrode according to the time division.

The plurality of first driver terminals 660-1 to 660-5 (see FIG. 6B) and the plurality of second driver terminals 670-1 to 670-5 (see FIG. 6B) may be controlled by the controller 680 (see FIG. 6B). The processor (see FIG. 6B) may provide the controller 680 with position information about the first focus adjustment region 112 and the second focus adjustment region 122, and the controller 680 may modulate the phase profile of the control voltage applied through the plurality of first array excitation electrodes 640-1 to 640-5 and the plurality of second array excitation electrodes 650-1 to 650-5 by controlling the plurality of first driver terminals 660-1 to 660-5 and the plurality of second driver terminals 670-1 to 670-5 based on the position information about the first focus adjustment region 112 and the second focus adjustment region 122 obtained from the processor 160.

In an embodiment of the disclosure, the AR device may adjust the refractive power of the second focus adjustment region 122 to compensate for the adjusted refractive power of the first focus adjustment region 112. To compensate for a focus distortion in which the first real world object 12 looks dim or blurry due to the adjusted refractive power of the first focus adjustment region 112, the AR device may complementarily adjust the refractive power of the second focus adjustment region 122 of the second variable focus lens 120 with respect to the refractive power of the first focus adjustment region 112. For example, the AR device may adjust the refractive power of the second focus adjustment region 122 to have the same magnitude as the adjusted refractive power of the first focus adjustment region 112 in a direction opposite to the direction of the refractive power of the first focus adjustment region 112. For example, when the first focus adjustment region 112 is adjusted to the refractive power of −1 diopter D, the second focus adjustment region 122 may be adjusted to +1 diopter D.

Similarly, to compensate for the adjusted refractive power of the third focus adjustment region 116, the AR device may complementarily adjust the refractive power of the fourth focus adjustment region 126 with respect to the refractive power of the third focus adjustment region 116.

When a plurality of focus adjustment regions are set on the first variable focus lens 110 and the second variable focus lens 120, the AR device may receive virtual game content or 3D moving image content from a server or the like and adjust a focus on an object including a character displayed on the received content. In an embodiment of the disclosure, when the AR device receives game content or 3D moving image content from a server or another device and executes the received content or executes game content or 3D moving image content previously stored in the AR device, the first focus adjustment region 112 and the third focus adjustment region 116 may be previously adjusted to a predetermined refractive power. In this case, information about the refractive power of the first focus adjustment region 112 and the refractive power of the third focus adjustment region 116 may be stored in the storage 190 (see FIG. 3). Similarly, information about the refractive power of the second focus adjustment region 122 and the fourth focus adjustment region 126 may be previously stored in the storage 190.

In an embodiment of the disclosure, the processor 160 (see FIG. 3) may obtain an eye vector indicating a direction of the user's view using the eye tracker 150 (see FIG. 3), and based on eye vectors of the left and right eyes, obtain a gaze point at which views of both eyes converge. The processor 160 may determine one of the plurality of first and third focus adjustment regions 112 and 116 included in the first variable focus lens 110 based on the detected gaze point. The processor 160 may obtain information about the refractive power of the determined focus adjustment region from the storage 190 and adjust the refractive power of the focus adjustment region using the obtained information about the refractive power.

For example, when the eye vector obtained through the eye tracker 150 is the first eye vector p, the processor 160 may determine the refractive power of the first focus adjustment region 112 as a focus adjustment region to be adjusted and adjust the refractive power of the first focus adjustment region 112 using the information about the refractive power of the first focus adjustment region 112 previously stored in the storage 190. To compensate for a focus distortion due to the adjusted refractive power of the first focus adjustment region 112, the processor 160 may complementarily adjust the refractive power of the second focus adjustment region 122 with respect to the refractive power of the first focus adjustment region 112.

FIG. 17 is a block diagram illustrating an AR device according to an embodiment of the disclosure.

Referring to FIG. 17, the AR device 200 may include the first variable focus lens 110, the second variable focus lens 120, the waveguide 130, the display module 140, the eye tracker 150, the processor 160, the memory 162, and a communication module 270. The AR device 200 illustrated in FIG. 17 may include the same elements as the AR device 100 illustrated in FIG. 3. For example, the first variable focus lens 110, the second variable focus lens 120, the waveguide 130, the display module 140, and the eye tracker 150 are respectively the same as the first variable focus lens 110, the second variable focus lens 120, the waveguide 130, the display module 140, and the eye tracker 150 shown in FIG. 3. Therefore, redundant descriptions will be omitted.

The processor 160 may control the overall functions and/or operations performed by the AR device 200 by executing computer program code including instructions stored in the memory 162. The processor 160 may control operations or functions of the first variable focus lens 110, the second variable focus lens 120, the waveguide 130, the display module 140, the eye tracker 150, and the communication module 270.

The communication module 270 may perform data communication between the AR device 200 and a mobile phone 1000. The AR device 200 may be wirelessly connected to the mobile phone 1000 through the communication module 270.

The communication module 270 may perform data communication between the AR device 200 and the mobile phone 1000 by using at least one of data communication methods including wireless LAN, Wi-Fi, Bluetooth, Zigbee, Wi-Fi Direct (WFD), infrared communication (IrDA), Bluetooth Low Energy (BLE) Near Field Communication (NFC), Wireless Broadband Internet (Wibro), World Interoperability for Microwave Access (WiMAX), Shared Wireless Access Protocol (SWAP), Wireless Gigabit Alliance (Wigig) or RF communication.

The mobile phone 1000 may be operated by a user wearing the AR device 200. The mobile phone 1000 may obtain a real world object image by capturing a physical space or environment around the user through a camera. The mobile phone 1000 may obtain information about the position of the user by using a location sensor such as a GPS sensor. The mobile phone 1000 may generate a virtual image by using information about a real world object. In an embodiment of the disclosure, the mobile phone 1000 may include a depth sensor and obtain depth value information of the real world object.

The processor 160 may control the communication module 270 and receive at least one of location information, real world object information, or depth value information of the real world object from the mobile phone 1000 through the communication module 270. The processor 160 may control the display module 140 to project light of the virtual image onto the waveguide 130 based on the received location information and the real world object information. The virtual object which is a region of the virtual image may be diffracted through the diffraction grating of the waveguide 130 and output to the user's eye.

In an embodiment of the disclosure, the AR device 200 may receive from the mobile phone 1000 a virtual object generated by the mobile phone 1000 using the communication module 270. The processor 160 may control the display module 140 to project the received virtual object toward the waveguide 130.

In an embodiment of the disclosure, the AR device 200 may receive the depth value information of the real world object from the mobile phone 1000 using the communication module 270. The processor 160 may adjust the refractive power of a focus adjustment region of the first variable focus lens 110 to change the focal length of the virtual object based on the depth value received from the mobile phone 1000. In an embodiment of the disclosure, the processor 160 may adjust the focal length of the virtual object based on the depth value of the real world object viewed by the user by adjusting the refractive power of the focus adjustment region of the first variable focus lens 110.

The AR devices 100 and 200 according to the disclosure may be realized as hardware elements, software elements, and/or the combination of hardware elements and software elements. For example, the AR devices 100 and 200 according to the embodiments of the disclosure may be realized by using a processor, an arithmetic logic unit (ALU), application specific integrated circuits (ASICs), digital signal processors (DSPs), digital signal processing devices (DSPDs), programmable logic devices (PLDs), microcomputers, microprocessors, or one or more general-purpose computers or special-purpose computers, such as a device capable of executing and responding to instructions.

The software may include a computer program, a code, an instruction, or a combination of one or more thereof, and may configure a processing device to operate as required or separately or collectively command the processing device.

The software may be implemented in a computer program that includes instructions stored on a computer-readable storage medium. The computer-readable storage media may include, for example, magnetic storage media (for example, ROM, RAM, floppy disks, hard disks, etc.) and optical reading media (for example, CD-ROM, DVD, etc.). The computer-readable recording media may be distributed in computer systems connected in a network and may store and execute computer-readable codes in a distributed fashion. The media may be computer-readable, may be stored in a memory, and executed by a processor.

The computer may be a device configured to call instructions stored in the storage media, and in response to the called instructions, to perform an operation according to the embodiments of the disclosure, and may include the AR devices 100 and 200 according to the embodiments of the disclosure.

The computer-readable storage medium may be provided in the form of a non-transitory storage medium. Here, 'non-transitory' means that the storage medium does not include a signal and is tangible, but does not distinguish whether data is stored semi-permanently or temporarily on the storage medium.

Further, the AR devices 100 and 200 or the operating method of the same according to the embodiments of the disclosure may be provided in a computer program product. The computer program product is a product purchasable between a seller and a purchaser.

The computer program product may include a software program and a computer-readable storage medium in which the software program is stored. For example, the computer program product may include a software program-type product (for example, a downloadable application) electronically distributed by a manufacturer of the AR devices 100 and 200 or electronic markets (for example, Google Play™ store, App Store, etc.). For electronic distribution, at least a portion of the software program may be stored in storage media or temporarily generated. In this case, the storage media may be a server of the manufacturer, a server of the electronic market, or a storage medium of a broadcasting server temporarily storing the software program.

The computer program product may include a storage medium of a server or a storage medium of a terminal in a system including the server and the terminal (for example, an ultrasonic diagnosis apparatus). Alternatively, when there is a third device (for example, a smartphone) connected with the server or the terminal for communication, the computer program product may include a storage medium of the third device. Alternatively, the computer program product may include a software program transmitted to the terminal or the third device from the server or to the terminal from the third device.

In this case, one of the server, the terminal, and the third device may execute the method according to the embodiments of the disclosure by executing the computer program product. Alternatively, at least two of the server, the terminal, and the third device may execute the method according to the embodiments of the disclosure in a distributed fashion by executing the computer program product.

For example, the server (for example, a cloud server or an AI server) may execute the computer program product stored in the server and control the terminal connected with the server for communication to perform the method according to the embodiments of the disclosure.

As another example, the third device may execute the computer program product and control the terminal connected to the third device for communication to perform the method according to the embodiments of the disclosure.

When the third device executes the computer program product, the third device may download a computer program product from the server and execute the downloaded computer program product. Alternatively, the third device may execute the computer program product provided in a free-loaded state and perform the method according to the embodiments of the disclosure.

In addition, although the embodiments of the disclosure have been illustrated and described above, the disclosure is not limited to the above-described specific embodiments of the disclosure. Various modified embodiments of the disclosure may be made by one of ordinary skill in the art without departing from the scope of the disclosure as claimed in the claims, and these modifications should not be individually understood from the technical spirit or the prospect of the disclosure.

Although the embodiments of the disclosure have been described by the limited embodiments of the disclosure and the drawings as described above, various modifications and variations are possible by one of ordinary skill in the art from the above description. For example, the described techniques may be performed in a different order than the described method, and/or elements of the described electronic device, structure, circuit, etc. may be combined or integrated in a different form than the described method, or may be replaced or substituted by other elements or equivalents to achieve appropriate results.

What is claimed is:

1. An augmented reality (AR) device comprising:
a plurality of first variable focus lenses and a plurality of second variable focus lenses, wherein each of the plurality of first variable focus lenses and each of the plurality of second variable focus lenses is an electrically tunable liquid crystal lens;

a plurality of waveguides, wherein each of the plurality of waveguides is disposed between the plurality of first variable focus lenses and the plurality of second variable focus lenses;

a plurality of eye trackers configured to obtain a left eye vector by tracking a direction of a left eye of a user of the AR device and a right eye vector by tracking a direction of a right eye of the user of the AR device;

a display module configured to project light of a virtual image toward the plurality of waveguides; and one or more processors configured to:
determine a first focus adjustment region of a first left eye variable focus lens among the plurality of first variable focus lenses based on the left eye vector
determine a third focus adjustment region of a first right eye variable focus lens among the plurality of first variable focus lenses based on the right eye vector,
obtain a gaze point based on the left eye vector and the right eye vector,
adjust a refractive power of the first focus adjustment region and a refractive power of the third focus adjustment region based on the gaze point, and
based on the adjusted refractive power of the first focus adjustment region and the adjusted refractive power of the third focus adjustment region, adjust a refractive power of a second focus adjustment region of a second left eye variable focus lens among the plurality of second variable focus lenses and a refractive power of a fourth focus adjustment region of a second right eye variable focus lens among the plurality of second variable focus lenses.

2. The AR device of claim 1, further comprising a memory storing a program comprising one or more instructions,
wherein the one or more processors are further configured to perform operations by executing the one or more instructions of the program stored in the memory.

3. The AR device of claim 1, wherein when the user wears the AR device, the first left eye variable focus lens is disposed at a position spaced apart from the left eye of the user by a first distance, and the second left eye variable focus lens is disposed at a position spaced apart from the left eye of the user by a second distance,
wherein the second distance is greater than the first distance.

4. The AR device of claim 1, wherein the one or more processors are further configured to control to apply a control voltage that generates a phase modulation profile relating to a position corresponding to the first focus adjustment region to the first left eye variable focus lens, and, based on the applied control voltage, adjust the refractive power of the first focus adjustment region by changing an angle at which liquid crystal molecules arranged at a position of the first focus adjustment region are arranged among liquid crystal molecules of the first left eye variable focus lens.

5. The AR device of claim 1, further comprising a depth sensor configured to measure a depth value of a real world object disposed at the gaze point,
wherein the one or more processors are further configured to obtain the measured depth value of the real world object from the depth sensor and adjust the refractive power of the first focus adjustment region based on the measured depth value so as to adjust a focal length of a virtual object which is a partial region of the virtual image.

6. The AR device of claim 1, wherein the one or more processors are further configured to adjust the refractive power of the second focus adjustment region to be the same as the refractive power of the first focus adjustment region in a direction opposite to a direction of the refractive power of the first focus adjustment region.

7. The AR device of claim 1, wherein the one or more processors are further configured to determine the second focus adjustment region based on the left eye vector such that the first focus adjustment region and the second focus adjustment region are aligned in a direction of the left eye vector.

8. The AR device of claim 1, wherein a size of the first focus adjustment region is determined based on a size of a virtual object that is a partial region of the virtual image output through a left eye waveguide.

9. The AR device of claim 1, wherein a size of the second focus adjustment region is determined based on a size of a virtual object that is a partial region of the virtual image output through a left eye waveguide and a spaced distance between the first left eye variable focus lens and the second left eye variable focus lens.

10. The AR device of claim 1, wherein a plurality of a first focus adjustment regions are provided on the first left eye variable focus lens, and
wherein the one or more processors are further configured to adjust refractive powers focus adjustment regions such that different vergences are formed according to the focus adjustment regions, the focus adjustment regions comprising at least one of the first focus adjustment region, the second focus adjustment region, the third focus adjustment region, and the fourth focus adjustment region.

11. An augmented reality (AR) device comprising:
a plurality of first variable focus lenses and a plurality of second variable focus lenses, wherein each of the plurality of first variable focus lenses and each of the plurality of second variable focus lenses is an electrically tunable liquid crystal lens;

a plurality of waveguides, wherein each of the plurality of waveguides is disposed between the plurality of first variable focus lenses and the plurality of second variable focus lenses;

a plurality of eye trackers configured to obtain a left eye vector by tracking a direction of a left eye of an user of the AR device and a right eye vector by tracking a direction of a right eye of the user of the AR device;

a display module configured to project light of a virtual image toward the plurality of waveguides; and one or more processors configured to:
determine a first focus adjustment region of a first left eye variable focus lens among the plurality of first variable focus lenses based on the left eye vector obtained from the plurality of eye trackers and determine a third focus adjustment region of a first right eye variable focus lens among the plurality of first variable focus lenses based on the right eye vector,
obtain a gaze point based on the left eye vector and the right eye vector,
adjust a refractive power of the first focus adjustment region and a refractive power of the third focus adjustment region based on the gaze point, to change a focal length of a real world object, adjust a refractive power of a second focus adjustment region of a second left eye variable focus lens among the plurality of second variable focus lenses and a refractive power of a fourth focus adjustment region of a second right eye variable focus lens among the plurality of second variable focus lenses, and independently adjust the refractive power of the second focus adjustment region and the refractive power of the fourth focus adjustment region regardless of the refractive power of the first focus adjustment region and the refractive power of the third focus adjustment region.

12. An operating method of an augmented reality (AR) device, the operating method comprising:
    obtaining a left eye vector by tracking a direction of a left eye using a first eye tracker and obtaining a right eye vector by tracking a direction of a right eye using a second eye tracker;
    determining a first focus adjustment region of a first left eye variable focus lens based on the obtained left eye vector and determining a third focus adjustment region of a first right eye variable focus lens based on the obtained right eye vector;
    obtaining a gaze point based on the left eye vector and the right eye vector,
    adjusting a refractive power of the first focus adjustment region and a refractive power of the third focus adjustment region based on the gaze point;
    based on the adjusted refractive power of the first focus adjustment region and the adjusted refractive power of the third focus adjustment region, adjusting a refractive power of a second focus adjustment region of a second left eye variable focus lens and a refractive power of a fourth focus adjustment region of a second right eye variable focus lens; and
    projecting light of a virtual image toward a waveguide using a display module.

13. The operating method of claim 12, wherein the adjusting the refractive power of the first focus adjustment region and the refractive power of the third focus adjustment region comprises:
    applying a control voltage that generates a phase modulation profile relating to a position corresponding to the first focus adjustment region to the first left eye variable focus lens; and
    based on the applied control voltage, adjusting the refractive power of the first focus adjustment region by changing an angle at which liquid crystal molecules arranged at a position of the first focus adjustment region are arranged among liquid crystal molecules of the first left eye variable focus lens.

14. The operating method of claim 12, wherein the adjusting of the refractive power of the first focus adjustment region and the refractive power of the third focus adjustment region comprises:
    measuring a depth value of a real world object disposed on the gaze point using a depth sensor; and
    adjusting the refractive power of the first focus adjustment region based on the measured depth value so as to adjust a focal length of a virtual object which is a partial region of the virtual image.

15. The operating method of claim 12, wherein the adjusting of the refractive power of the second focus adjustment region and the refractive power of the fourth focus adjustment region comprises: adjusting the refractive power of the second focus adjustment region such that the second focus adjustment region forms a vergence in a direction opposite to a direction of an adjusted vergence of the first focus adjustment region and adjusting the refractive power of the fourth focus adjustment region such that the fourth focus adjustment region forms a vergence in a direction opposite to a direction of an adjusted vergence of the third focus adjustment region.

16. The operating method of claim 15, wherein the adjusting of the refractive power of the second focus adjustment region and the refractive power of the fourth focus adjustment region comprises:
    adjusting the refractive power of the second focus adjustment region to be the same as adjusted refractive power of the first focus adjustment region in a direction opposite to a direction of the adjusted refractive power of the first focus adjustment region.

17. The operating method of claim 12, further comprising determining the second focus adjustment region based on the left eye vector such that the first focus adjustment region and the second focus adjustment region are aligned in a direction of the left eye vector.

18. The operating method of claim 12, wherein a size of the first focus adjustment region is determined based on a size of a virtual object that is a partial region of the virtual image output through the waveguide.

19. The operating method of claim 12, wherein a size of the second focus adjustment region is determined based on a size of a virtual object that is a partial region of the virtual image output through the waveguide and a spaced distance between the first left eye variable focus lens and the second left eye variable focus lens.

20. A non-transitory computer readable recording medium storing a program for executing the operating method of claim 12.

* * * * *